US008254677B2

(12) United States Patent
Abe et al.

(10) Patent No.: US 8,254,677 B2
(45) Date of Patent: Aug. 28, 2012

(54) DETECTION APPARATUS, DETECTION METHOD, AND COMPUTER PROGRAM

(75) Inventors: Mototsugu Abe, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/198,693

(22) Filed: Aug. 4, 2011

(65) Prior Publication Data

US 2011/0293176 A1    Dec. 1, 2011

Related U.S. Application Data

(63) Continuation of application No. 11/861,906, filed on Sep. 26, 2007, now abandoned.

(30) Foreign Application Priority Data

Sep. 27, 2006   (JP) ............................. P2006-261867

(51) Int. Cl.
   *G06K 9/00* (2006.01)
(52) U.S. Cl. ........ 382/170; 382/173; 382/190; 382/166; 382/165; 348/699; 348/402.1; 348/413.1; 348/416.1; 348/700
(58) Field of Classification Search ................. 382/163, 382/239, 243, 268, 266, 235, 170; 348/699, 348/402.1, 413.1, 416.1, 700; 375/240.25, 375/240.16
See application file for complete search history.

(56) References Cited

U.S. PATENT DOCUMENTS

| | | | |
|---|---|---|---|
| 5,614,945 A * | 3/1997 | Sekine et al. ............ 348/207.99 |
| 5,719,643 A | 2/1998 | Nakajima | |
| 6,810,144 B2 * | 10/2004 | McGee et al. ................ 382/166 |
| 7,054,367 B2 * | 5/2006 | Oguz et al. ............... 375/240.23 |
| 7,110,454 B1 | 9/2006 | Chakraborty | |
| 2001/0005430 A1 * | 6/2001 | Warnick et al. ............... 382/173 |
| 2001/0021268 A1 | 9/2001 | Jun et al. | |
| 2003/0016864 A1 * | 1/2003 | McGee et al. ................ 382/165 |

(Continued)

FOREIGN PATENT DOCUMENTS

JP        2000-165798        6/2000

(Continued)

OTHER PUBLICATIONS

Vassiliadis et al., "The sum-Absolut-difference Motion Estimation Accelerator", IEEE 1998, pp. 559-566.*

(Continued)

*Primary Examiner* — Matthew Bella
*Assistant Examiner* — Mekonen Bekele
(74) *Attorney, Agent, or Firm* — Finnegan, Henderson, Farabow, Garrett, & Dunner, L.L.P.

(57) ABSTRACT

An apparatus for detecting a cut change based on a similarity between a first image and a second image, includes a unit for generating one of a luminance histogram and a color histogram of each of the first image and the second image, a unit for generating a spatial correlation image representing a correlation between spatial layouts of the first image and the second image, a unit for calculating a histogram similarity representing a similarity between the histogram of the first image and the histogram of the second image, a unit for calculating a spatial correlation image similarity representing a similarity between the spatial correlation image of the first image and the spatial correlation image of the second image, and a unit for determining whether a border between the first image and the second image is a cut change based on the histogram similarity and the spatial correlation image similarity.

20 Claims, 50 Drawing Sheets

U.S. PATENT DOCUMENTS

2003/0091235 A1* 5/2003 Xiong ............................ 382/199
2005/0100242 A1   5/2005 Trifonov et al.
2007/0201746 A1*  8/2007 Kim ............................... 382/190

FOREIGN PATENT DOCUMENTS

| | | |
|---|---|---|
| JP | 2000-295624 | 10/2000 |
| JP | 2000-324499 | 11/2000 |
| JP | 2002-064823 | 2/2002 |
| JP | 2004-282318 | 10/2004 |
| JP | 2006-121274 | 5/2006 |
| JP | 2006121274 A | 5/2006 |
| KR | 2002040503 A | 5/2002 |

OTHER PUBLICATIONS www.usb.org/developers/wusb/.

* cited by examiner

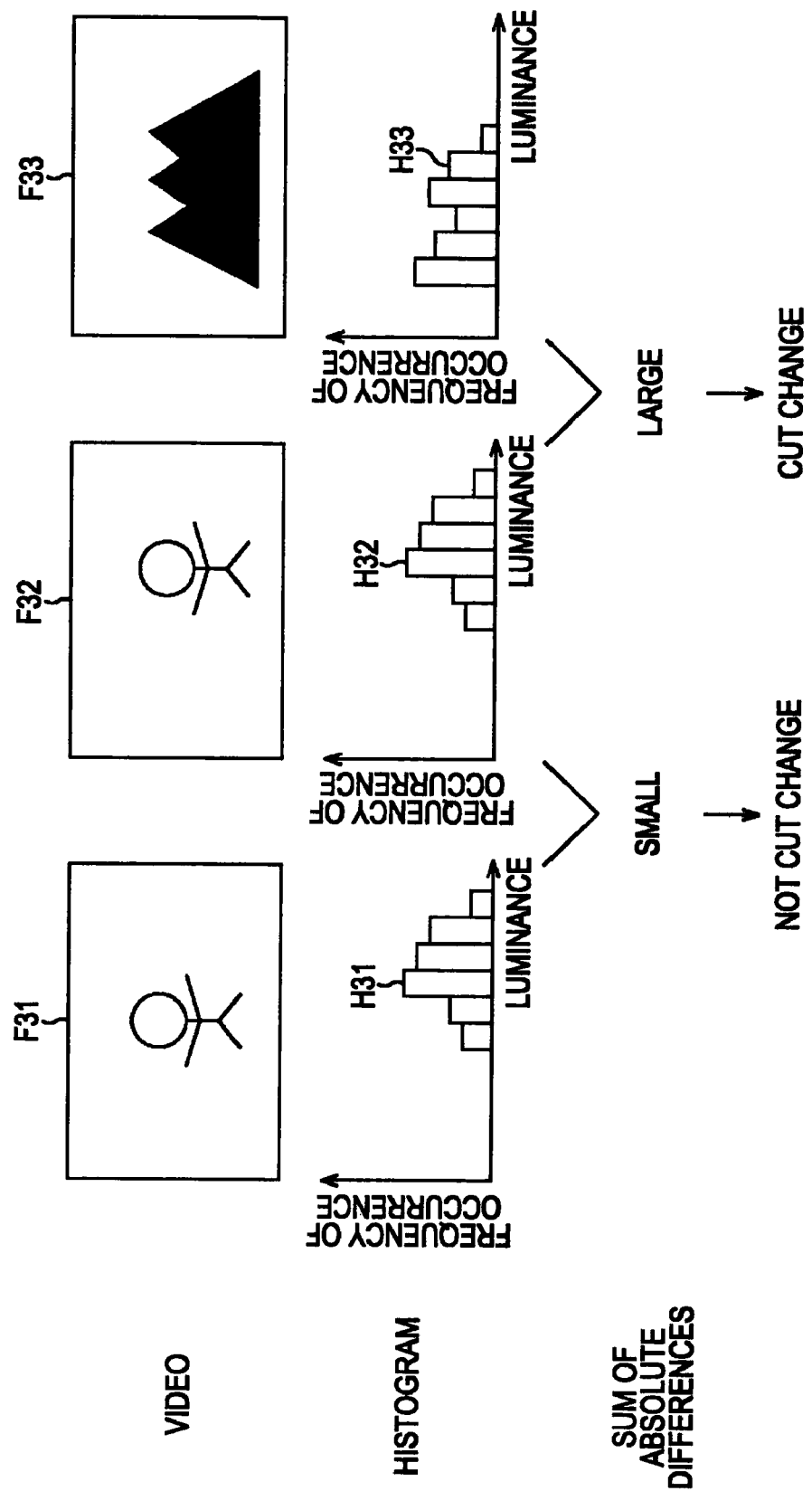

P101

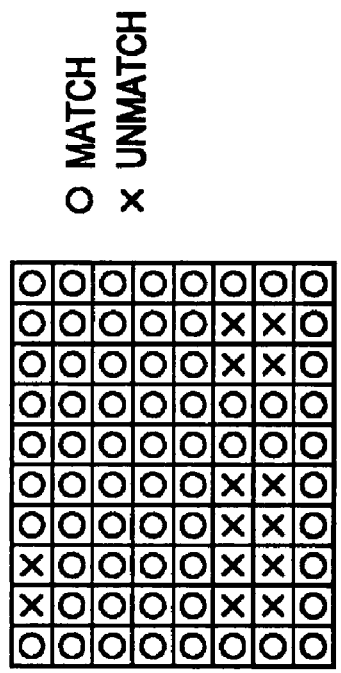
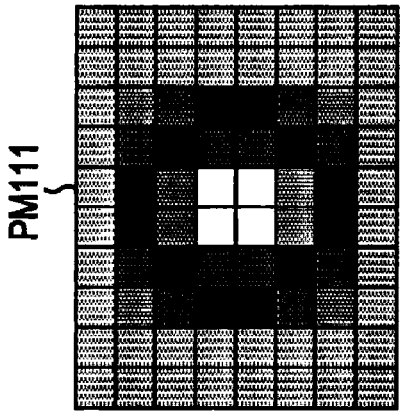
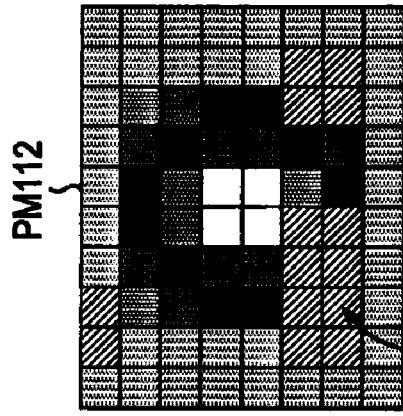

STANDARD VIDEO
(NOT CUT CHANGE)

FLASH OR FRAME MISSING
(NOT CUT CHANGE)

QUICK MOTION
(NOT CUT CHANGE)

STANDARD CUT CHANGE
(F511−F512)

STANDARD CUT CHANGE
(F512−F513)

STANDARD CUT CHANGE
(F511−F512, F512−F513)

BLEND CUT CHANGE

FIG. 49

| SIMILARITY 1 | | | SIMILARITY 2 | DETERMINATION |
|---|---|---|---|---|
| F511—F513 | F511—F512 | F512—F513 | | |
| LARGE | — | — | — | NOT CUT CHANGE (FIGS. 48A AND 48B) |
| SMALL | LARGE | LARGE | LARGE | BLEND CHANGE (FIG. 48G) |
| | | | SMALL | NOT CUT CHANGE (QUICK MOTION, FIG. 48C) |
| | | SMALL | — | STANDARD CUT CHANGE (F511—F512, F512—F513, FIG. 48E) |
| | SMALL | LARGE | — | STANDARD CUT CHANGE (F512—F513, FIG. 48D) |
| | | SMALL | LARGE | BLEND CUT CHANGE (FIG. 48G) |
| | | | SMALL | STANDARD CUT CHANGE (F511—F512, F512—F513, FIG. 47F) |

FIG. 52

| DATA | | NO. OF CUTS | REPEATABILITY (DETECTION FAILURE) | SUCCESS RATE (EXCESS) |
|---|---|---|---|---|
| PERSONAL VIDEO | 12 UNITS, EACH UNIT ABOUT 120 MINUTES | 260 | 98.1% (5) | 98.5% (4) |
| BROADCAST PROGRAM | 19 UNITS, EACH UNIT ABOUT 120 MINUTES | 1891 | 99.2% (15) | 98.6% (27) |

DETECTION APPARATUS, DETECTION METHOD, AND COMPUTER PROGRAM

CROSS REFERENCES TO RELATED APPLICATIONS

This application is a continuation of and claims the benefit of priority to U.S. patent application Ser. No. 11/861,906, filed Sep. 26, 2007 now abandoned, which claims benefit of priority to Japanese Patent Application No. JP 2006-261867, filed on Sep. 27, 2006. The contents of the above-referenced applications are expressly incorporated herein by reference in their entireties.

BACKGROUND OF THE INVENTION

1. Field of the Invention

The present invention relates to a detection apparatus, a detection method and a computer program. More specifically, the present invention relates to a detection apparatus, a detection method and a computer program for detecting a cut change at high accuracy.

2. Description of the Related Art

Process of detecting a cut change from image is useful in analysis, encryption, and search of the image.

A "cut" here means a chunk of image (image clip) continuous in space, and the cut change means a concatenation point between cuts, namely, a border where discontinuous image clips are concatenated.

The cut change is also referred to as a shot change, a scene change, or an image change point. In this specification, the term "cut change" is used.

Available as cut change detection methods are the statistical difference method, the pixel difference method, the encoding data method, the edge method, etc. The histogram difference method is known as the most precise cut change detection method.

The histogram difference method uses a difference between histograms.

The histogram is a distribution of luminance or color of an image and is generated by casing ballots into bins into bins according to gradations of luminance or color of each pixel (16 to 64 gradations are widely used). The distribution of the frequency occurrence of luminance or color of the image is thus determined.

The histogram difference method is divided into a simple histogram difference method and a segmentation histogram difference method.

The simple histogram difference method calculates as an evaluation value a difference between histograms of images of two frames to be processed (as disclosed in Transactions of Information Processing Society of Japan Vol. 33, No. 4, pp. 543-550 by Akio NAGASAKA and Yuzuru TANAKA).

In the simple histogram difference method, the sum of absolute values of differences between the corresponding bins of histograms (hereinafter referred to as histogram difference absolute sum) is calculated as an evaluation value.

In the segmentation histogram difference method, the entire image of each of two frames is segmented into a predetermined number of blocks (for example, 16 blocks as disclosed in Transactions of Information Processing Society of Japan Vol. 33, No. 4, pp. 543-550 by Akio NAGASAKA and Yuzuru TANAKA), a difference between the histograms in each block is determined, and only a predetermined number of blocks from the smallest difference is used to calculate an evaluation value (disclosed in Transactions of Information Processing Society of Japan Vol. 33, No. 4, pp. 543-550 by Akio NAGASAKA and Yuzuru TANAKA and the paper entitled "Comparison of Video Short Boundary Detection Techniques," John S. Boreczky, Lawrence A. Rowe, Storage and Retrieval for Image and Video Database (SPIE) (1996) pp. 170-179).

Changes in the cut of image include a change caused by a movement of the camera, a movement and change of the shape of a subject (hereinafter also referred to as position, posture and shape change), changes in aperture stop, color balance, brightness and color of the subject (hereinafter also referred to as brightness and color change), a change caused by an appearance of tickers, and appearance and disappearance of a quickly moving object (hereinafter also referred to as appearance triggered change).

If the histogram difference method is used, most of information relating to the shape and spatial position of a subject to be photographed is lost in the generation process of the histogram. Sensitivity to the position, posture and shape change most frequently taking place in the cut is controlled to a low level. Accuracy of the cut change detection using the histogram difference method is thus higher than that of another cut change detection method.

The loss of the information relating to the shape and spatial position of the subject to be photographed in the histogram difference method causes one side effect that sensitivity to the brightness and color change and the appearance-triggered change becomes unnecessarily high.

The paper entitled "Comparison of Video Short Boundary Detection Techniques," John S. Boreczky, Lawrence A. Rowe, Storage and Retrieval for Image and Video Database (SPIE) (1996) pp. 170-179 states that from among the above-described cut detection methods, the histogram difference method provides the highest detection accuracy level, and that the simple histogram difference method provides a detection rate of 85% and the segmentation histogram difference method provides a detection rate of 90%.

The segmentation histogram difference method even with the high accuracy thereof fails to detect one out of ten cut changes, namely, misses one out of ten cut changes to be detected as a cut change or detects cut changes that are in fact not cut changes. Accuracy level reached is not sufficiently high.

With reference to FIGS. 1A and 1B and FIGS. 2A and 2B, a relationship between a change in an image in a cut and histogram is discussed in conjunction with the histogram difference method.

FIGS. 1A and 1B illustrate changes in histogram with brightness level of an entire image changing.

As shown in FIGS. 1A and 1B, frame F1 and frame F2 are two frames to be processed and adjacent to each other in time. Histogram H1 and histogram H2 are luminance histograms of the entire images of the frame F1 and the frame F2, respectively.

As shown in FIGS. 1A and 1B, the shape and spatial position of a subject generally remain unchanged between the frame F1 and the frame F2. Luminance of the entire image is lowered. The histogram H2 is generally shifted leftward in comparison with the histogram H1 (to a lower luminance value).

A change in the image between the frame F1 and the frame F2 should be regarded as a change in the image in the cut. With the simple histogram difference method, if a difference between the histogram H1 and the histogram H2 becomes higher than a predetermined threshold, a point between the frame F1 and the frame F2 is likely to be erroneously as a cut change.

With the segmentation histogram difference method, if the luminance of the entire image changes, a change occurs between the frame F1 and the frame F2 in each histogram in all blocks, a cut change is also likely to be erroneously detected as a cut change.

FIGS. 2A and 2B illustrate histograms with a ticker appearing.

As shown in FIGS. 2A and 2B, frame F11 and frame F22 are two frames to be processed and adjacent to each other in time. Histogram H11 and histogram H12 are luminance histograms of the entire image of the frame F11 and the F12.

A change between the images of the frame F11 and the frame F12 in FIGS. 2A and 2B is mainly a suddenly emerging ticker. In comparison with the histogram H11, the histogram H12 includes a bin corresponding to a ticker area and excludes a bin corresponding to an area hidden by the ticker area.

The change between the images of the frame F11 and the frame F12 should be regarded as a change within a cut. If a difference between the histogram H11 and the histogram H12 becomes larger than a predetermined threshold with the simple histogram difference method, the switching point between the frame F11 and the frame F12 is likely to be erroneously detected as a cut change.

If the segmentation histogram difference method is used, a difference between the histograms of blocks other than the blocks of the ticker is small. If the number of blocks for use in the calculation of the evaluation value is small, a change between the images of the frame F11 and the frame F12 is identified to be no cut change. The change is less likely to be erroneously detected as a cut change.

In accordance with the segmentation histogram difference method, a predetermined number of blocks from the smallest difference between the histograms is used in the calculation of the evaluation value. Since the information relating to the shape and spatial position of the subject is partially used, cut change accuracy level is thus raised in comparison with the simple histogram difference method. If luminance of the entire image changes as shown in FIGS. 1A and 1B or if a subject moves at high speed across borders between blocks, the possibility of erroneous cut detection is heightened.

With the histogram difference method (the segmentation histogram difference method and the simple histogram difference method), a slight change in luminance can be erroneously detected as a cut change.

A relationship between the slight change in luminance and the histogram in the histogram difference method is described with reference to FIGS. 3 through 5A and 5B.

FIG. 3 illustrates a change in histograms in which a cut change is correctly detected.

As shown in FIG. 3, frames F31 through F33 shows a series of images consecutive in time. Starting with frame F31, two frames are successively processed at a time to detect a cut change. More specifically, frame F31 and frame F32 are processed, and then frame F32 and frame F33 are processed.

Histograms H31 through H33 are luminance histograms of the frames F31 through F33, respectively.

As shown in FIG. 3, a change between the images of the frame F31 and the frame F32 is mainly caused by a moving person as a subject. The distribution of the histogram H31 is substantially equal to the distribution of the histogram H32.

A histogram difference absolute sum between the histogram H31 and the histogram H32 is calculated as the difference between the histogram H31 and the histogram H32. The histogram difference absolute sum is sufficiently small. Since the difference between the histogram H31 and the histogram H32 is sufficiently small, the change between the frame F31 and the frame F32 is correctly identified as being not a cut change.

In contrast, the subject (person) in the frame F32 is quite different from a subject (mountain) in the frame F33. The histogram H32 is greatly different from the histogram H33.

The histogram difference absolute sum between the histogram H32 and the histogram H33 is calculated as the difference between the histogram H32 and the histogram H33. The histogram difference absolute sum becomes substantially large. Since the difference between the histogram H32 and the histogram H33 is sufficiently large, the difference between the frame F32 and the frame F33 is correctly identified as being a cut change.

FIG. 4 illustrates histograms in which a slight change takes place in luminance.

As shown in FIG. 4, frames F41 through F45 are a series of images consecutive in time. Starting with the frame F41, every two consecutive frames are processed to detect a cut change. First, the frame F41 and the frame F42 are processed, and then the frame F42 and the frame F43 are processed. Subsequently, every two consecutive frames are successively processed.

The histograms H41 through H45 are luminance histograms of the frames F41 through F45, respectively.

The frames F41 through F45 are monochrome images, and luminance of the entire image is uniform.

As shown in FIG. 4, the number of bins of the histogram is 64 and each bin has a width of four gradations. Bin borders are present between 76th gradation level and 77th gradation level, and between 80th gradation and 81st gradation, for example. The frames F41 through F45 have luminance values 73, 75, 77, 79 and 81 with slight changes in luminance taking place. Luminance of the entire image gradually increases. Since luminance of the entire image of each of the frames F41 through F45 remains unchanged, frequency of occurrence is concentrated in one bin in each of the histograms H41 through H45. A portion where frequency of occurrence is concentrated on a certain bin is referred to as a histogram peak.

Changes in the frames F41 through F45, namely, slight luminance changes are changes within the cut and not cut changes.

The frame F43 has luminance value 77 up slightly from luminance value 75 of the frame F42. Luminance of the entire image strides across the bin border between luminance value 76 and luminance value 77. In histogram H43, the histogram peak is shifted to the bin to the right of the bin of the histogram H42. The histogram difference absolute value between the histogram H42 and the histogram H43 becomes a maximum, and the switching point between the frame F42 and the frame F43 may be erroneously detected as a cut change.

The entire image of the frame F45 slightly increases in luminance to level 79 from level 81 in the frame F44. Luminance of the entire image rises beyond the bin border between luminance value 80 and luminance value 81. In the histogram H45, the histogram peak is shifted to the bin to the right of the bin in the histogram H44. The histogram difference absolute value between the histogram H44 and the histogram H45 becomes a maximum, and the switching point between the frame F44 and the frame F45 may be erroneously detected as a cut change.

A cut change is erroneously detected typically in the processing of the monochrome image. Even when a multi-color general image is processed, an erroneous detection is made if the histogram peak shifting across the bin border in response to a slight change in luminance or color causes a large change in the number of pixels of the bin. Along with the slight change in luminance or color between the two frames to be processed, variations between the histograms of the two images take place. This causes the detection accuracy of the cut change to be lowered.

Japanese Unexamined Patent Application Publication No. 2006-121274 has proposed one technique. In accordance with the disclosed technique, the average values of luminance of the entire two images are equalized so that the histograms of the two images are shifted along the axis of luminance (this process is hereinafter referred to as histogram shift). Subsequent to the histogram shift, a difference between the histograms is calculated. In accordance with this technique, the histograms have substantially the same shape and placed at the same location subsequent to the histogram shift. The variations between the histograms are canceled, and erroneous detection is controlled.

An erroneous detection can happen in such a case as shown in FIGS. 5A and 5B. FIGS. 5A and 5B illustrate a change in the histograms taking place when a slight change occurs in each of a left half and a right half of the image.

As shown in FIGS. 5A and 5B, frame F51 and frame F52 are two images consecutive in time. Histograms H51 and H52 are luminance histograms of the frame F51 and the frame F52, respectively.

The left half and the right half of each of the frame F51 and the frame F52 are monochrome images.

As shown in FIGS. 5A and 5B, the number of bins of the histogram is 64, and the bin width is four gradations. The bin borders may be between 76th gradation level and 77th gradation level and between 80th gradation level and 81st gradation level.

The luminance values of the left half and the right half of the frame F51 are 75 and 81, respectively. The luminance values of the left half and the right half of the frame F52 are 77 and 83, respectively. The frame F51 has histogram peaks in bins containing luminance value 75 and luminance value 81 and the frame F52 has histogram peaks in bins containing luminance value 77 and luminance value 83.

A change between the images of the frame F51 and the frame F52, namely, a slight change in luminance is a change within a cut. The border between the frame F51 and the frame F52 is not a cut change.

The left half of the frame F52 has a slight increase in luminance to luminance value 77 from luminance value 75 in the left half of the frame F51. The luminance of the left half of the image straddles across the bin border between luminance value 76 and luminance value 77. The right half of the frame F52 has a slight increase in luminance to luminance value 83 from luminance value 81 in the right half of the frame F51, but the luminance of the image does not straddle across bin border. Between the histogram 51 and the histogram 52, only the left histogram peak shifts across the bin border between luminance value 76 and luminance value 77 to the bin to the right thereof. As a result, if the histogram difference absolute sum between the histogram 51 and the histogram 52 reaches a predetermined threshold value, the change between the images of the frame F51 and the frame F52 is likely to be erroneously detected as a cut change.

If the shape of the histogram changes in response to a slight change in luminance, the histogram shift alone cannot cancel variations between the histograms. More specifically, if a change in image becomes more complex than the one shown in FIG. 4, the effectiveness of the histogram shift is lost.

Japanese Unexamined Patent Application Publication No. 2004-282318 discloses a technique of generating histograms. In accordance with the disclosed technique, ballots are cast into not only a corresponding bin but also in a bin next to the corresponding bin at a predetermined ratio.

Such a technique alleviates variations between histograms if variations of the entire image in luminance are small in comparison with the bin width of the histogram. If the variations of the entire image in luminance is not negligible with respect to the bin width, the variations between the histograms cannot be canceled by casting ballots into the adjacent bin.

The histogram difference method has difficulty reducing erroneous detection of cut change caused by a slight change in luminance or color.

Cut changes typically take place between adjacent images, and are called standard cut changes. In contrast, a cut change may take place when two cuts are concatenated within a mixture of a prior image and a subsequent image. Such a cut change is referred to as a blend cut change.

In the detection of the standard cut change, the similarity between the two images to be processed is calculated as an evaluation value. If similarity is lower than a predetermined threshold value, i.e., if non-similarity is higher than the predetermined threshold, the change between the two images is determined to be a cut change.

With this method, it is difficult to detect the blend cut change accurately. FIG. 6 illustrates a standard cut change. Frames F61 through F63 are a series of images consecutive in time. Starting with the frame F61, every two frames are processed to detect a cut change. More specifically, the frame F61 and the frame F62 are processed and then the frame F62 and the frame F63 are processed.

As shown in FIG. 6, the similarity between the frame F61 having a person as a subject and the frame F62 having a house as a subject is low. If the similarity is lower than a predetermined threshold, a change between the images of the frame F61 and the frame F62 is determined as a standard cut change. The similarity between the frame F62 having the house as a subject and the frame F63 having the house as a subject is high. If the similarity is higher than the predetermined threshold value, the change is determined to be not cut change.

FIG. 7 illustrates a blend cut change. As shown in FIG. 7, frames F71 through F73 are a series of images consecutive in time. Starting with the frame F71, every two consecutive images are processed. For example, the frame F71 and the frame F72 are processed, and then the frame F72 and the frame F73 are processed.

The frame F72 having a person and a house as subjects is a blend image of the frame F71 having the person as a subject and the frame F73 having the house as a subject. Two cuts are concatenated within the frame F72. The frame F72 is thus a blend cut change.

Such a blend cut change takes place when a cut change takes place between fields of the same image (hereinafter referred to as a field cut change), when consecutive images are blended through an image filter, when consecutive images are blended during encryption or decryption, or when consecutive images are blended during editing.

As shown in FIG. 7, the frame F72 contains portions similar to the frame F71 and the frame F73, and the frame F72 has high similarity with each of the frame F71 and the frame F73. The method of detecting cut change based on the similarity between the two consecutive images has difficulty detecting a blend cut change.

Japanese Unexamined Patent Application Publication No. 2000-295624 discloses a technique of detecting a field cut change as one of the blend cut changes. In accordance with the disclosed technique, a cut change is detected based on a similarity between two frames of every three frames with every second frame skipped rather than based on a similarity between two consecutive frames.

The technique disclosed in Japanese Unexamined Patent Application Publication No. 2000-295624 has difficulty detecting a cut change if an image in each frame quickly moves.

As shown in FIG. 8, frames F81 through F83 are a series of images consecutive in time and represent a scene in which a person goes away leftward from a house. The frames F81 through F83 show the person who quickly moves leftward on the screen. No cut change takes place.

As shown in FIG. 8, similarity between the frame F81 having the whole person image and a left portion of the house as subjects in the image thereof and the frame F82 having the whole person image and a larger left portion of the house as subjects in the image thereof is high. Similarity between the frame F82 and the frame F83 having a right half portion of the person image and a whole house image as subjects is high. Since the person quickly moves, similarity between the frame F81 having the whole person image and the left portion of the house as subjects in the image thereof and the frame F83 having the right half of the person image and the whole house image as subjects is low.

Cut change detection may be performed on the two frames (for example, frames F81 and F83) every three frames (frames F81 through F83) with every second frame (frame F82) skipped, in accordance with the technique disclosed in Japanese Unexamined Patent Application Publication No. 2000-295624. Since the similarity between the frame F81 and the frame F83 is low, the change throughout the frames F81 through F83 is likely to be erroneously identified as a blend cut change.

Japanese Unexamined Patent Application Publication No. 2002-64823 discloses a technique of a field cut change detection using encrypted data. However, this technique uses a feature quantity unique to an encrypted image of a particular encryption method, and is thus applicable to only an image that has been encrypted using that encryption method.

Japanese Unexamined Patent Application Publication No. 2000-324499 discloses another technique of detecting a cut change. The disclosed technique allows cut changes to be detected with a standard cut change and a field cut change differentiated from each other. In accordance with the disclosed technique, a difference between corresponding pixels on the two images to be processed is determined, the absolute values of the differences are summed (hereinafter referred to as difference absolute sum), and a difference between the sums of the difference absolute sums is determined. This technique still has difficulty detecting the blend cut changes (including the field cut change) at a high accuracy level.

SUMMARY OF THE INVENTION

The known art has difficulty detecting accurately the cut change. Furthermore, since tickers are frequently inserted into images in current broadcast service, detecting accurately cut change becomes even more difficult.

There is a need for a method of detecting a cut change at a higher accuracy level.

It is thus desirable to provide high-accuracy cut change detection method.

In accordance with embodiments of the present invention, one of a computer program and a method for causing a computer to detect a cut change based on a similarity between a first image and a second image, includes steps of generating one of a luminance histogram and a color histogram of each of the first image and the second image, generating a spatial correlation image representing a correlation between spatial layouts of the first image and the second image, calculating a histogram similarity representing a similarity between the histogram of the first image and the histogram of the second image, calculating a spatial correlation image similarity representing a similarity between the spatial correlation image of the first image and the spatial correlation image of the second image, and determining whether a border between the first image and the second image is a cut change based on the histogram similarity and the spatial correlation image similarity.

The computer program may further include a step of calculating an average similarity being at least one of an average of histogram similarities of images in a plurality of adjacent frames calculated in the histogram similarity calculating step and an average of spatial correlation image similarities of the images in a plurality of adjacent frames calculated in the spatial correlation image similarity calculating step, wherein the determining step includes determining whether the border between the first image and the second image is a cut change based on the histogram similarity, the spatial correlation image similarity, and the average similarity.

The computer program may further include a step of calculating a proximity average color being an average of luminance or color of the images on a plurality of frames adjacent to the first image, wherein the determining step includes determining whether the border between the first image and the second image is a cut change based on the histogram similarity, the spatial correlation image similarity, and the proximity average color.

The computer program may further include steps of generating a fine histogram of one of luminance and color of each of the first image and the second image, calculating a feature distribution by filtering the fine histogram, calculating a similarity between the feature distribution of the first image and the feature distribution of the second image, extracting a feature of a third image different from the first image and the second image, calculating a similarity between two images from among the first image, the second image and the third image, generating a contracted image of each of the first image, the second image and the third image, generating a synthesized image of the contracted image of the first image and the contracted image of the third image, and calculating a similarity between the synthesized image and the contracted image of the second image, wherein the determining step includes determining whether the border between the first image and the second image is a cut change based on the similarity between the feature distributions, the similarity between the two images from among the first image, the second image and the third image, and the similarity between the synthesized image and the contracted image of the second image.

In accordance with one embodiment of the present invention, an apparatus for detecting a cut change based on a similarity between a first image and a second image, includes a unit for generating one of a luminance histogram and a color histogram of each of the first image and the second image, a unit for generating a spatial correlation image representing a correlation between spatial layouts of the first image and the second image, a unit for calculating a histogram similarity representing a similarity between the histogram of the first image and the histogram of the second image, a unit for calculating a spatial correlation image similarity representing a similarity between the spatial correlation image of the first image and the spatial correlation image of the second image, and a unit for determining whether a border between the first image and the second image is a cut change based on the histogram similarity and the spatial correlation image similarity.

In accordance with embodiments of the present invention, one of the luminance histogram and the color histogram of each of the first image and the second image is generated. The spatial correlation image as an image representing the correlation between the spatial layouts of the first image and the second images is generated. The histogram similarity as the similarity between the histogram of the first image and the histogram of the second image is calculated. The spatial correlation image similarity as the similarity between the spatial correlation image of the first image and the spatial correlation image of the second image is calculated. Whether the border between the first image and the second image is a cut change is determined based on the histogram similarity and the spatial correlation image similarity.

In accordance with embodiments of the present invention, the cut change is detected at high accuracy.

BRIEF DESCRIPTION OF THE DRAWINGS

FIG. 3 illustrates a change in histograms in response to a cut change;

FIGS. 27A-27C illustrate counting of match pixels;

FIG. 49 illustrates relationship of similarity 1, and similarity 2 and determination results of the cut change;

FIG. 52 illustrates performance evaluation of the cut change detection.

DESCRIPTION OF THE PREFERRED EMBODIMENTS

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

Figure 11:
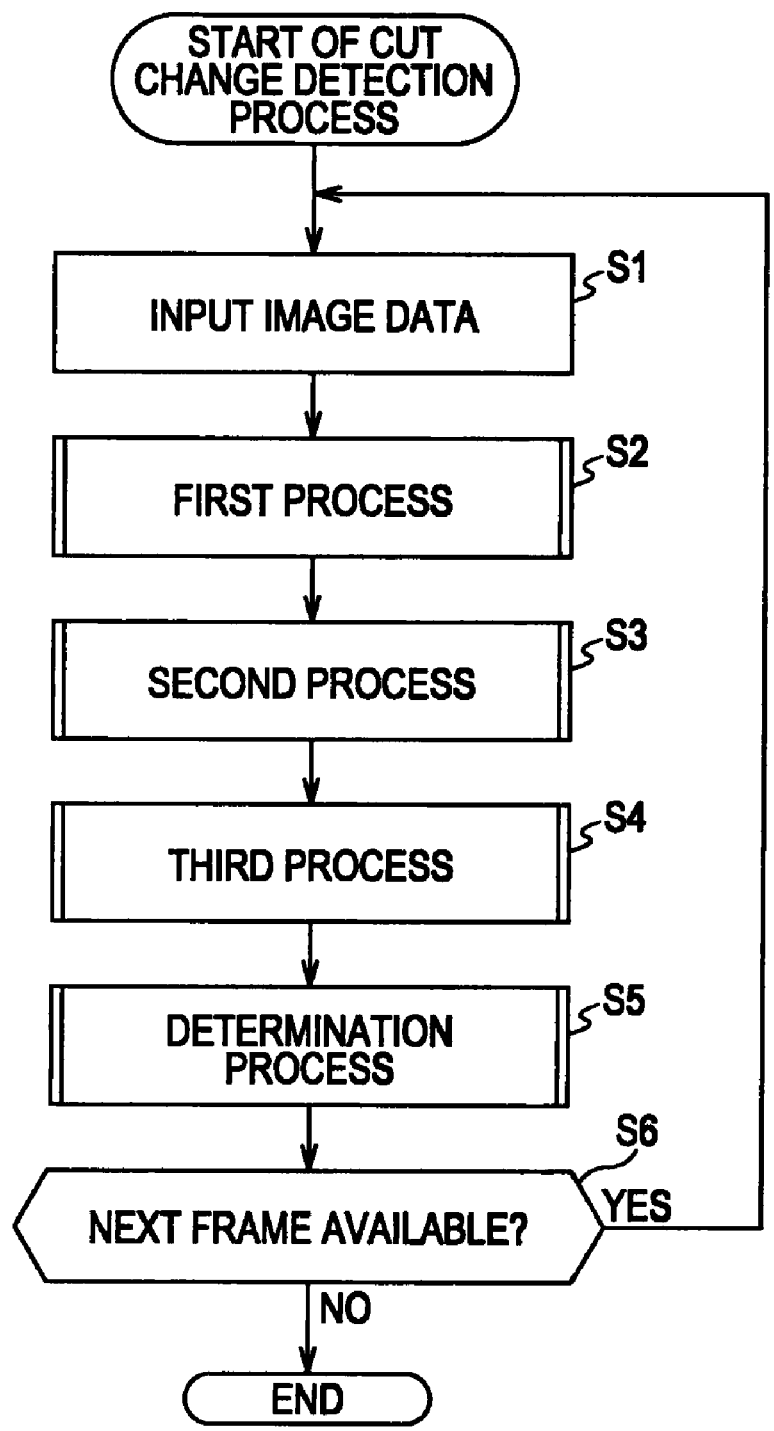
FIG. 11 is a flowchart illustrating a cut change detection process.

In accordance with embodiments of the present invention, one of a computer program and a method for causing a computer to detect a cut change based on a similarity between a first image and a second image, includes steps of generating one of a luminance histogram and a color histogram of each of the first image and the second image (for example, in step S31 of FIG. 13), generating a spatial correlation image representing a correlation between spatial layouts of the first image and the second image (for example, in step S32 of FIG. 13), calculating a histogram similarity representing a similarity between the histogram of the first image and the histogram of the second image (for example, in step S34 of FIG. 13), calculating a spatial correlation image similarity representing a similarity between the spatial correlation image of the first image and the spatial correlation image of the second image (for example, in step S35 of FIG. 13), and determining whether a border between the first image and the second image is a cut change based on the histogram similarity and the spatial correlation image similarity (for example, in step S5 of FIG. 11).

The computer program may further include a step of calculating an average similarity being at least one of an average of histogram similarities of images in a plurality of adjacent frames calculated in the histogram similarity calculating step and an average of spatial correlation image similarities of the images in a plurality of adjacent frames calculated in the spatial correlation image similarity calculating step (for example, in step S248 of FIG. 33), wherein the determining step includes determining whether the border between the first image and the second image is a cut change based on the histogram similarity, the spatial correlation image similarity, and the average similarity.

The computer program may further include a step of calculating a proximity average color being an average of luminance or color of the images on a plurality of frames adjacent to the first image (for example, in step S269 of FIG. 35), wherein the determining step includes determining whether the border between the first image and the second image is a cut change based on the histogram similarity, the spatial correlation image similarity, and the proximity average color.

The computer program may further include steps of generating a fine histogram of one of luminance and color of each of the first image and the second image (for example, in step S401 of FIG. 37), calculating a feature distribution by filtering the fine histogram (for example, in step S402 of FIG. 37), calculating a similarity between the feature distribution of the first image and the feature distribution of the second image (for example, in step S404 of FIG. 37), extracting a feature of a third image different from the first image and the second image (for example, in step S601 of FIG. 45), calculating a similarity between two images from among the first image, the second image and the third image (for example, in step S602 of FIG. 45), generating a contracted image of each of the first image, the second image and the third image (for example, in step S603 of FIG. 45), generating a synthesized image of the contracted image of the first image and the contracted image of the third image (for example, in step S604 of FIG. 45), and calculating a similarity between the synthesized image and the contracted image of the second image (for example, in step S605 of FIG. 45), wherein the determining step includes determining whether the border between the first image and the second image is a cut change based on the similarity between the feature distributions, the similarity of the two images from among the first image, the second image and the third image, and the similarity between the synthesized image and the contracted image of the second image.

Figure 12:
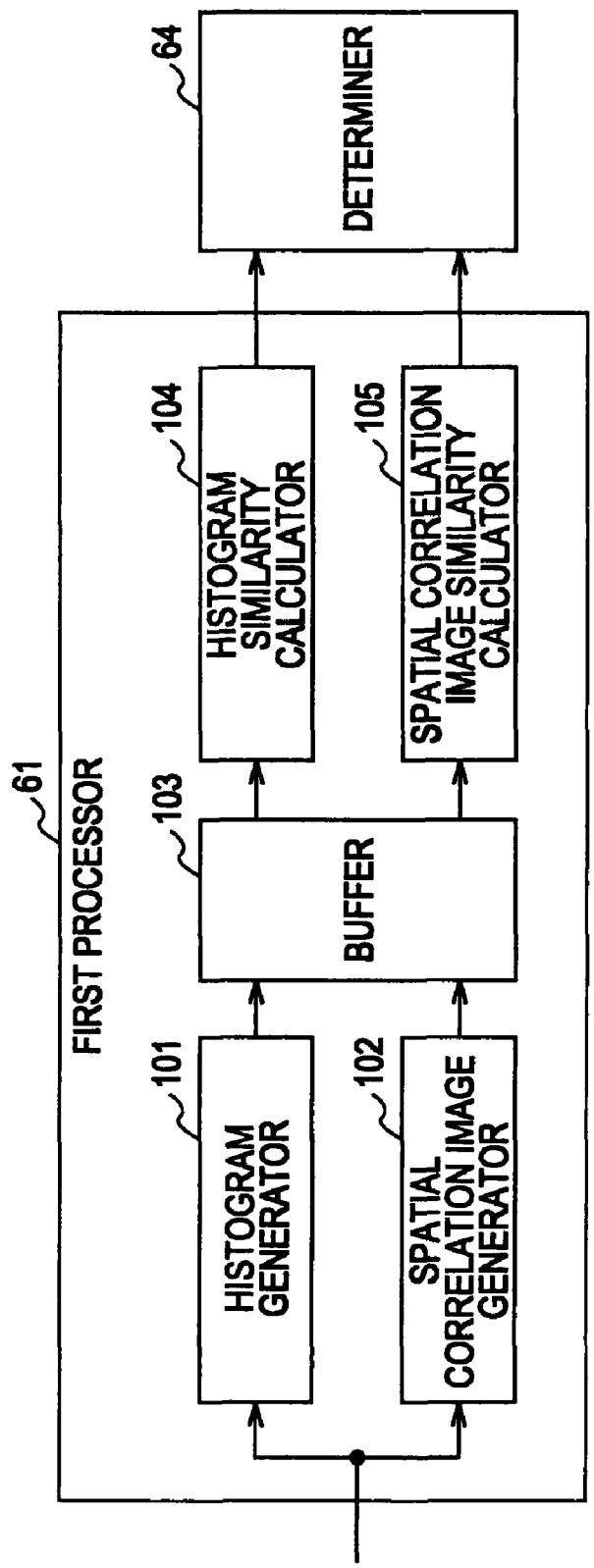
FIG. 12 is a block diagram illustrating a first processor in accordance with one embodiment of the present invention.

In accordance with one embodiment of the present invention, an apparatus (for example, personal computer 1 of FIG. 9) for detecting a cut change based on a similarity between a first image and a second image, includes a unit (for example, histogram generator 101 of FIG. 12) for generating one of a luminance histogram and a color histogram of each of the first image and the second image, a unit (for example, spatial correlation image generator 102 of FIG. 12) for generating a spatial correlation image representing a correlation between spatial layouts of the first image and the second image, a unit (for example, histogram similarity calculator 104 of FIG. 12) for calculating a histogram similarity representing a similarity between the histogram of the first image and the histogram of the second image, a unit (for example, spatial correlation image similarity calculator 105 of FIG. 12) for calculating a spatial correlation image similarity representing a similarity between the spatial correlation image of the first image and the spatial correlation image of the second image, and a unit (for example, determiner 64 of FIG. 10) for determining whether a border between the first image and the second image is a cut change based on the histogram similarity and the spatial correlation image similarity.

The embodiments of the present invention are described below with reference to the drawings.

Figure 9:
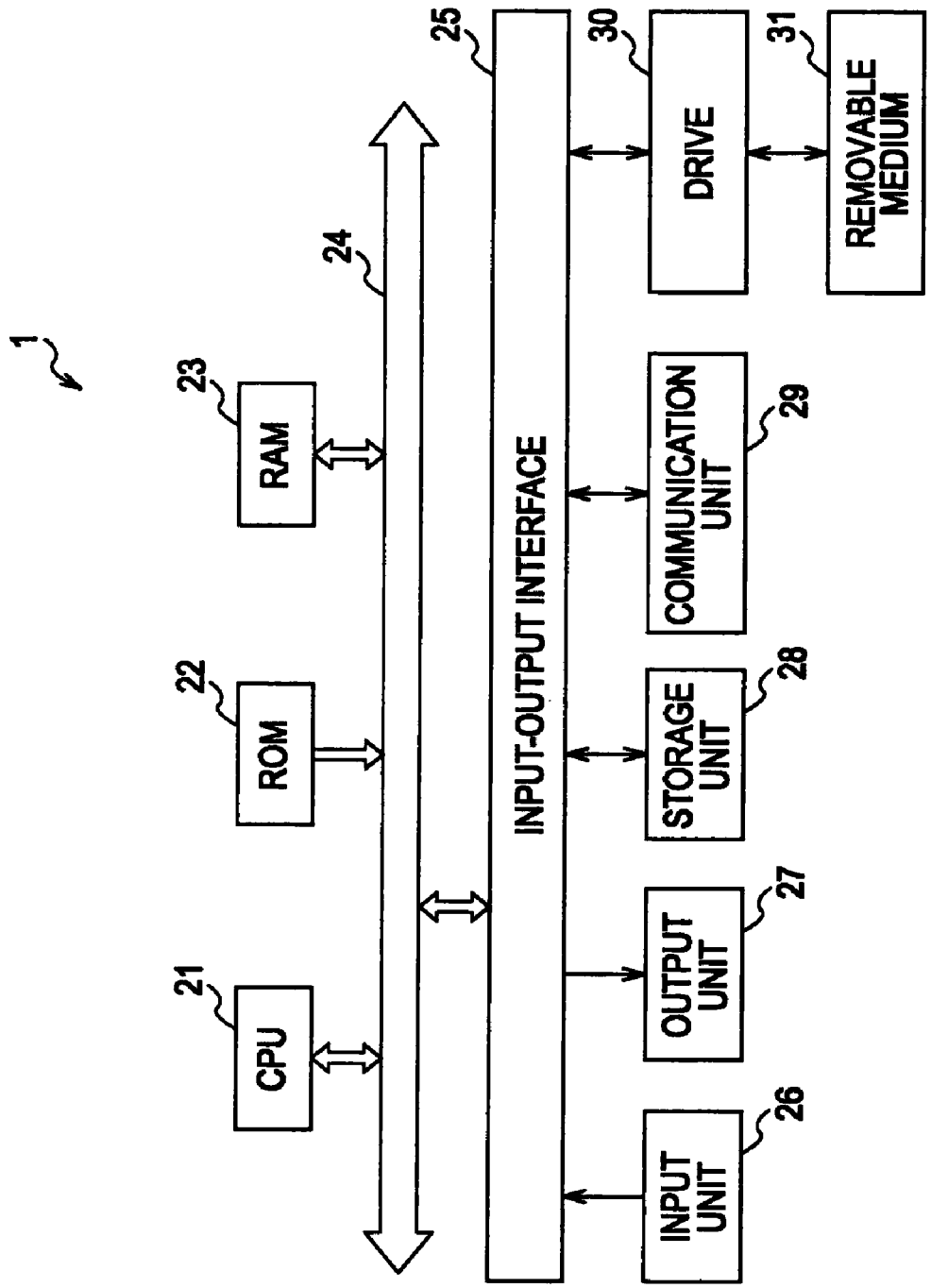
FIG. 9 is a block diagram illustrating a detection apparatus in accordance with one embodiment of the present invention.

FIG. 9 is a block diagram illustrating a detection apparatus in accordance with one embodiment of the present invention.

As shown in FIG. 9, a personal computer 1 as the detection apparatus includes a central processing unit (CPU) 21, a read-only memory (ROM) 22, a random-access memory (RAM) 23, a bus 24, an input-output interface 25, an input unit 26, an output unit 27, a storage unit 28, a communication unit 29, a drive 30 and a removable medium 31.

The bus 24 connects to the CPU 21, the ROM 22, the RAM 23 and the input-output interface 25. The input-output interface 25 in turn connects to the bus 24, the input unit 26, the output unit 27, the storage unit 28, the communication unit 29 and the drive 30.

The CPU 21 performs a variety processes in accordance with a program stored on one of the ROM 22 and the storage unit 28. In response to an instruction input from the input unit 26, the CPU 21 performs a variety processes and output process results to the output unit 27.

The ROM 22 stores the program to be executed by the CPU 21.

The RAM 23 stores the program to be executed by the CPU 21 and data as necessary. The RAM 23 also includes a buffer that stores temporarily an image input from the outside.

The input unit 26 includes a keyboard, a mouse, a microphone, etc.

The output unit 27 includes a display, a loudspeaker, etc.

The storage unit 28, including a hard disk, stores the program to executed by the CPU 21 and a variety of data.

The communication unit 29 communicates with an external device via a network such as the Internet or a local area network.

The program may be acquired via the communication unit 29 and then stored on the storage unit 28.

When loaded with a removable medium 31 such as a magnetic disk, an optical disk, a magneto-optical disk, or a semiconductor memory, the drive 30 drives the loaded medium and acquires the program and data stored thereon. The acquired program and data are transferred to the storage unit 28 for storage as necessary.

Program recording medium storing the program installed onto the computer and made ready for operation by the computer include the removable medium 31. The removable medium 31 is one of package media including a magnetic disk (including flexible disk), an optical disk (such as compact-disk read-only memory (CD-ROM) or a digital versatile disk (DVD)), an magneto-optical disk and a semiconductor memory. The program recording media also include the ROM 22 or a hard disk forming the storage unit 28. The storage of the program onto the program recording medium is performed via the communication unit 29, such as a router and a modem, using wired or wireless communication media including a local area network, the Internet, and a digital broadcast satellite.

The personal computer 1 functions as a cut change detector 51 by executing the program stored on one of the ROM 22 and the storage unit 28.

Figure 10:
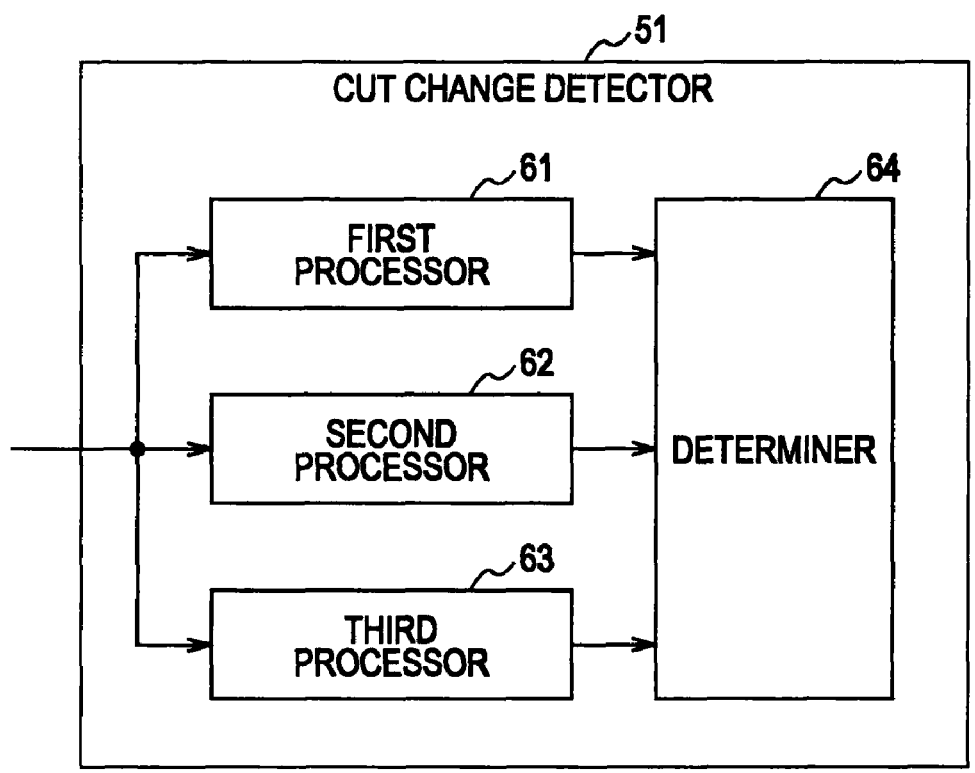
FIG. 10 is a block diagram illustrating a cut change detector in accordance with one embodiment of the present invention.

FIG. 10 is a block diagram illustrating the cut change detector 51 constructed of a software structure of the personal computer 1.

As shown in FIG. 10, the cut change detector 51 receives an image from the outside by reading the image from a buffer of the RAM 23 and performs a cut change detection process.

The cut change detector 51 includes a first processor 61, a second processor 62, a third processor 63 and a determiner 64.

Each of the first processor 61, the second processor 62 and the third processor 63 receives image data input to the cut change detector 51.

In response to the image data supplied, the first processor 61 performs a first process to be discussed later, and supplies a resulting first similarity to the determiner 64.

In response to the image data supplied, the second processor 62 performs a second process to be discussed later, and supplies a resulting second similarity to the determiner 64.

In response to the image data supplied, the third processor 63 performs a third process to be discussed later, and supplies a resulting third similarity to the determiner 64.

The determiner 64 performs a determination process to be discussed later, in response to the first similarity supplied from the first processor 61, the second similarity supplied from the second processor 62 and the third similarity supplied from the third processor 63.

The cut change detection process of the cut change detector 51 of FIG. 10 is described below with reference to a flowchart of FIG. 11.

The cut change detection process is initiated when a user issues a start command to start the cut change detection process.

In step S1, the first processor 61, the second processor 62 and the third processor 63 in the cut change detector 51 receive the image data from the buffer of the RAM 23.

Latest three frames received by the cut change detector 51 are referred a second latest frame, a first latest frame, and a current frame in chronological order.

In step S2, the first processor 61 performs the first process on the two frames received immediately before, namely, the first latest frame and the current frame, and then supplies the resulting first similarity to the determiner 64. In the first process, the similarity is calculated from a histogram and a spatial correlation image. The first process will be described in detail later with reference to FIGS. 12 through 35.

In step S3, the second processor 62 performs the second process on the two frames received immediately before, namely, the first latest frame and the current frame, and then supplies the resulting second similarity to the determiner 64. In the second process, the similarity is obtained by decimating a feature distribution. The second process will be described in detail later with reference to FIGS. 36 through 43.

In step S4, the third processor 63 performs the third process on the three frames received immediately before, namely, the second latest frame, the first latest frame and the current frame. The third processor 63 supplies the resulting third similarity to the determiner 64. In the third process, the similarity is calculated using an image resulting from synthesizing contracted images. The third process will be described in detail later with reference to FIGS. 44 through 51.

The first process through the third process in steps S2 through S4 are performed in parallel in practice.

In step S5, the determiner 64 performs the determination process based on the similarity of the first process supplied from the first processor 61, the similarity of the second process supplied from the second processor 62 and the similarity of the third process supplied from the third processor 63. The determiner 64 integrates the similarities determined in the first through third processes, thereby finally determining whether a target frame is a cut change or not. The determination process will be described in detail later with reference to FIGS. 28 through 31.

In step S6, the determiner 64 references the buffer of the RAM 23 and determines whether a next frame is available. If it is determined in step S6 that a next frame is available, processing returns to step S1 to repeat the above-described process.

If it is determined in step S6 that no next frame is available, the cut change detection process ends.

The first process is described below in detail.

FIG. 12 is a block diagram illustrating the first processor 61 of FIG. 10 in accordance with one embodiment of the present invention.

As shown in FIG. 12, the first processor 61 includes a histogram generator 101, a spatial correlation image generator 102, a buffer 103, a histogram similarity calculator 104 and a spatial correlation image similarity calculator 105.

The histogram generator 101 receives the image data of the first latest frame and the current frame to be processed in the first process by the first processor 61.

The histogram generator 101 generates one of a luminance histogram and a color histogram of each of the first latest frame and the current frame, and then supplies one of the generated luminance histogram and the color histogram to the buffer 103.

The luminance histogram includes a Y image histogram for a luminance signal (Y signal), and the color histogram includes histograms for an R image, a G image and a B image corresponding to red, green and blue (RGB) signals.

Generally, the color histogram permits cut change to be detected at higher accuracy.

The spatial correlation image generator 102 receives the first latest frame and the current frame to be processed in the first process by the first processor 61.

The spatial correlation image generator 102 generates a spatial correlation image representing a correlation between spatial layouts of the first latest frame and the current frame, and then supplies the spatial correlation image to the buffer 103.

The buffer 103 stores the histograms of the first latest frame and the current frame supplied from the histogram generator 101 while also storing the spatial correlation images of the first latest frame and the current frame supplied from the spatial correlation image generator 102.

The histogram similarity calculator 104 reads the histograms of the first latest frame and the current frame from the buffer 103, calculates a similarity between the histograms of the first latest frame and the current frame, and then supplies the resulting histogram similarity to the determiner 64.

The spatial correlation image similarity calculator 105 reads the spatial correlation images of the first latest frame and the current frame from the buffer 103, calculates a spatial correlation image similarity between the spatial correlation image of the first latest frame and the spatial correlation image of the current frame, and supplies the resulting spatial correlation image similarity to the determiner 64.

Figure 13:
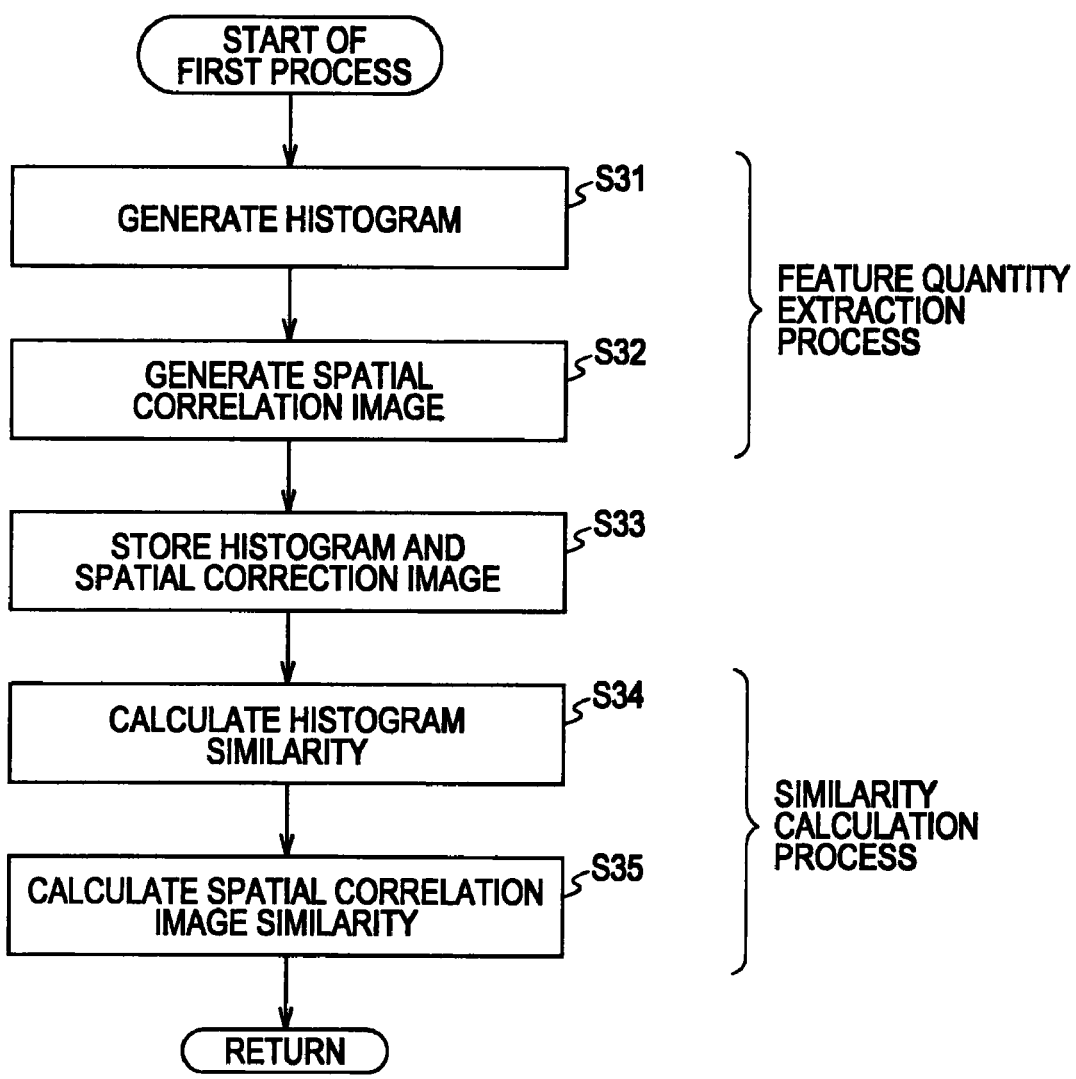
FIG. 13 is a flowchart illustrating a first process.

The first process of the first processor 61 of FIG. 12 is described below with reference to a flowchart of FIG. 13.

The histogram generator 101 receives the image data of the first latest frame and the current frame to be processed in the first process by the first processor 61. In step S31, the histogram generator 101 generates the histograms of the image data of the supplied first latest frame and current frame.

The spatial correlation image generator 102 receives the image data of the first latest frame and the current frame to be processed in the first process by the first processor 61. In step S32, the spatial correlation image generator 102 generates the spatial correlation image representing a correlation between the spatial layouts of the first latest frame and the current frame.

The histogram and the spatial correlation image are feature quantities representing a feature of an original image. Steps S31 and S32 are a feature quantity extraction process.

In step S33, the buffer 103 stores the histograms of the first latest frame and the current frame supplied from the histogram generator 101 while also storing the spatial correlation images of the first latest frame and the current frame supplied from the spatial correlation image generator 102.

In step S34, the histogram similarity calculator 104 reads the histograms of the first latest frame and the current frame from the buffer 103, calculates the histogram similarity between the histogram of the first latest frame and the histogram of the current frame, and then supplies the histogram similarity to the determiner 64. The generation of the histograms and the calculation of the similarity of the histograms will be specifically described later with reference to FIGS. 20, 21A-21C and 23A-23C.

In step S35, the spatial correlation image similarity calculator 105 reads the spatial correlation images of the first latest frame and the current frame from the buffer 103, calculates the spatial correlation image similarity between the spatial correlation image of the first latest frame and the spatial correlation image of the current frame, and then supplies the resulting spatial correlation image similarity to the determiner 64. Processing returns to step S2 of FIG. 11. The generation of the spatial correlation image and the calculation of the similarity of the spatial correlation images correspond to the generation of a filter image or a mosaic image and the calculation of the similarity, and are described with reference to FIGS. 20 through 22, 25, and 27A-27C.

A process of calculating the similarity between the feature quantities of the histograms and the spatial correlation images is hereinafter referred to as a similarity calculation process. Steps S34 and S35 of FIG. 13 is the similarity calculation process.

Figure 14:
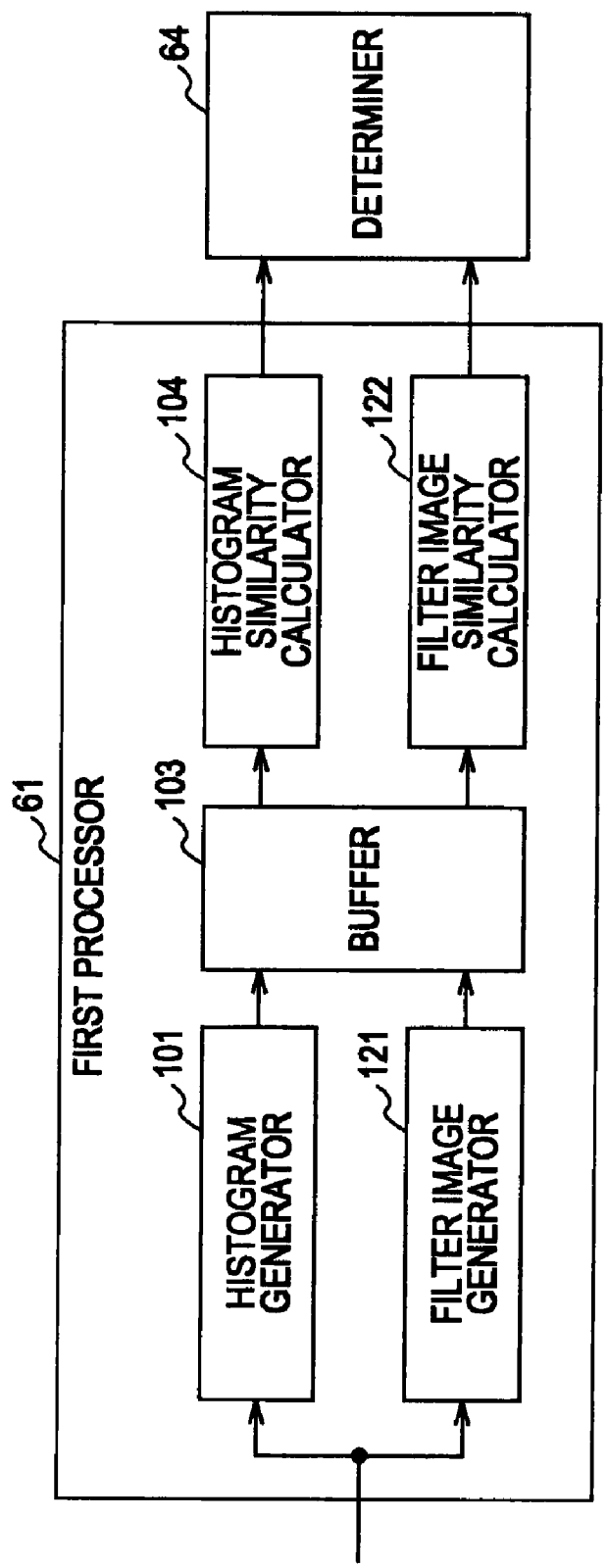
FIG. 14 is a functional block diagram illustrating a first processor in accordance with one embodiment of the present invention.

FIG. 14 is a functional block diagram illustrating another example of the first processor 61 of FIG. 10 in accordance with one embodiment of the present invention.

As shown in FIG. 14, elements identical to those illustrated in FIG. 12 are designated with the same reference numerals and the discussion thereof is omitted herein. The same is true of other drawings.

As shown in FIG. 14, the first processor 61 includes the histogram generator 101, the buffer 103, the histogram similarity calculator 104, a filter image generator 121 for the spatial correlation image generator 102 and a filter image similarity calculator 122 for the spatial correlation image similarity calculator 105.

The filter image generator 121 receives the images of the first latest frame and the current frame to be processed in the first process by the first processor 61.

The filter image generator 121 generates a filter image as the spatial correlation images from the first latest frame and the current frame supplied, and then supplies the resulting filter image to the buffer 103.

The filter image is an image that results from reducing a low frequency component and a high frequency component from a spatial frequency of an original image.

The filter image is obtained by filtering the image data with a filter. The filter has a low frequency cut effect to reduce a low frequency component, in particular, DC component and a high frequency cut effect to reduce a high frequency component. The high frequency cut effect blunts fine patterns.

The high frequency cut effect is achieved by partitioning the original image into a plurality of blocks, and by averaging pixel values in each block. The low frequency cut effect is achieved by subtracting an average value of all pixel values from each pixel value of the original image. The high frequency cut effect and the low frequency cut effect are provided by a precisely designed band-pass filter.

When the filter image is generated by reducing the high frequency component from the original image, the number of effective pixels is reduced. Spatial sampling rate is thus reduced by decimating actually ineffective pixels. Amount of data is also reduced, and the efficiency of calculation at subsequent stage is increased.

The filter image similarity calculator 122 reads the filter images of the first latest frame and the current frame from the buffer 103, calculates a filter image similarity between the filter images of the first latest frame and the current frame, and supplies the resulting filter image similarity to the determiner 64.

Figure 15:
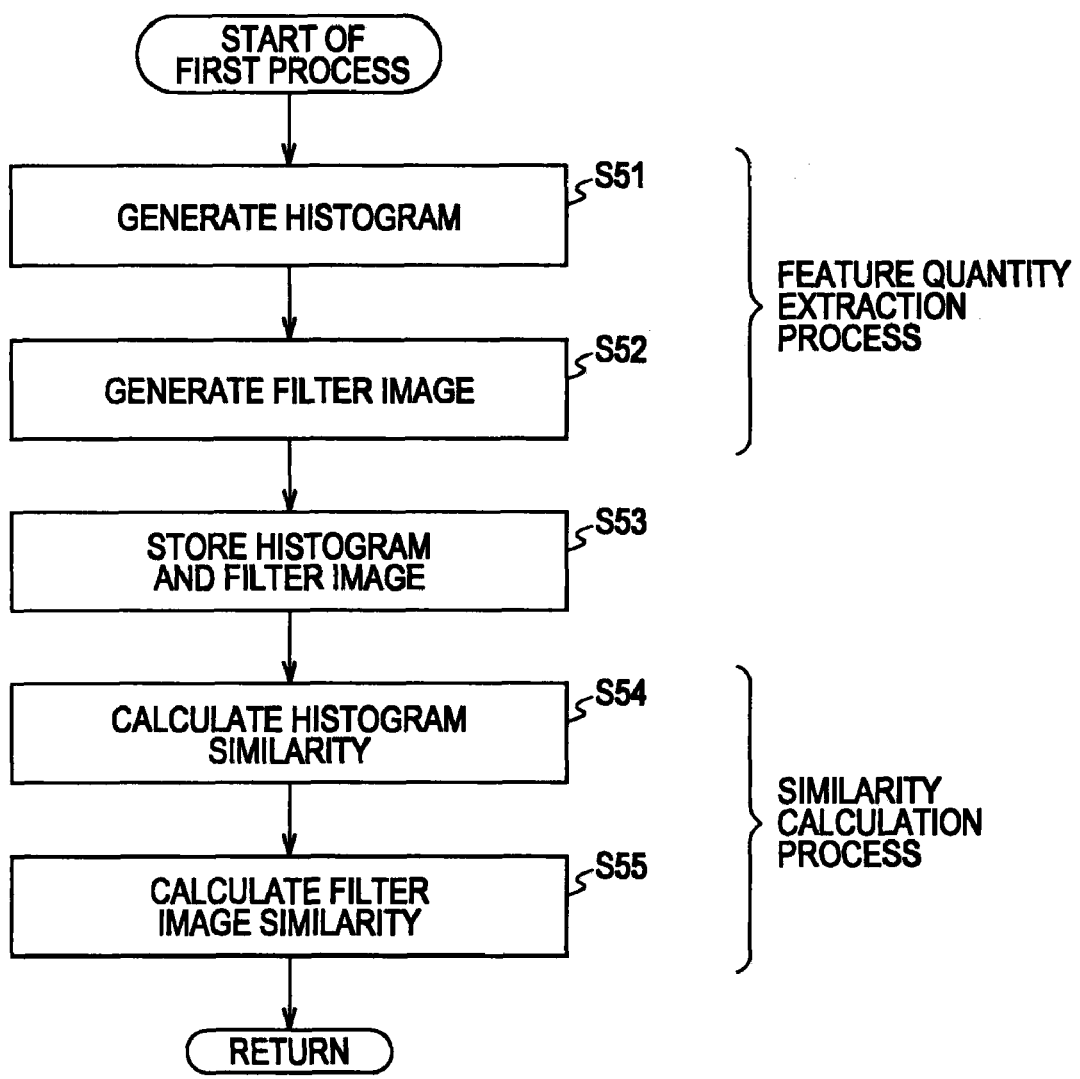
FIG. 15 is a flowchart illustrating the first process of the first processor of FIG. 14.

The first process of the first processor 61 of FIG. 14 is described below with reference to a flowchart of FIG. 15.

The histogram generator 101 of FIG. 14 receives the first latest frame and the current frame to be processed in the first process by the first processor 61. In step S51, the histogram generator 101 generates the histograms of the first latest frame and the current frame supplied, and then supplies the resulting histograms to the buffer 103.

The filter image generator 121 of FIG. 14 receives the first latest frame and the current frame to be processed in the first process by the first processor 61. In step S52, the filter image generator 121 generates as the spatial correlation images the filter images of the first latest frame and the current frame supplied, and then supplies the resulting filter images to the buffer 103.

Processes S51 and S52 are the feature quantity extraction process.

In step S53, the buffer 103 stores the histograms of the first latest frame and the current frame supplied from the histogram generator 101 while also storing the filter images of the first latest frame and the current frame supplied from the filter image generator 121.

In step S54, the histogram similarity calculator 104 reads the histograms of the first latest frame and the current frame from the buffer 103, calculates the histogram similarity between the histograms of the first latest frame and the current frame, and supplies the resulting histogram similarity to the determiner 64.

In step S55, the filter image similarity calculator 122 reads the filter images of the first latest frame and the current frame from the buffer 103, calculates the filter image similarity between the filter image of the first latest frame and the filter image of the current frame, and then supplies the filter image similarity to the determiner 64. Processing returns to step S2 of FIG. 11. The generation of the filter image and the calculation of the similarity of the filter images will be described later with reference to FIGS. 20, 22, and 25.

Steps S54 and S55 are the similarity calculation process.

Figure 16:
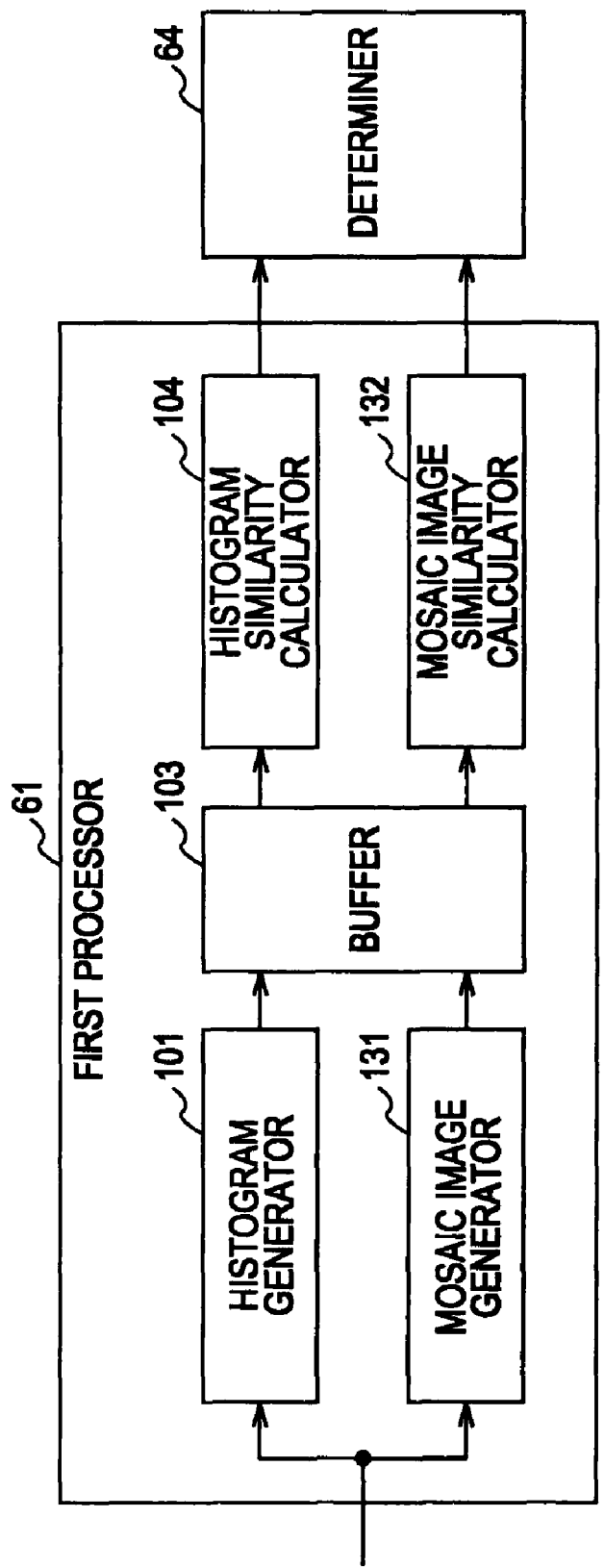
FIG. 16 is a functional block diagram illustrating a first processor in accordance with one embodiment of the present invention.

FIG. 16 is a functional block diagram illustrating of another example of the first processor 61 of FIG. 10 in accordance with one embodiment of the present invention.

As shown in FIG. 16, the first processor 61 includes the histogram generator 101, the buffer 103, the histogram similarity calculator 104, a mosaic image generator 131 for the spatial correlation image generator 102 and a mosaic image similarity calculator 132 for the spatial correlation image similarity calculator 105.

The mosaic image generator 131 receives the first latest frame and the current frame to be processed in the first process by the first processor 61. The mosaic image generator 131 generates, as spatial correlation images, mosaic images of the first latest frame and the current frame supplied, and supplies the resulting spatial correlation images to the buffer 103.

The mosaic image is produced by partitioning an original image into blocks, each block being a size of horizontal 8 pixels and vertical 8 pixels, or horizontal 32 pixels and vertical 32 pixels, and by representing each block by the average value of luminance or the average value of color of that block. The mosaic image is represented by rough spatial layouts of luminance or color of the original image. The entire image made of blocks of horizontal 8 pixels by vertical 8 pixels may also be referred to as a color layout.

The mosaic image similarity calculator 132 reads the mosaic images of the first latest frame and the current frame, calculates a mosaic image similarity between the mosaic image of the first latest frame and the mosaic image of the current frame, and supplies the resulting the mosaic image similarity to the determiner 64.

Figure 17:
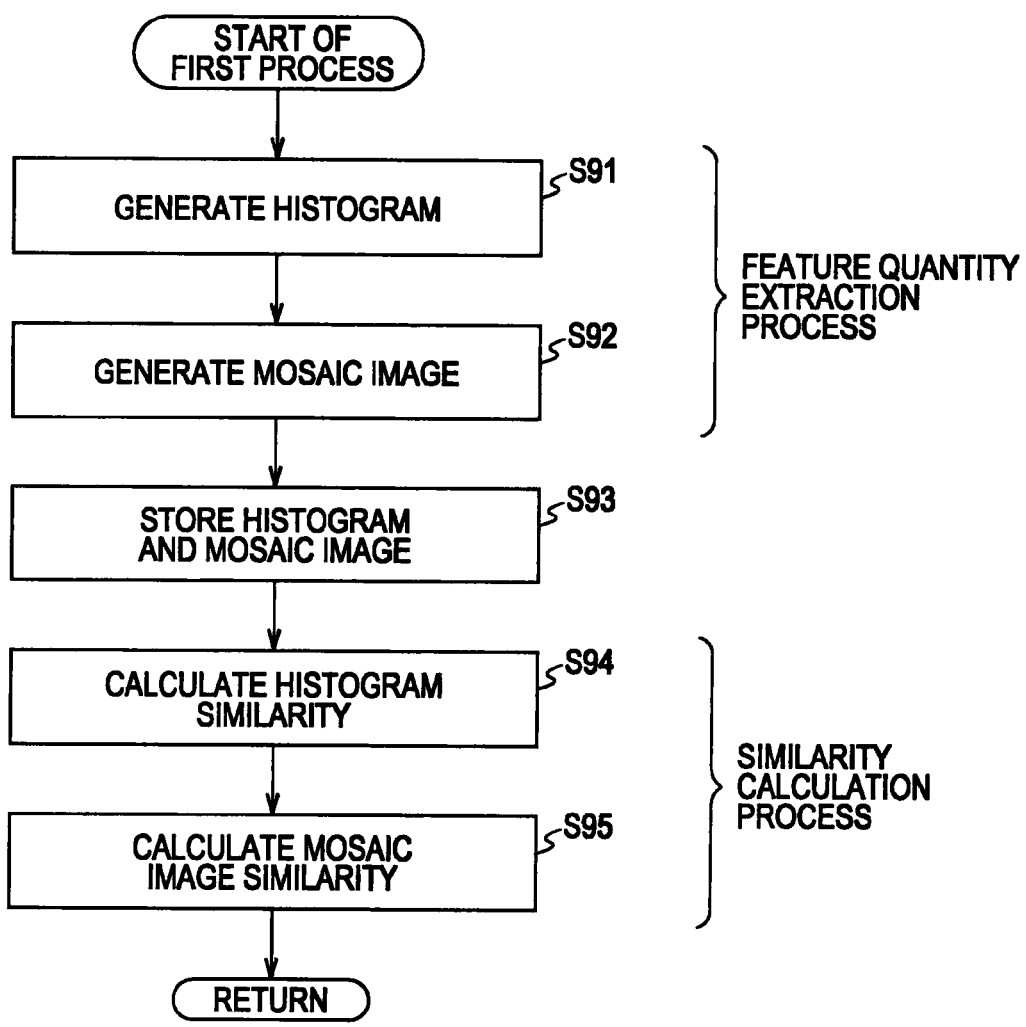
FIG. 17 is a flowchart illustrating the first process of the first processor of FIG. 16.

The first process of the first processor 61 of FIG. 16 is described below with reference to a flowchart of FIG. 17.

The histogram generator 101 receives the first latest frame and the current frame to be processed in the first process by the first processor 61. In step S91, the histogram generator 101 generates the histograms of the first latest frame and the current frame supplied, and then supplies the resulting histograms to the buffer 103.

The mosaic image generator 131 receives the first latest frame and the current frame to be processed in the first process by the first processor 61. In step S92, the mosaic image generator 131 generates as the spatial correlation image the mosaic images of the first latest frame and the current frame supplied and then supplies the resulting mosaic image to the buffer 103.

Steps S91 and S92 are the feature quantity extraction process.

In step S93, the buffer 103 stores the histograms of the first latest frame and the current frame supplied from the histogram generator 101 while also storing the mosaic images of the first latest frame and the current frame supplied from the mosaic image generator 131.

In step S94, the histogram similarity calculator 104 reads the histograms of the first latest frame and the current frame from buffer 103, calculates the histogram similarity between the histogram of the first latest frame and the histogram of the current frame, and then supplies the resulting histogram similarity to the determiner 64.

In step S95, the mosaic image similarity calculator 132 reads the mosaic images of the first latest frame and the current frame from the buffer 103, calculates the mosaic image similarity between the mosaic image of the first latest frame and the mosaic image of the current frame, and then supplies the resulting mosaic image similarity to the determiner 64. Processing returns to step S2 of FIG. 11. The generation of the mosaic image and the calculation of the similarity of the mosaic images will be described later with reference to FIGS. 20, 21A-21C, and 27A-27C.

Steps S94 and S95 are the similarity calculation process.

Figure 18:
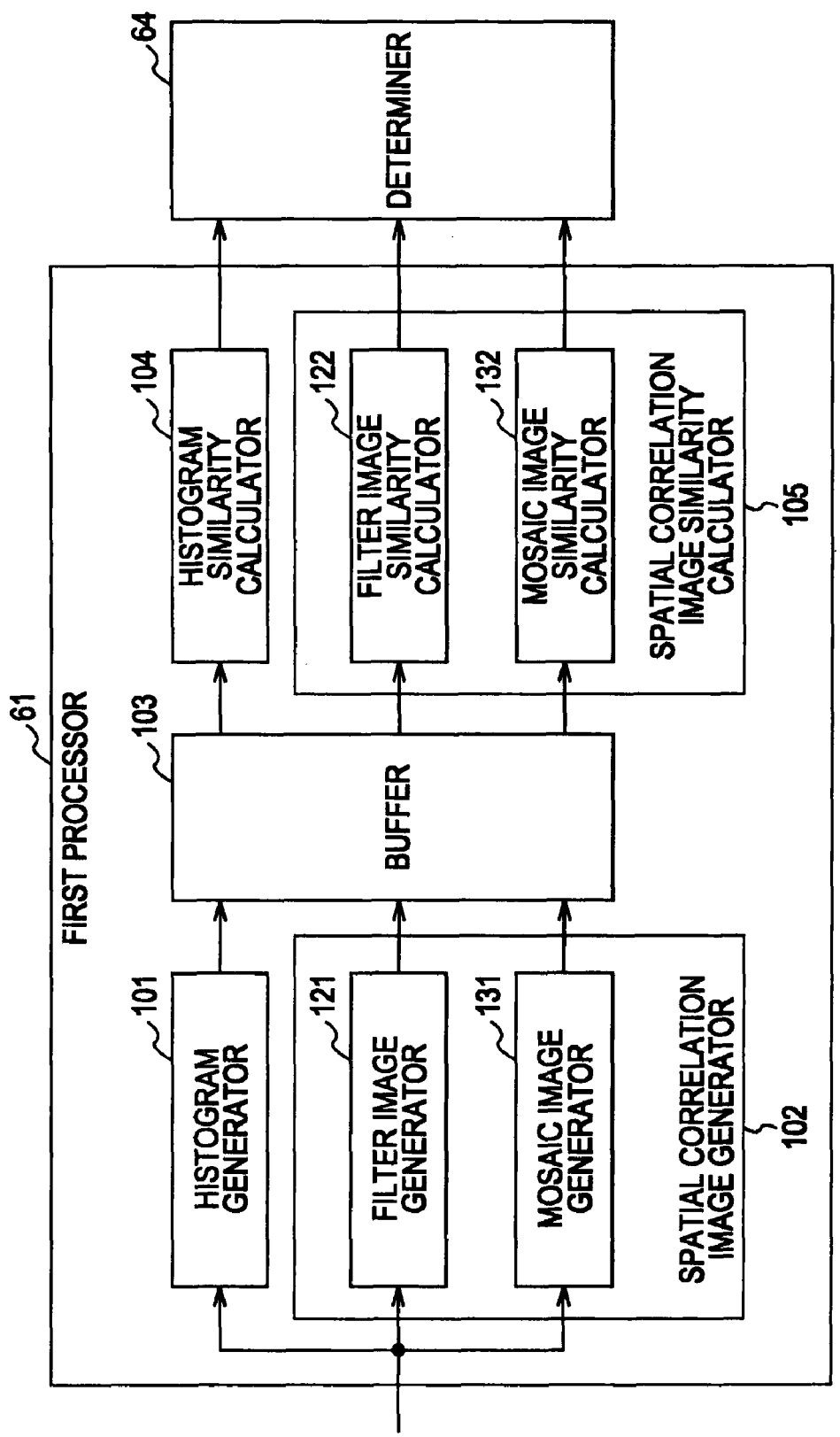
FIG. 18 is a functional block diagram illustrating a first processor in accordance with one embodiment of the present invention.

FIG. 18 is a functional block diagram illustrating another example of the first processor 61 of FIG. 10 in accordance with one embodiment of the present invention.

As shown in FIG. 18, the first processor 61 includes the histogram generator 101, the spatial correlation image generator 102, the buffer 103, the histogram similarity calculator 104 and the spatial correlation image similarity calculator 105. The spatial correlation image generator 102 includes the filter image generator 121 and the mosaic image generator 131. The spatial correlation image similarity calculator 105 includes the filter image similarity calculator 122 and the mosaic image similarity calculator 132.

The first process of the first processor 61 of FIG. 18 is described below with reference to a flowchart of FIG. 19.

The histogram generator 101 receives the first latest frame and the current frame to be processed in the first process by the first processor 61. In step S121, the histogram generator 101 generates the histograms of the first latest frame and the current frame supplied and then supplies the generated histograms to the buffer 103. This process is identical to each of step S31 of FIG. 13, step S51 of FIG. 15, and step S91 of FIG. 17.

Figure 20:
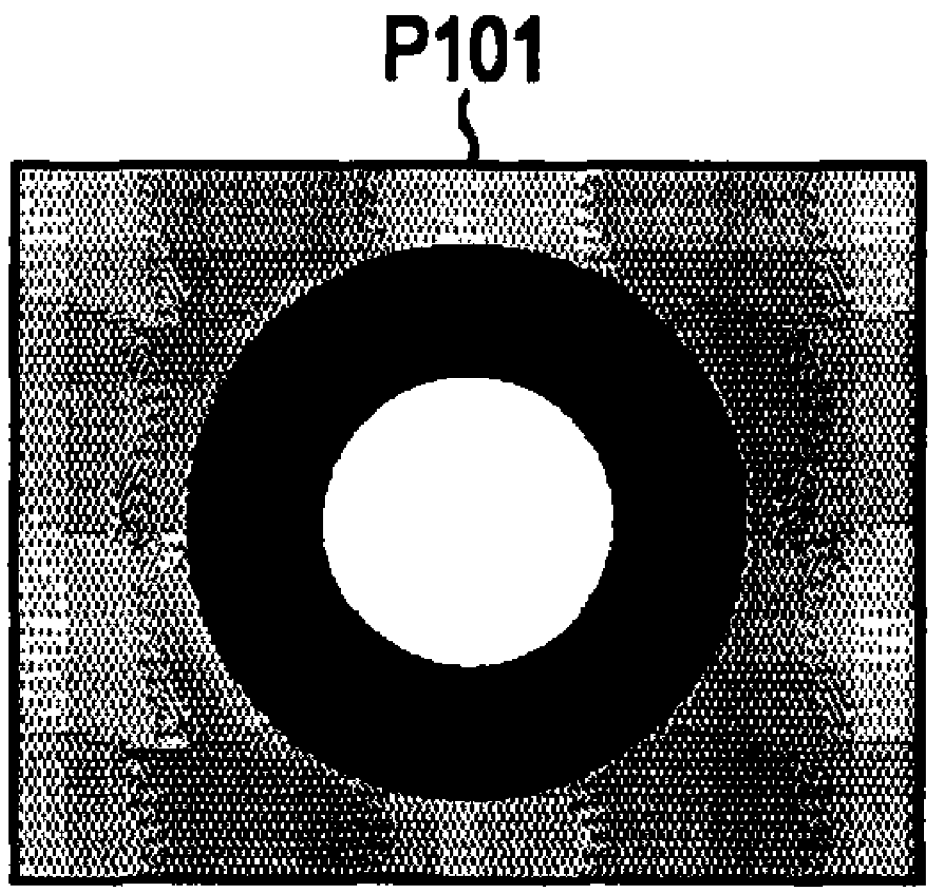
FIG. 20 illustrates an original image.
Figures 21A, 21B, 21C:
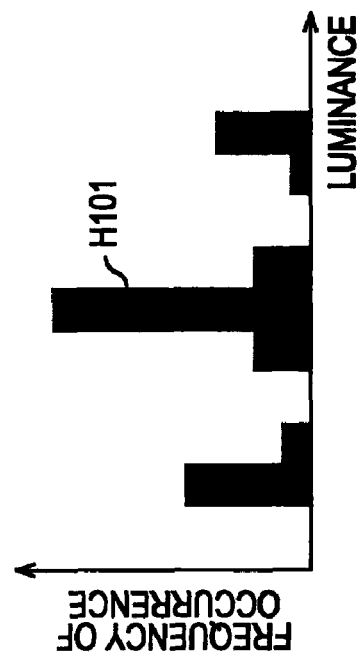
FIGS. 21A-21C illustrate a histogram, a filter image and a mosaic image.

When the image data of an original image P101 of FIG. 20 is received, a histogram of FIG. 21A is generated.

The abscissa represents luminance and the ordinate represents frequency of occurrence in FIG. 21A. The original image P101 is composed of a gray background, and white and black circle regions. The histogram H101 contains relatively low luminance (black), intermediate luminance (gray) and relatively high luminance (white) at high frequency of occurrence.

The spatial correlation image generator 102 receives the first latest frame and the current frame to be processed in the first process by the first processor 61. The first latest frame and the current frame are supplied to each of the filter image generator 121 and the mosaic image generator 131.

In step S122, the filter image generator 121 generates as the spatial correlation images the filter images of the first latest frame and the current frame supplied. This process is identical to step S52 of FIG. 15.

Figure 22:
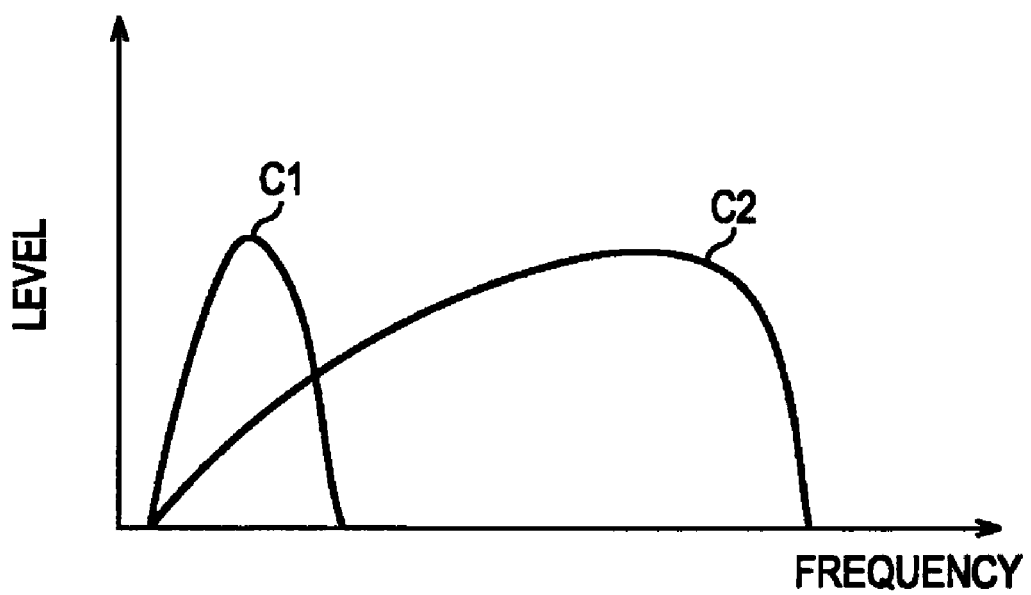
FIG. 22 illustrates filter characteristics of a filter generating a filter image.

More specifically, the filter image generator 121 generates the filter image by applying a filter having characteristics C1 illustrated in FIG. 22 to the input image data. As shown in FIG. 22, the abscissa represents frequency and the ordinate represents level of image data output from the filter.

As shown in FIG. 22, the filter characteristics C1 are those of a filter that produces the filter image and filter characteristics C2 are those of a filter that detects edges.

When the filter image is generated through the filter characteristics C1, a low to intermediate frequency component without DC component is output. This process is different from an edge extraction process that extracts an intermediate to high frequency component through the filter characteristics C2. The filter image, different from an image with edge removed therefrom, uses the feature of the relatively low to intermediate frequency component.

A filter image PF101 of FIG. 21B is generated by filtering the original image P101 of FIG. 20. With the low frequency cut effect, the filter image PF101 has a small value in an area where a change in luminance in the original image P101 is small, and a large value in an area where a change in luminance in the original image P101 is large. For example, the outline of the black ring circle of the original image P101 has a relatively small value. With the high frequency cut effect, the filter image PF101 is generally slightly blurred.

In step S123, the mosaic image generator 131 generates as the spatial correlation image the mosaic images of the first latest frame and the current frame. Step S123 is identical to step S92 of FIG. 17.

The mosaic image generator 131 partitions the filter image PF101 into a plurality of blocks, and represents each block by an average pixel value of that block. As shown in FIG. 21C, a mosaic image PM101 having 10×8 blocks is thus generated.

The mosaic image PM101 roughly represents the spatial layout of luminance or color of the original image P101.

Figure 19:
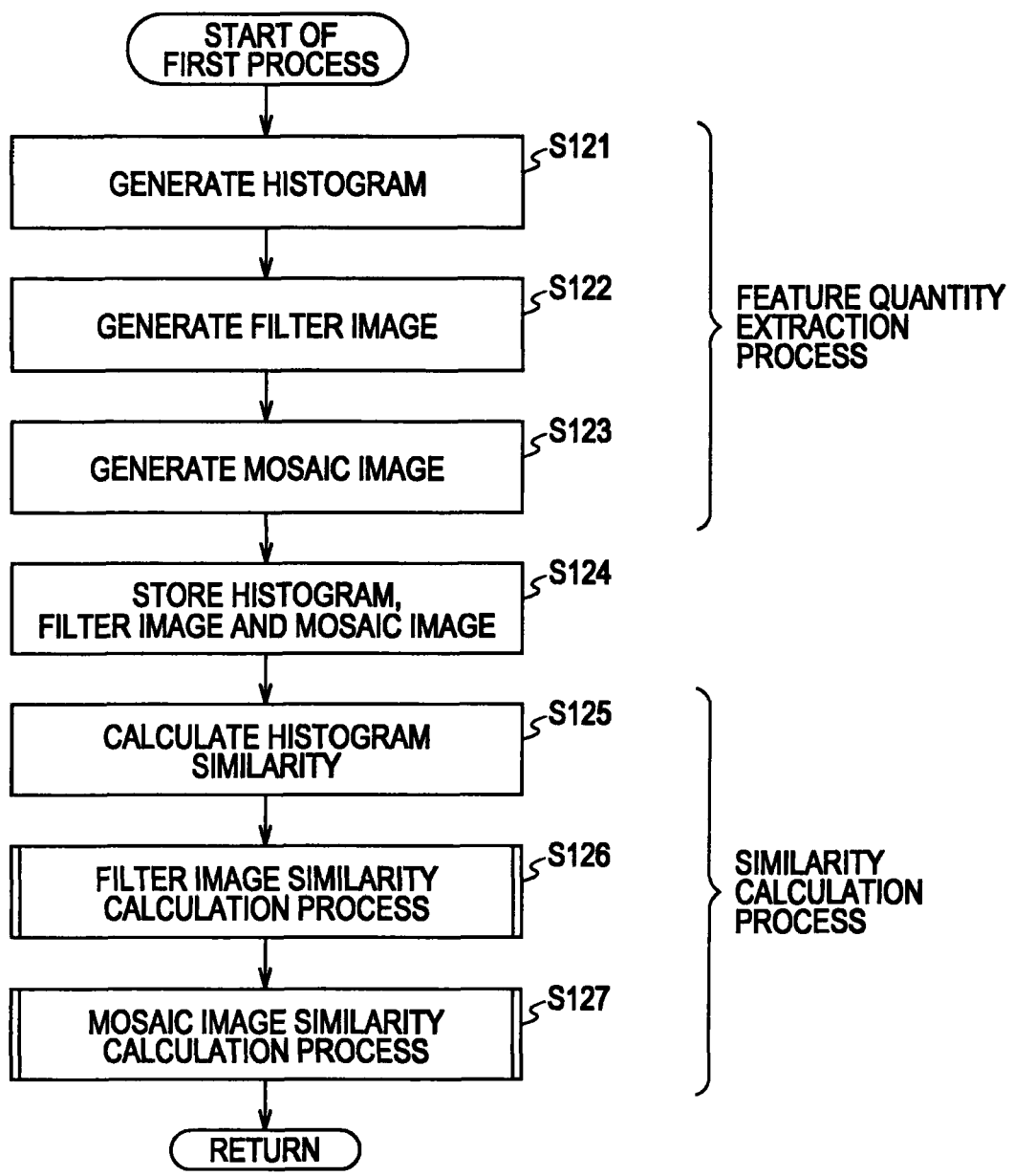
FIG. 19 is a flowchart illustrating the first process of the first processor of FIG. 18.

Steps S121 through S123 of FIG. 19 are the feature quantity extraction process.

In step S124, the buffer 103 stores the histograms of the first latest frame and the current frame supplied from the histogram generator 101, the filter images of the first latest frame and the current frame supplied from the filter image generator 121 and the mosaic images of the first latest frame and the current frame supplied from the mosaic image generator 131.

In step S125, the histogram similarity calculator 104 reads the histograms of the first latest frame and the current frame from the buffer 103, calculates the histogram similarity between the histogram of the first latest frame and the histogram of the current frame, and supplies the resulting histogram similarity to the determiner 64. Step S125 is identical to each of step S34 of FIG. 13, step S54 of FIG. 15 and step S94 of FIG. 17.

The histogram similarity is an overlapping ratio of the histograms of the first latest frame and the current frame.

Figure 23:
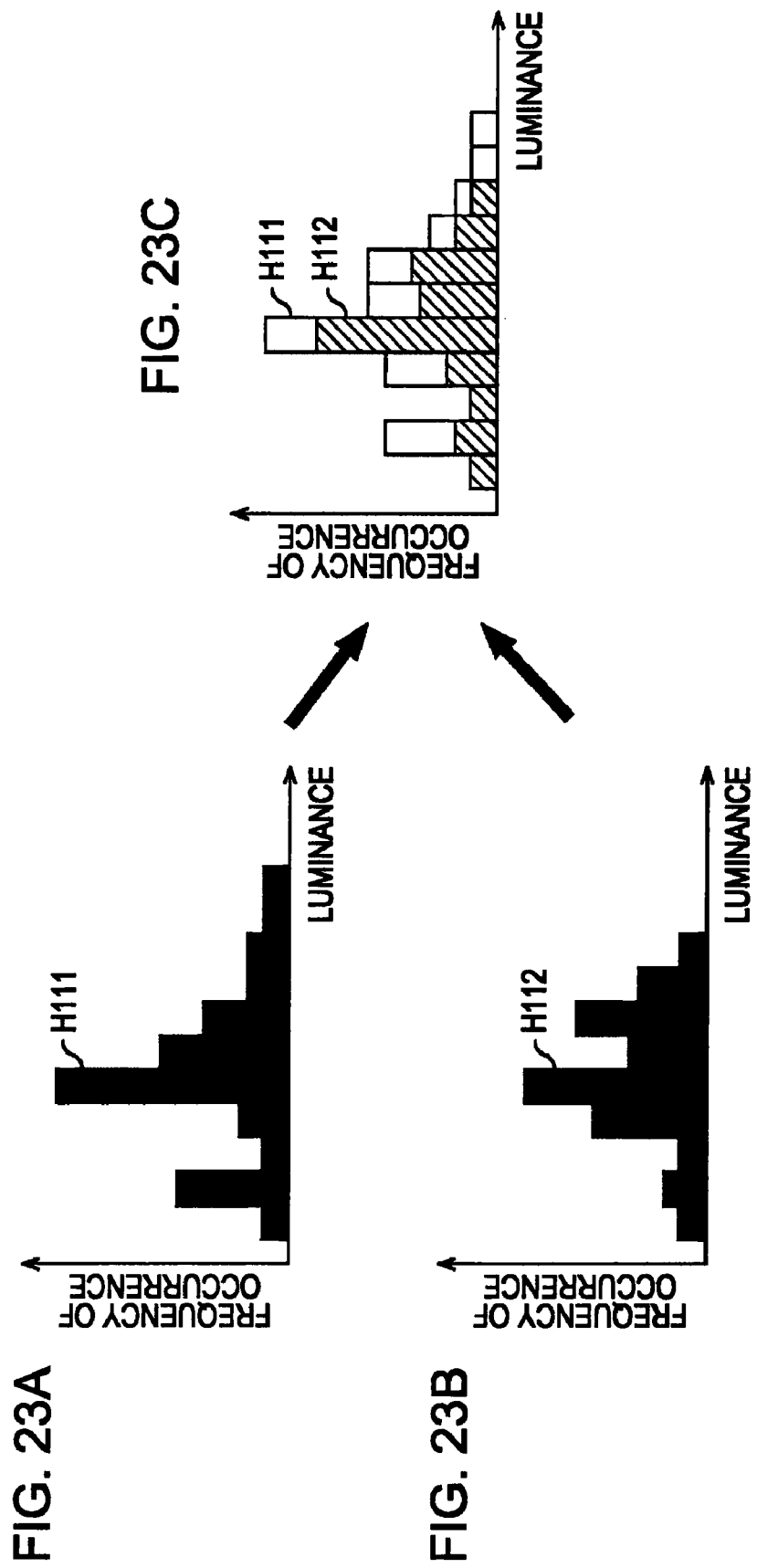
FIGS. 23A-23C illustrate an overlapping rate of histograms.

As shown in FIG. 23, an overlapping ratio of histogram H111 and histogram H112 is an area that the histogram H111 and the histogram H112 have in common (as represented by areas of the histograms hatched).

The histogram similarity may be a similarity between vectors containing the frequency of occurrence of each elements (in the bin) of the histograms (hereinafter referred to as histogram vectors). The similarity between the histogram vectors may be an absolute distance of the histogram vectors, namely, Manhattan distance (identical to the overlapping ratio of the histograms) or Euclidean distance that is squared distance between the histograms.

The histogram similarity is a similarity of the histograms having almost no information relating to a shape of a subject to be photographed and spatial layout of the subject. The histogram similarity is less likely to be affected from the position, posture and shape change. The histogram similarity, because of the sensitivity thereof to the brightness and color change, may be used as a similarity quantizing the brightness and color change.

In step S126, the filter image similarity calculator 122 reads the filter images of the first latest frame and the current frame from the buffer 103, calculates the filter image similarity between the filter image of the first latest frame and the filter image of the current frame, and then supplies the resulting the filter image similarity to the determiner 64. Step S126 is identical to step S55 of FIG. 13.

Figure 24:
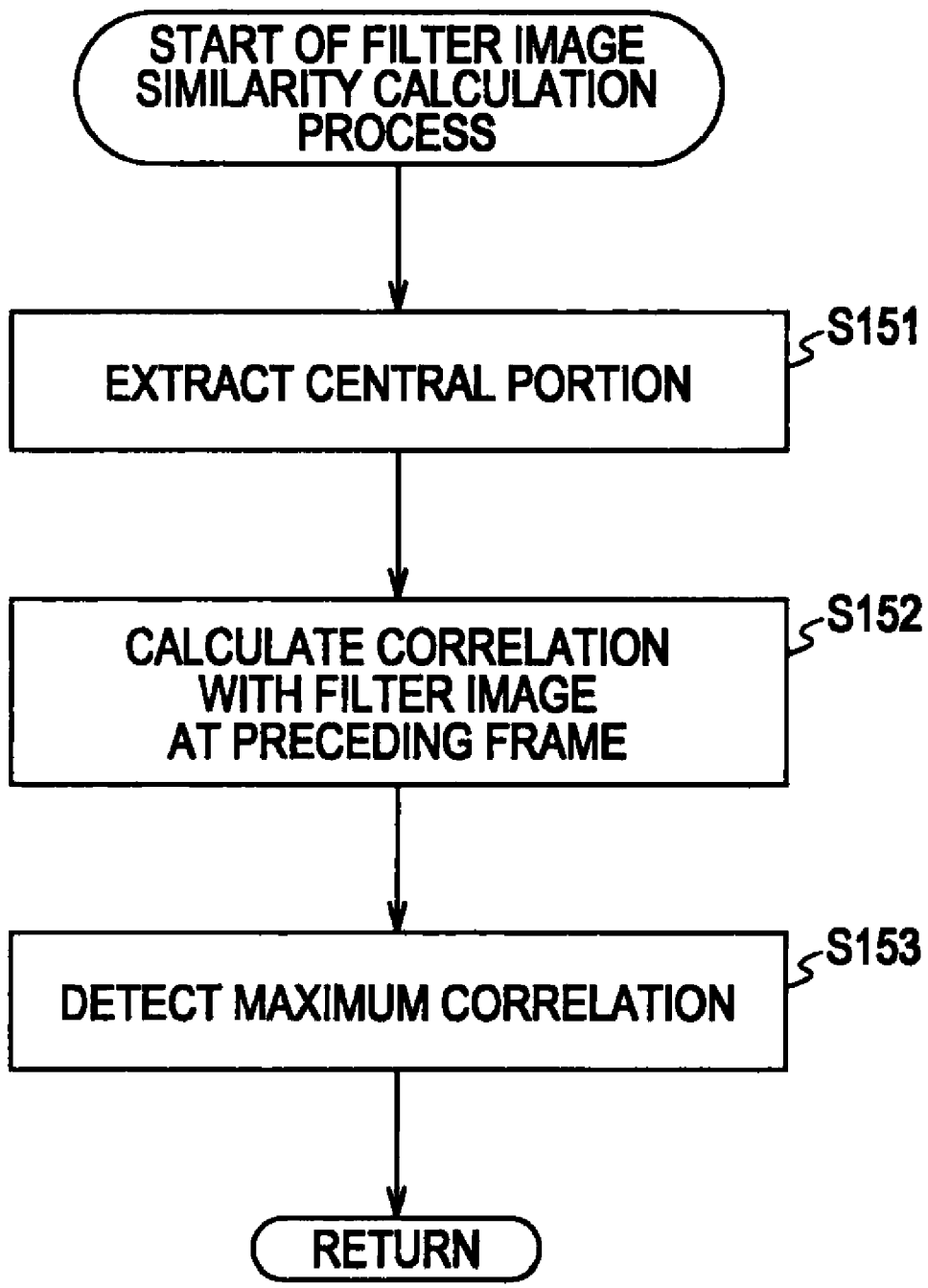
FIG. 24 is a flowchart illustrating a similarity calculation process for calculating similarity of images.

The filter image similarity calculation process is illustrated in a flowchart of FIG. 24.

The filter image similarity calculator 122 reads the filter images of the first latest frame and the current frame from the buffer 103, and extracts a central portion of the filter image of the first latest frame in step S151, for example.

In step S152, the filter image similarity calculator 122 relatively shifts the central portion of the first latest frame extracted in step S151 with respect to the filter image of the current frame while calculating a correlation value between the central portion of the filter image of the first latest frame and the filter image of the current frame.

In step S153, the filter image similarity calculator 122 detects a maximum correlation value of the correlation values calculated in step S152.

Figure 25:
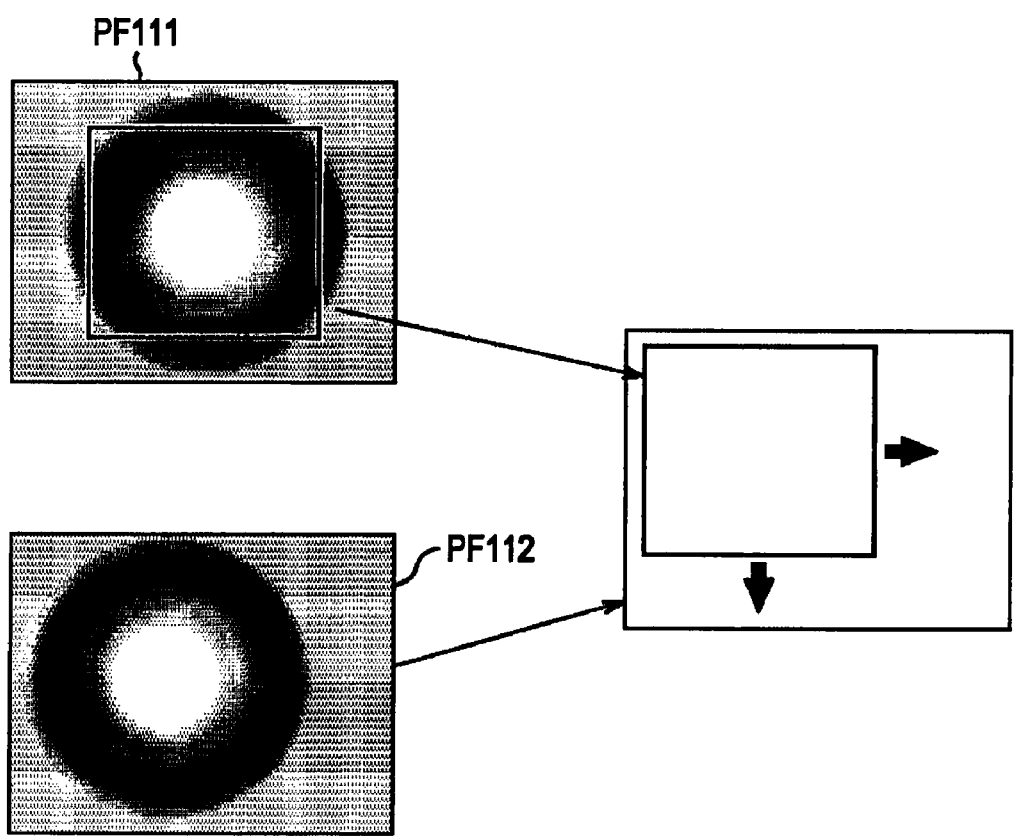
FIG. 25 illustrates a search operation for searching for a maximum correlation value.

More specifically, as shown in FIG. 25, the central portion of a filter image PF111 of a frame F111 as the first latest frame is extracted. The central portion of the filter image PF111 is relatively shifted with a filter image PF112 of a frame F112 as the current frame. A relative position maximizing the correlation between the central portion of the filter image PF111 and the filter image PF112 is searched, and a maximum correlation value is thus obtained.

Alternatively, absolute distance of the filter images in whole or in part (sum of absolute differences) or squared distance of the filter images in whole or in part (sum of squared differences) is calculated, and a minimum value of the calculation results (hereinafter referred to as minimum distance) is calculated. The minimum value may be used for the filter image similarity. The minimum distance, as is, represents non-similarity between the filter images, and needs to be converted to similarity by inverting a sign thereof, for example.

The filter image similarity is a similarity between the filter images with the DC component reduced therefrom, and is not affected at all by the brightness and color change such as a change in luminance of the entire image. The filter image similarity is a similarity between the filter images with the high frequency component thereof reduced, and is thus not affected by a change in fine patterns. The filter image similarity thus quantizes the position, posture and shape change.

The filter image similarity results from the maximum correlation value or the minimum distance of the filter image of the first latest frame and the filter image of the current frame. The filter image similarity is thus less affected by a change in image due to camera motion or movement of a subject being photographed.

Figure 1A:
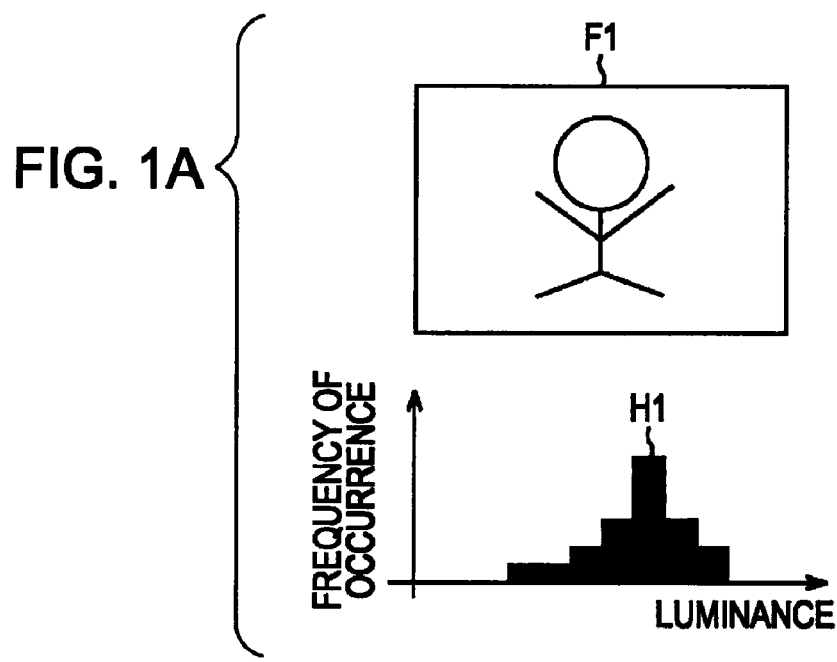
FIGS. 1A and 1B illustrate histograms in which the brightness level of the entire image changes.
Figure 1B:
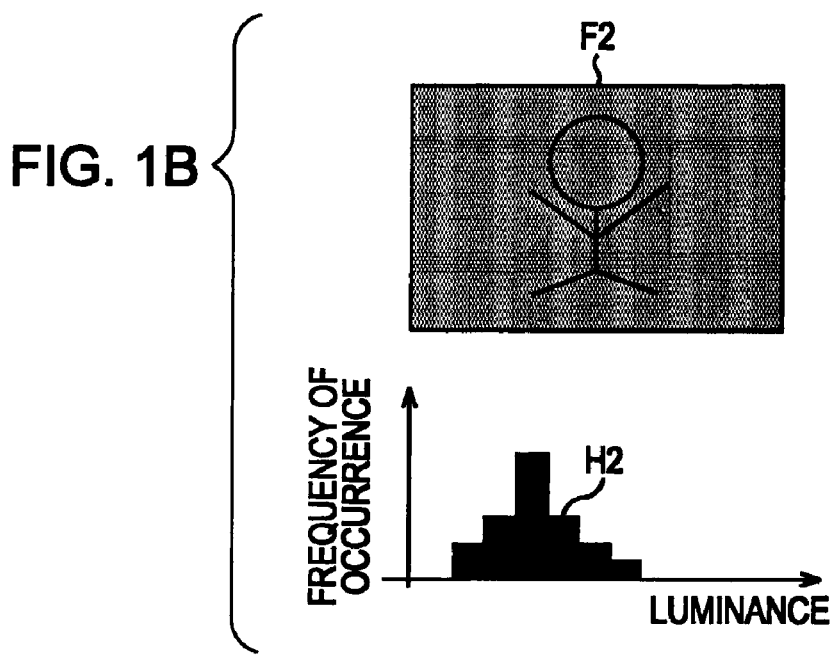

Since the filter image similarity is almost unaffected by a change in brightness of the entire image. As shown in FIG. 1, a drop in the histogram similarity is compensated for when luminance of the entire image changes.

Returning to FIG. 19, in step S127, the mosaic image similarity calculator 132 reads the mosaic images of the first latest frame and the current frame from the buffer 103, calculates the mosaic image similarity between the mosaic image of the first latest frame and the mosaic image of the current frame, and supplies the calculated mosaic image similarity to the determiner 64. Processing returns to step S2 of FIG. 11.

Steps S125 through S127 of FIG. 12 are the similarity calculation process.

Figure 26:
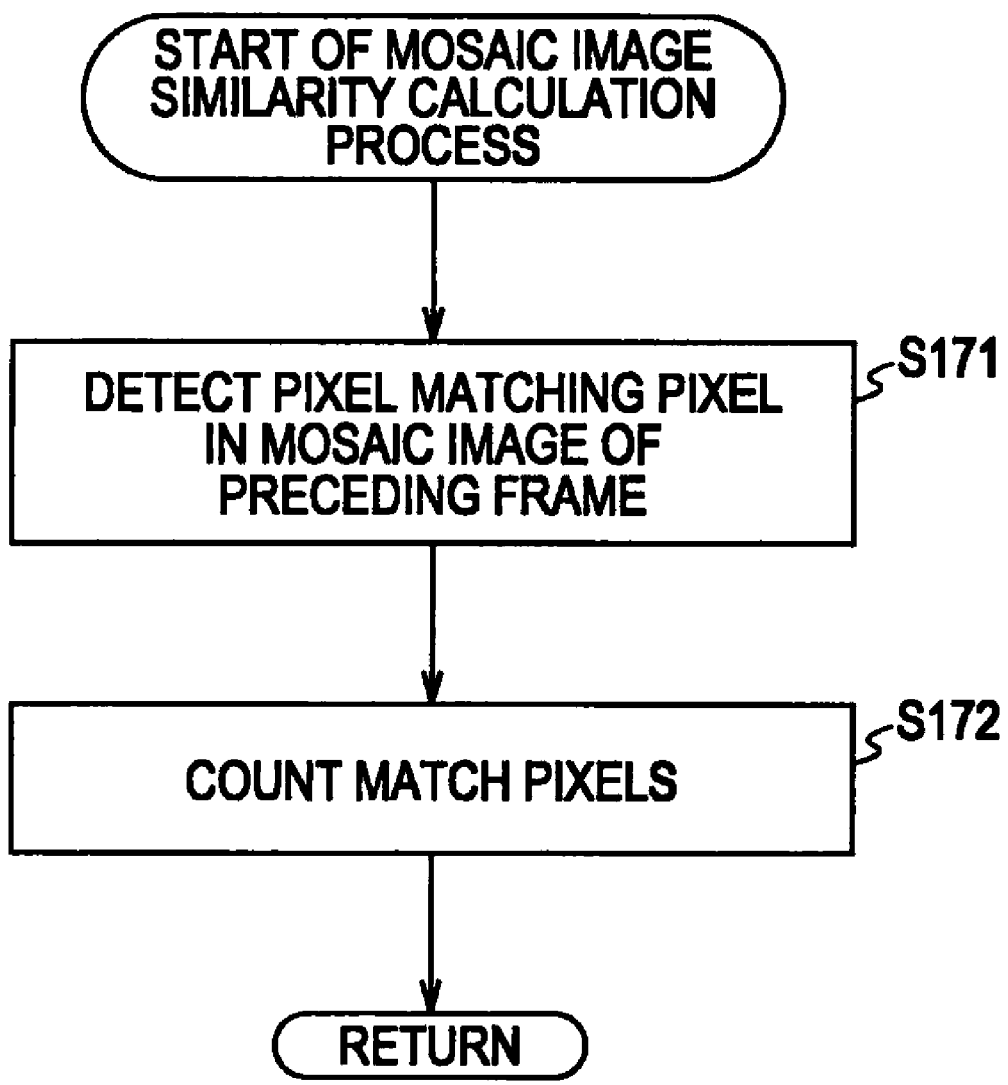
FIG. 26 is a flowchart illustrating a similarity calculation process for calculating similarity of mosaic images.

The mosaic image similarity calculation process is illustrated in a flowchart of FIG. 26.

The mosaic image similarity calculator 132 reads the mosaic images of the first latest frame and the current frame from the buffer 103. In step S171, the mosaic image similarity calculator 132 detects, as match pixels, corresponding pixels of the mosaic image of the first latest frame and the mosaic image similarity of the current frame having a difference value equal to or lower than a predetermined threshold value.

In step S172, the mosaic image similarity calculator 132 determines the number of match pixels detected in step S171 or a ratio of the number of match pixels to all the pixels.

FIG. 27 illustrates counting of the match pixels. As shown, the blank circle symbol represents a match pixel and the letter x represents an unmatch pixel between a mosaic image PM111 and a mosaic image PM112.

The mosaic image similarity does not quantize a difference between the pixels of the two mosaic images. As shown in FIG. 27, a ticker, not occurring in the mosaic image PM111, appears in the mosaic image PM112, thereby causing corresponding pixels in the mosaic image PM112 to have values substantially different from other pixel. The mosaic image similarity thus prevents such pixels from becoming predominant over the other pixels.

Figure 2A:
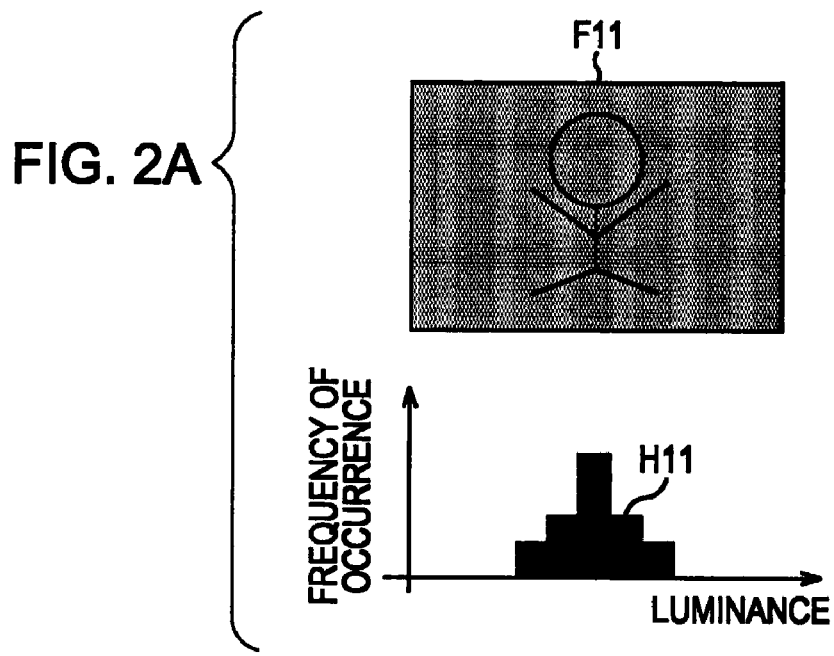
FIGS. 2A and 2B illustrate a change in histograms in response to an appearance of a ticker.
Figure 2B:
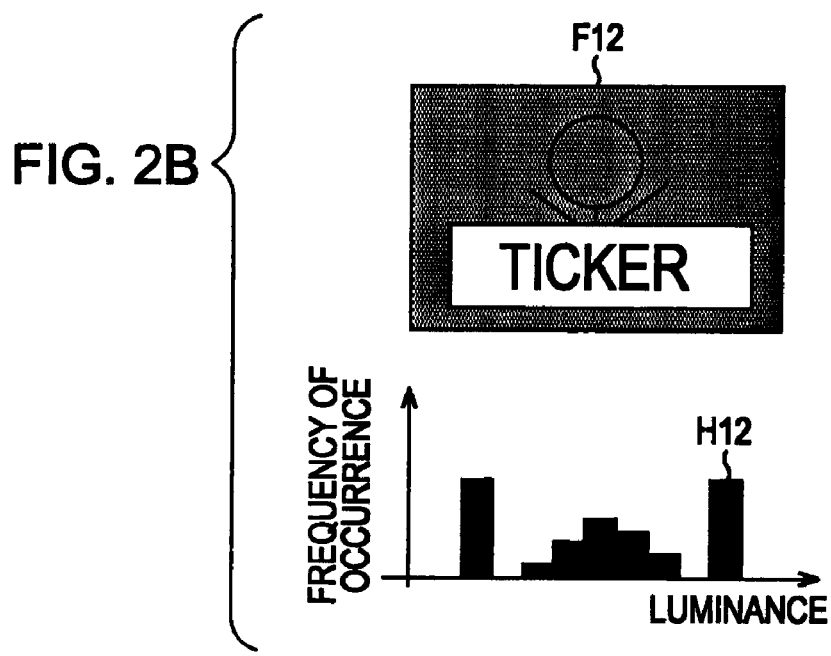
Figure 4:
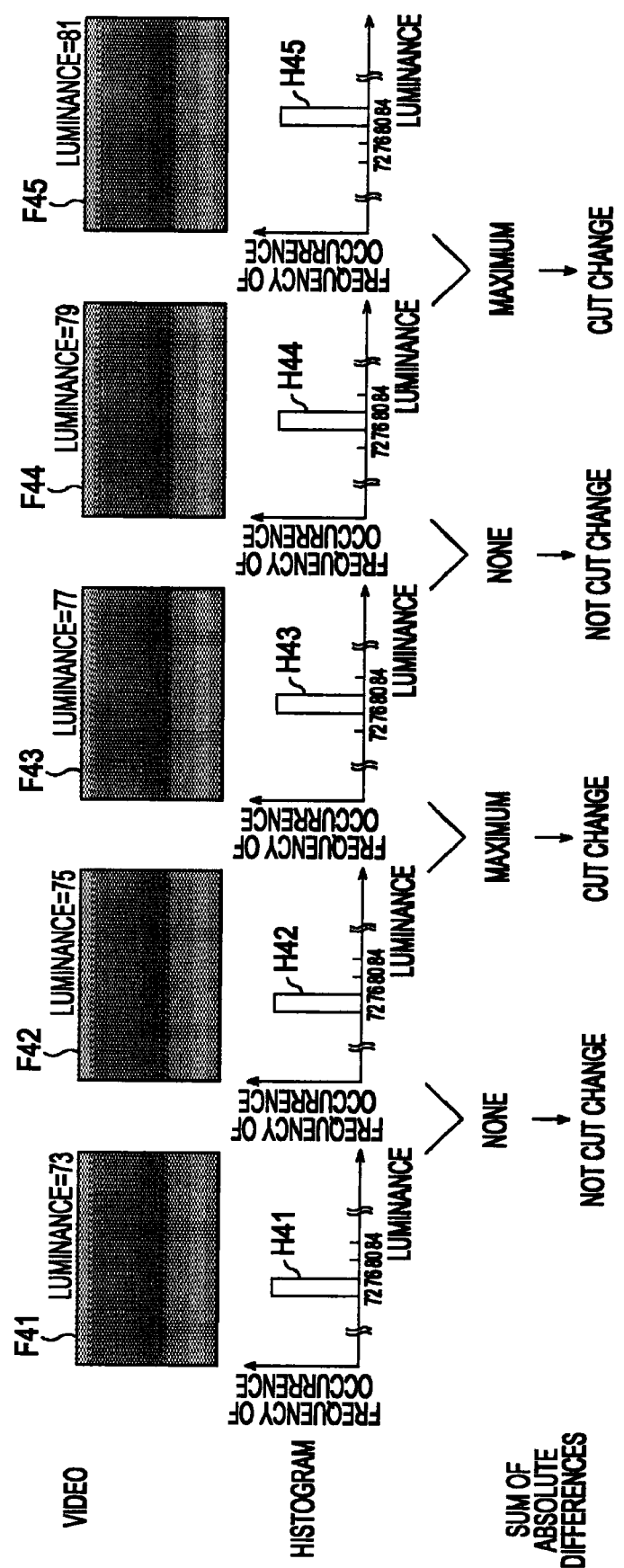
FIG. 4 illustrates a change in histograms in response to a slight change in luminance.

The mosaic image similarity having low sensitivity to the appearance triggered change compensate for a drop in the histogram similarity when a ticker appears as shown in FIG. 2.

The filter image or the mosaic image is generated as the spatial correlation image representing the correlation between the spatial layouts of the two image to be processed for cut change detection. The brightness and color change and the appearance triggered change such as the appearance of a ticker are not misdetected as a cut change. A sound cut change detection method is thus provided.

As shown in FIG. 10, the determiner 64 performs final determination process based on the information relating to the similarities supplied from the first processor 61, the second processor 62 and the third processor 63. The determiner 64 discussed herein performs the determination process based on only the similarity supplied from the first processor 61 of FIG. 18.

Figure 28:
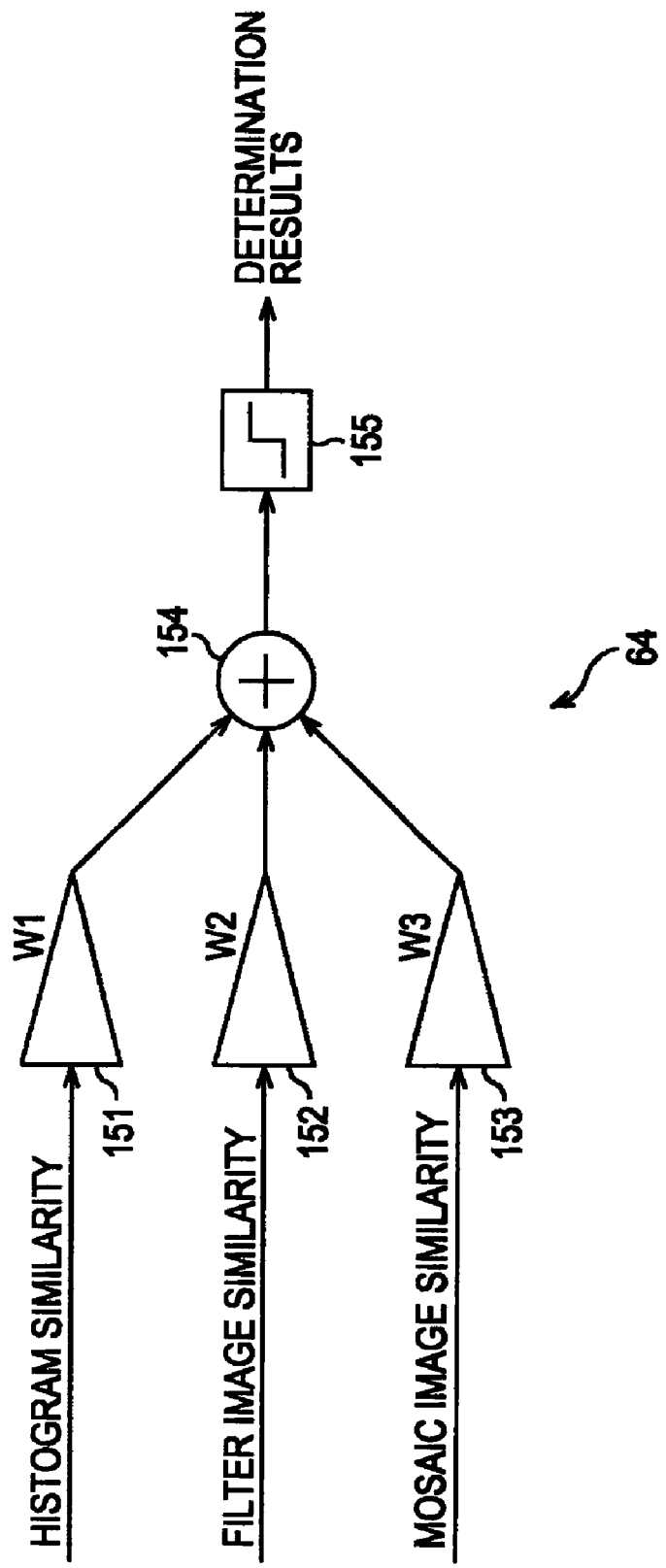
FIG. 28 is a block diagram illustrating a determiner in accordance with one embodiment of the present invention.

FIG. 28 is a functional block diagram illustrating the determiner 64 that performs the determination process based on only the similarity supplied from the first processor 61.

As shown in FIG. 28, the determiner 64 includes weight processors 151 through 153, an adder 154 and a threshold determiner 155.

The weight processor 151 receives, from the histogram similarity calculator 104 in the first processor 61 of FIG. 18, histogram similarity information representing the filter image similarity between the first image and the second image to be processed for cut change detection.

The weight processor 151 multiples the supplied histogram similarity information by a predetermined weight coefficient W1 and then supplies the resulting weighted histogram similarity information to the adder 154.

The weight processor 152 receives, from the filter image similarity calculator 122 in the first processor 61 of FIG. 18, filter image similarity information representing the filter image similarity between the first image and the second image to be processed for cut change detection.

The weight processor 152 multiplies the supplied filter image similarity information by a predetermined weight coefficient W2 and then supplies the resulting weighted filter image similarity information to the adder 154.

The weight processor 153 receives, from the mosaic image similarity calculator 132 in the first processor 61 of FIG. 18, mosaic image similarity information representing the mosaic image similarity between the first image and the second image to be processed for cut change detection.

The weight processor 153 multiples the supplied mosaic image similarity information by a predetermined weight coefficient W3 and then supplies the resulting weighted mosaic image similarity information to the adder 154.

The adder 154 sums the weighted histogram similarity information received from the weighted weight processor 151, the weighted filter image similarity information received from the weight processor 152 and the weighted mosaic image similarity information received from the weight processor 153 and supplies summed similarity information representing summed similarities to the threshold determiner 155.

The threshold determiner 155 compares the summed similarity information supplied from the adder 154 with a predetermined threshold value, thereby determining whether the border between the first image and the second image is a cut change that is a border involved in a discrete change in the image in time.

Figure 29:
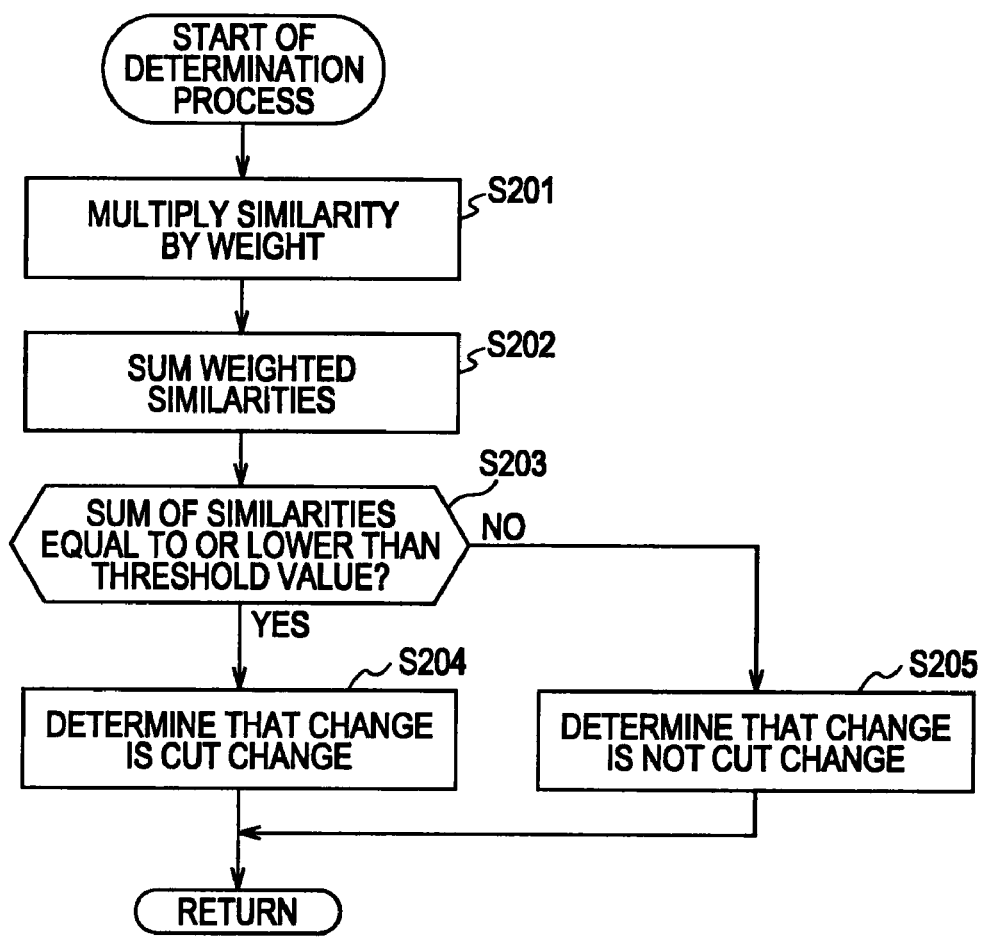
FIG. 29 is a flowchart illustrating a determination process of the determiner of FIG. 28.

The determination process of the determiner 64 of FIG. 28 is described below with reference to a flowchart of FIG. 29.

The weight processor 151 receives, from the histogram similarity calculator 104 in the first processor 61 of FIG. 18, histogram similarity information representing the filter image similarity between the first image and the second image to be processed for cut change detection. The weight processor 152 receives, from the filter image similarity calculator 122 in the first processor 61 of FIG. 18, filter image similarity information representing the filter image similarity between the first image and the second image to be processed for cut change detection. The weight processor 153 receives, from the mosaic image similarity calculator 132 in the first processor 61 of FIG. 18, mosaic image similarity information representing the mosaic image similarity between the first image and the second image to be processed for cut change detection.

In step S201, the weight processor 151 multiples the supplied histogram similarity information by the predetermined weight coefficient W1 and then supplies the resulting weighted histogram similarity information to the adder 154. The weight processor 152 multiplies the supplied filter image similarity information by the predetermined weight coefficient W2 and then supplies the resulting weighted filter image similarity information to the adder 154. The weight processor 153 multiples the supplied mosaic image similarity information by the predetermined weight coefficient W3 and then supplies the resulting weighted mosaic image similarity information to the adder 154.

In step S202, the adder 154 sums the histogram similarity information received from the weighted weight processor 151, the weighted filter image similarity information received from the weight processor 152 and the weighted mosaic image similarity information received from the weight processor 153 and supplies the summed similarity information representing summed similarities to the threshold determiner 155.

In step S203, the threshold determiner 155 determines whether the summed similarity information supplied from the adder 154 is equal to or lower than a predetermined threshold value. If it is determined in step S203 that the summed similarity information is equal to or lower than the predetermined threshold value, the threshold determiner 155 determines in step S204 that the border between the first image and the second is a cut change.

If it is determined in step S203 that the summed similarity information is not lower than the predetermined threshold value, the threshold determiner 155 determines in step S205 that the border between the first image and the second image is not a cut change.

Figure 30:
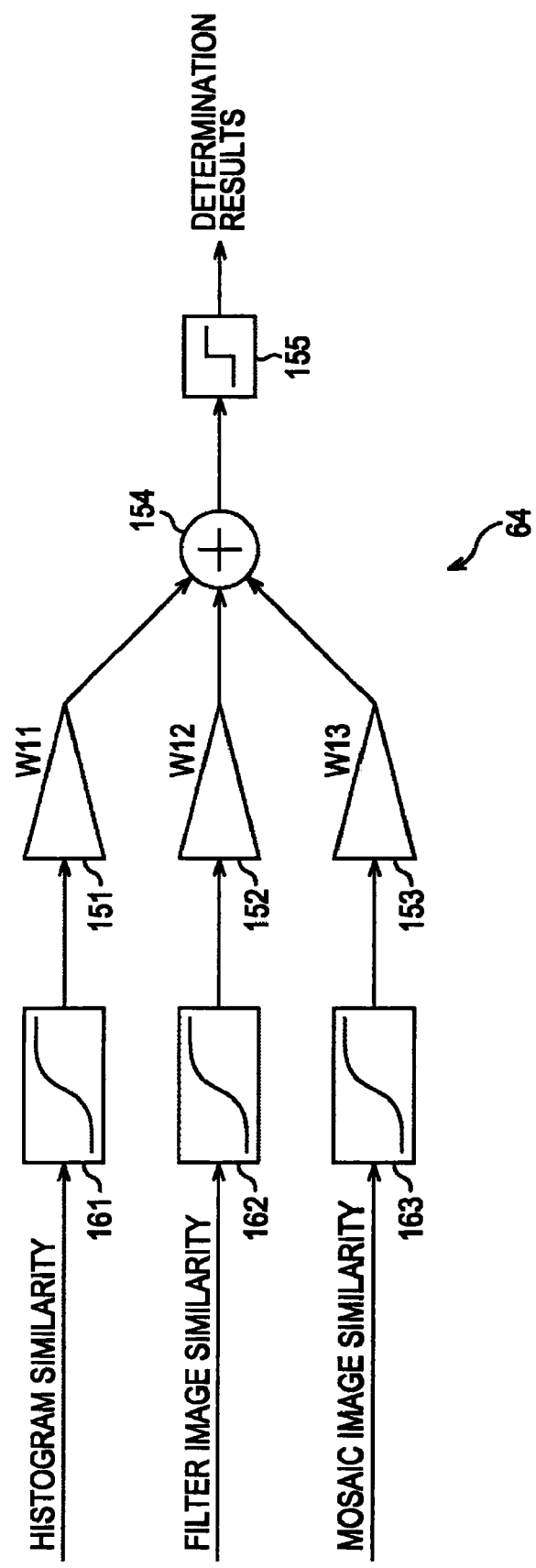
FIG. 30 is a functional block diagram illustrating a determiner in accordance with one embodiment of the present invention.

FIG. 30 is a functional block diagram illustrating the determiner 64 that performs the determination process based on only the similarity supplied from the first processor 61.

As shown in FIG. 30, the determiner 64 includes non-linear converters 161 through 163 in addition to the weight processors 151 through 153, the adder 154 and the threshold determiner 155 shown in FIG. 28.

The non-linear converter 161 receives, from the histogram similarity calculator 104 in the first processor 61 of FIG. 18, the histogram similarity information representing the histogram similarity between the first image and the second image to be processed for cut change detection.

The non-linear converters 161 non-linearly converts the supplied histogram similarity information and then supplies the resulting non-linear histogram similarity information to the weight processor 151.

The non-linear converter 162 receives, from the filter image similarity calculator 122 in the first processor 61 of FIG. 18, the filter image similarity information representing a filter image similarity between the first image and the second image to be processed for cut change detection.

The non-linear converter 162 non-linearly converts the filter image similarity information supplied and then supplies the resulting non-linear filter image similarity information to the weight processor 152.

The non-linear converter 163 receives, from the mosaic image similarity calculator 132 in the first processor 61 of FIG. 18, the mosaic image similarity information representing a mosaic image similarity between the first image and the second image to be processed for cut change detection.

The non-linear converter 163 non-linearly converts the mosaic image similarity information supplied and then supplies the resulting non-linear mosaic image similarity information to the weight processor 153.

Figure 31:
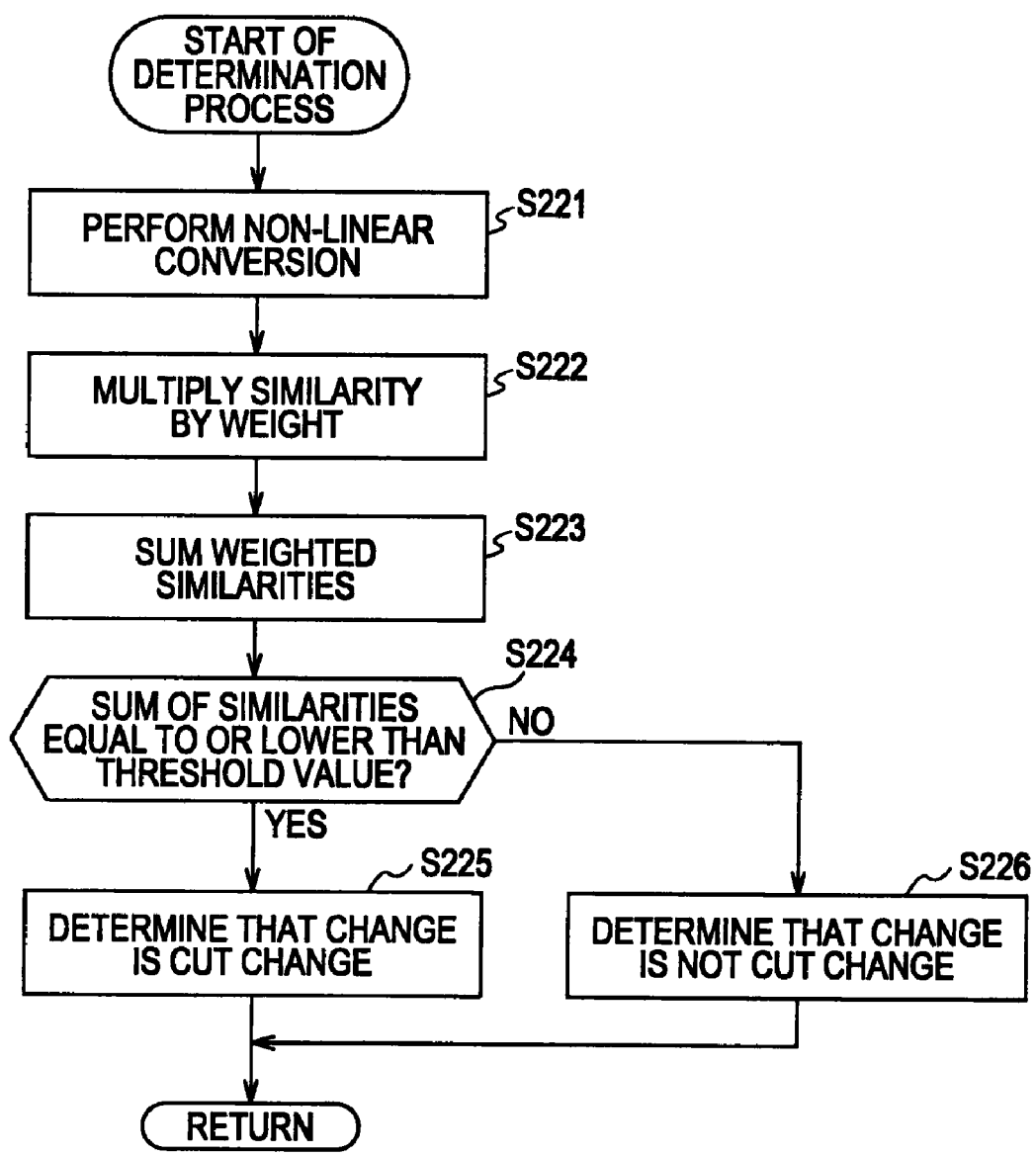
FIG. 31 is a flowchart illustrating a determination process of the determiner of FIG. 30.

The determination process of the determiner 64 of FIG. 30 is described below with reference to a flowchart of FIG. 31.

The non-linear converter 161 receives, from the histogram similarity calculator 104 in the first processor 61 of FIG. 18, the histogram similarity information representing the histogram similarity between the first image and the second image to be processed for cut change detection. The non-linear converter 162 receives, the filter image similarity calculator 122 in the first processor 61 of FIG. 18, the filter image similarity information representing the filter image similarity between the first image and the second image to be processed for cut change detection. The non-linear converter 163 receives, from the mosaic image similarity calculator 132 in the first processor 61 of FIG. 18, the mosaic image similarity information representing the mosaic image similarity between the first image and the second image to be processed for cut change detection.

In step S221, the non-linear converters 161 non-linearly converts the supplied histogram similarity information and then supplies the resulting non-linear histogram similarity information to the weight processor 151. The non-linear converter 162 non-linearly converts the filter image similarity information supplied and then supplies the resulting non-linear filter image similarity information to the weight processor 152. The non-linear converter 163 non-linearly converts the mosaic image similarity information supplied and then supplies the resulting non-linear mosaic image similarity information to the weight processor 153.

In step S222, the weight processor 151 multiples the supplied histogram similarity information by the predetermined weight coefficient W1 and then supplies the resulting weighted histogram similarity information to the adder 154. The weight processor 152 multiplies the supplied filter image similarity information by the predetermined weight coefficient W2 and then supplies the resulting weighted filter image similarity information to the adder 154. The weight processor 153 multiples the supplied mosaic image similarity information by the predetermined weight coefficient W3 and then supplies the resulting weighted mosaic image similarity information to the adder 154.

In step S223, the adder 154 sums the histogram similarity information received from the weighted weight processor 151, the weighted filter image similarity information received from the weight processor 152 and the weighted mosaic image similarity information received from the weight processor 153 and supplies the summed similarity information representing summed similarities to the threshold determiner 155.

In step S224, the threshold determiner 155 determines whether summed similarity information supplied from the adder 154 is equal to or lower than a predetermined threshold value. If it is determined in step S224 that the summed similarity information is equal to or lower than the predetermined threshold value, the threshold determiner 155 determines in step S225 that the border between the first image and the second is a cut change.

If it is determined in step S224 that the summed similarity information is not lower than the predetermined threshold value, the threshold determiner 155 determines in step S226 that the border between the first image and the second image is not a cut change.

Rather than using the similarity linearly proportional to the number of match pixels as the mosaic image similarity, the non-linearly converted similarity is used. For example, the non-linear conversion may be performed by imparting a maximum mosaic similarity when at least half the pixels are match pixels. Cut change detection accuracy is thus increased.

To determine cut change, the determiner 64 may use, in addition to the determination method described above, statistical discrimination such as Beyesian recognition for determining probability of event based on the Baye's theorem, neural network, support vector machine applying statistical learning theory.

Figure 32:
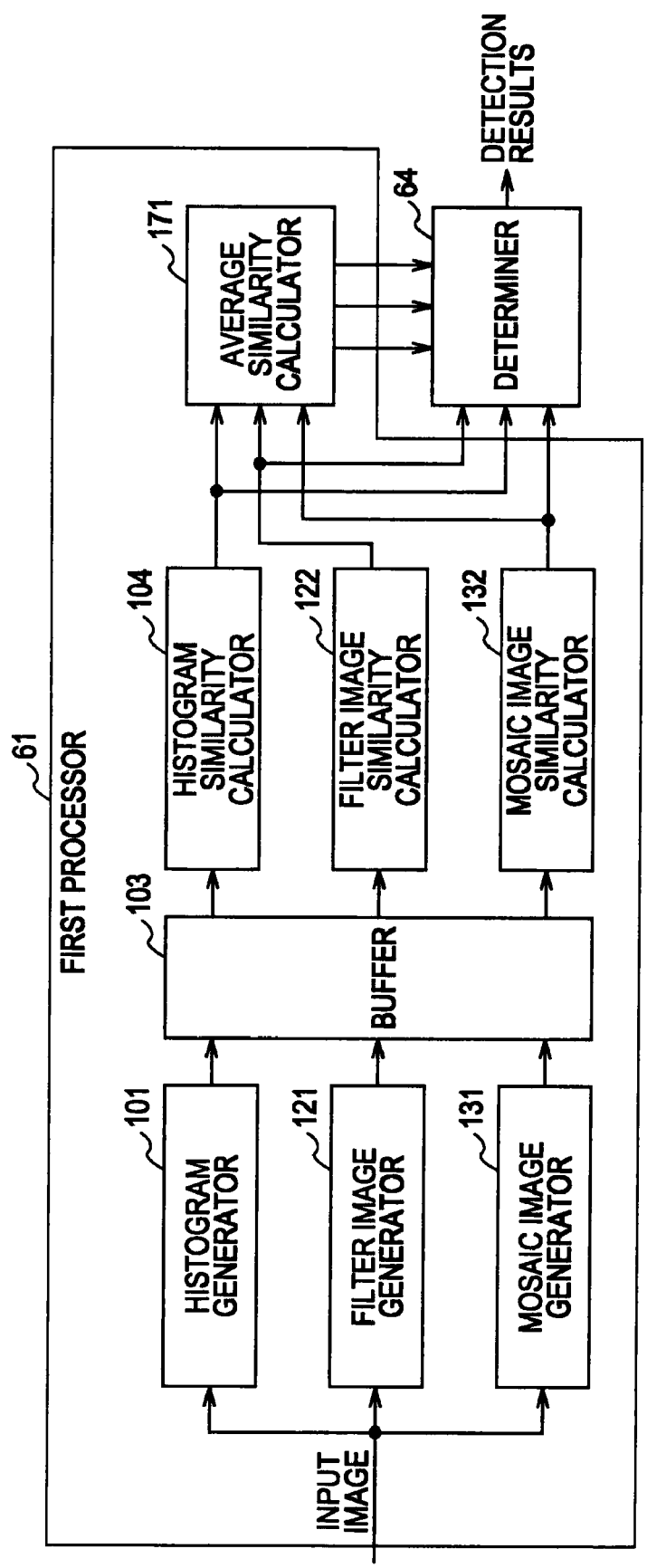
FIG. 32 is a functional block diagram illustrating a first processor in accordance with one embodiment of the present invention.

FIG. 32 is a block diagram illustrating another example of the first processor 61 of FIG. 10 in accordance with one embodiment of the present invention.

The first processor 61 includes a average similarity calculator 171 in addition to the histogram generator 101, the buffer 103, the histogram similarity calculator 104, the filter image generator 121, the filter image similarity calculator 122, the mosaic image generator 131 and the mosaic image similarity calculator 132 shown in FIG. 18.

As shown in FIG. 32, the average similarity calculator 171 calculates an average of histogram similarities of a predetermined number of in-close frames (8 frames, for example) supplied from the histogram similarity calculator 104, and supplies the resulting average histogram similarity to the determiner 64. The average similarity calculator 171 calculates an average of filter image similarities of the predetermined number of in-close frames supplied from the filter image similarity calculator 122, and then supplies the average filter image similarity to the determiner 64. The average similarity calculator 171 calculates an average of mosaic image similarities of the predetermined number of in-close frames supplied from the mosaic image similarity calculator 132, and supplies the average mosaic image similarity to the determiner 64.

Each of the average histogram similarity, the average filter image similarity and the average mosaic image similarity is also hereinafter referred to as an average similarity.

The first process of the first processor 61 of FIG. 32 is described below with reference to a flowchart of FIG. 33.

Figure 33:
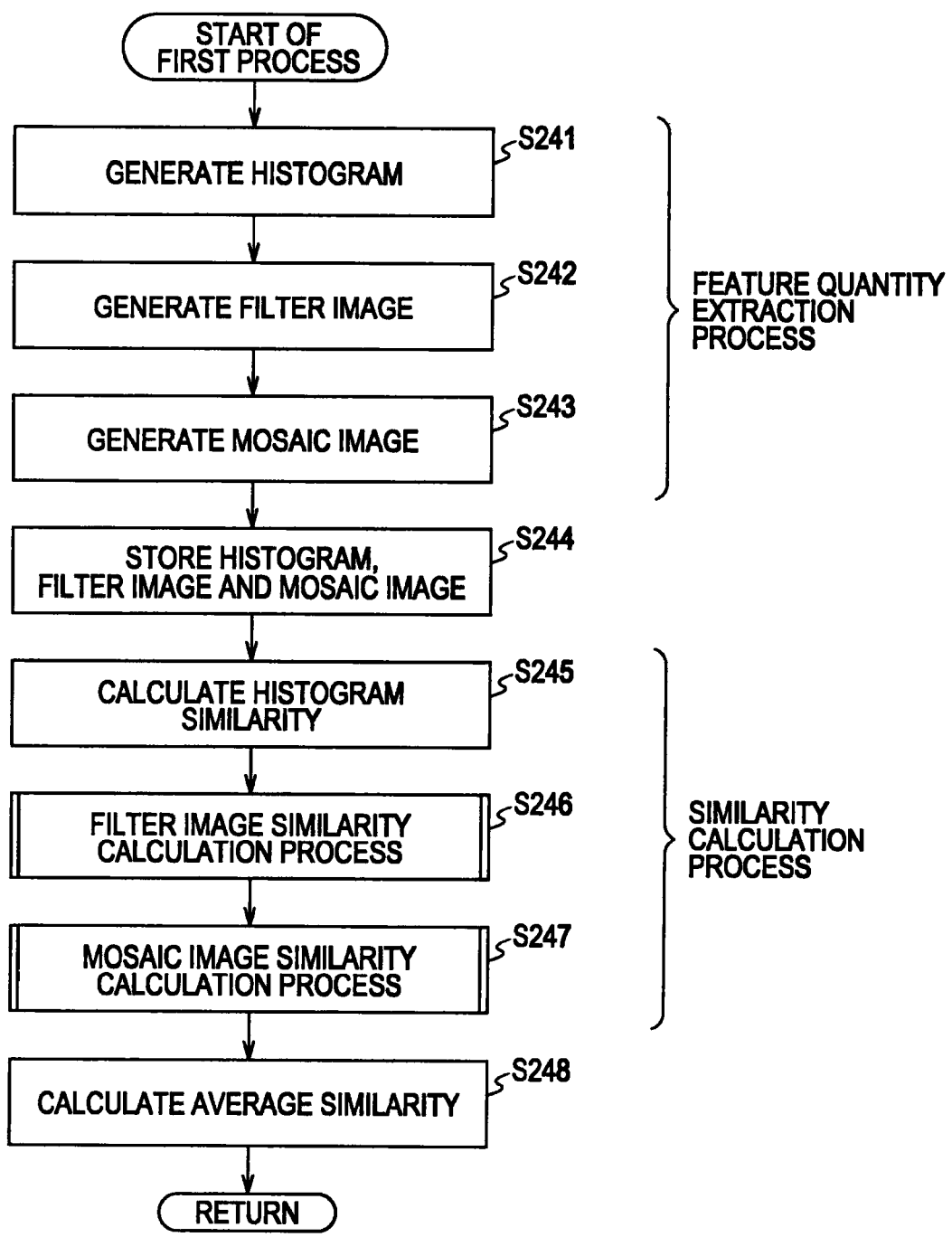
FIG. 33 is a flowchart illustrating of a first process of the first processor of FIG. 32.

As shown in FIG. 33, steps S241 through S247 are respectively identical to steps S121 through S127 of FIG. 19.

In step S248, th average similarity calculator 171 of FIG. 32 calculates an average of histogram similarities of a predetermined number of in-close frames supplied from the histogram similarity calculator 104, and supplies the resulting average histogram similarity to the determiner 64. The average similarity calculator 171 calculates an average of filter image similarities of the predetermined number of in-close frames supplied from the filter image similarity calculator 122, and then supplies the average filter image similarity to the determiner 64. The average similarity calculator 171 calculates an average of mosaic image similarities of the predetermined number of in-close frames supplied from the mosaic image similarity calculator 132, and supplies the average mosaic image similarity to the determiner 64. Processing returns to step S2 of FIG. 11.

In a video period throughout which an image moves fast, a similarity between images drops, and a border between images, which is not really a cut change, tends to be misdetected as a cut change. In such a case, the use of the average similarity in combination with the other similarities cancel a variation in a variety of similarities between a video period throughout which an image moves fast and a video period throughout which an image remains almost motionless. Highly accurate cut change detection capability is thus provided regardless of whether the image moves fast or remains almost motionless.

Figure 34:
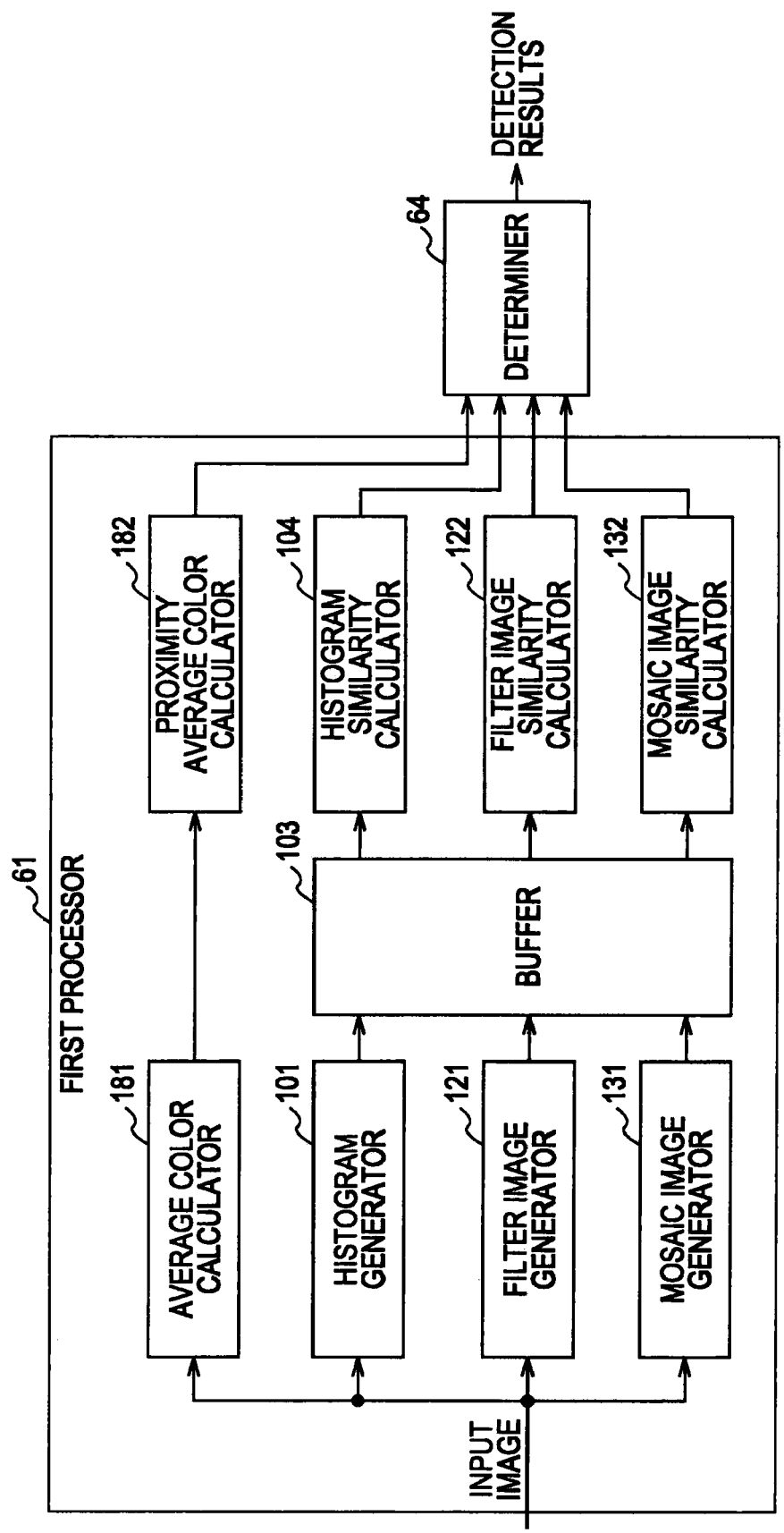
FIG. 34 is a functional block diagram illustrating a first processor in accordance with one embodiment of the present invention.

FIG. 34 is a block diagram illustrating another example of the first processor 61 of FIG. 10 in accordance with one embodiment of the present invention.

The first processor 61 includes an average color calculator 181 and a proximity average color generator 182 in addition to the histogram generator 101, the buffer 103, the histogram similarity calculator 104, the filter image generator 121, the filter image similarity calculator 122, the mosaic image generator 131 and the mosaic image similarity calculator 132 shown in FIG. 18.

As shown in FIG. 34, the average color calculator 181 receives an image input to the first processor 61.

The average color calculator 181 calculates average luminance or average color of the whole input image and supplies the resulting average luminance or average color to the proximity average color generator 182.

The proximity average color generator 182 calculates, as proximity average color, an average of the average luminance supplied from the average color calculator 181 or an average of the average color supplied from the average color calculator 181, within a predetermined number of frames in proximity to the first image to be processed for cut change detection. The proximity average color generator 182 then supplies the calculated proximity average color to the determiner 64.

The first process of the first processor 61 of FIG. 34 is described below with reference to a flowchart of FIG. 35.

Figure 35:
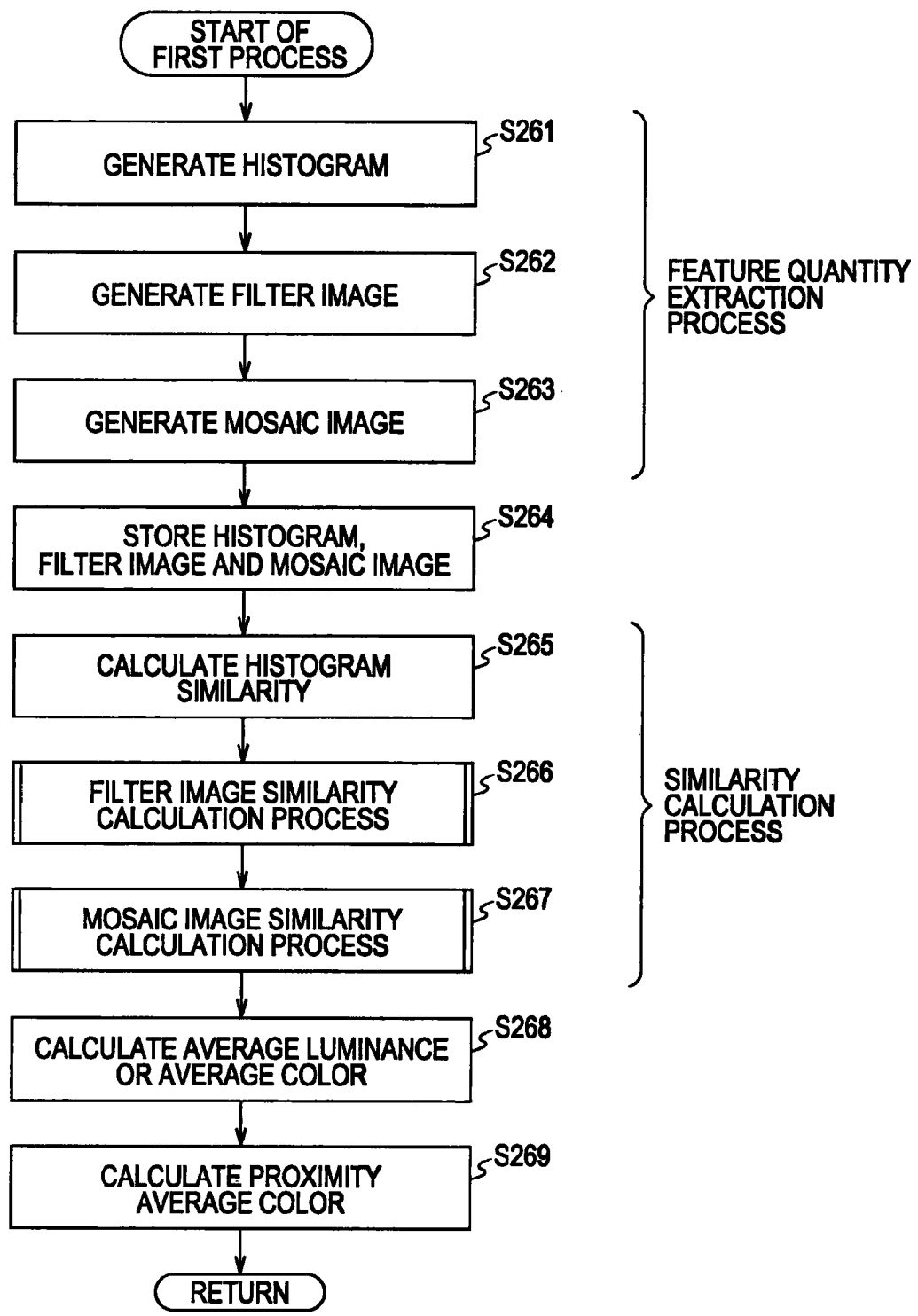
FIG. 35 is a flowchart illustrating a first process of the first processor of FIG. 34.

Steps S261 through S267 of FIG. 35 are respectively identical to steps S121 through S127 of FIG. 19.

The average color calculator 181 receives the image input to the first processor 61. In step S268, the average color calculator 181 calculates average luminance or average color of the input image, and then supplies the calculated average luminance or average color to the proximity average color generator 182.

In step S269, the proximity average color generator 182 calculates, as proximity average color, an average of the average luminance supplied from the average color calculator 181 or an average of the average color supplied from the average color calculator 181, within the predetermined number of frames (8 frames, for example) in proximity to the first image (current frame) to be processed for cut change detection. The proximity average color generator 182 then supplies the calculated proximity average color to the determiner 64. Processing returns to step S2 of FIG. 11.

A difference between histograms or between filter images becomes small in video period throughout which luminance value of the entire image is relatively low, such as of an image photographed at night or in indoor environments. The histogram similarity and the filter image similarity become high, causing a cut change to be undetected. If luminance or color is low, the proximity average color is also used. Even a slight change is thus determined as a cut change when the image is dark. When the image is bright, only a large change is determined to be a cut change. In this way, cut change detection is reliably performed at high accuracy by compensating for variations in magnitude of luminance and color of the entire image.

The second process is described below.

Figure 36:
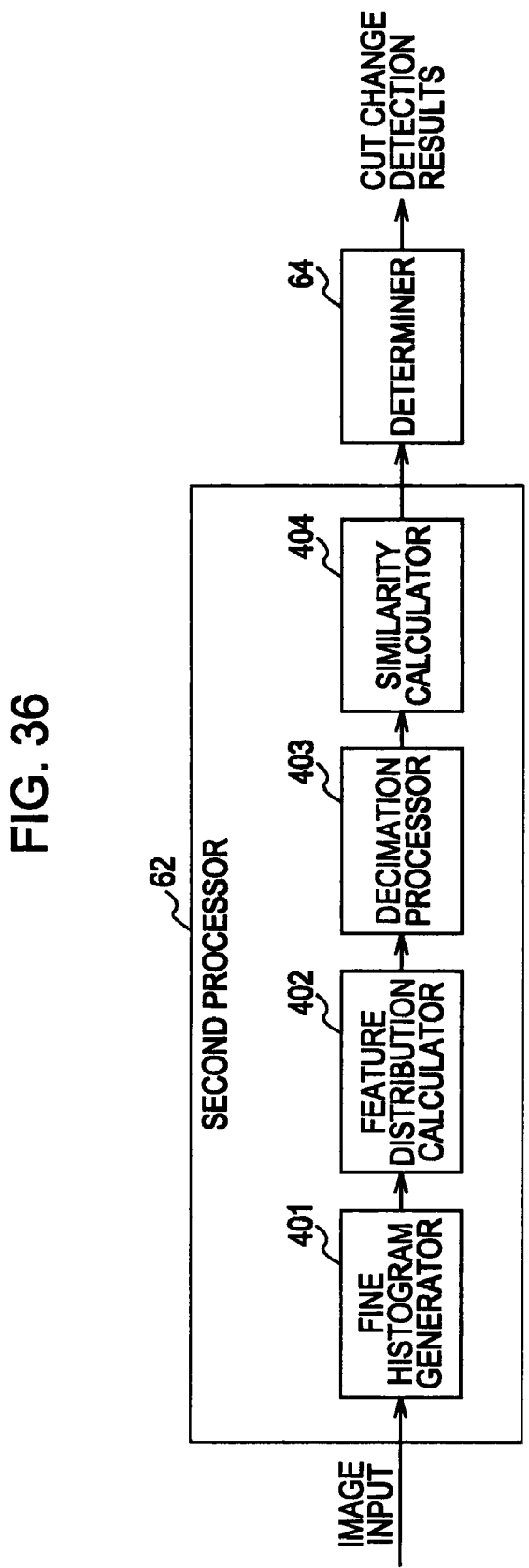
FIG. 36 is a block diagram illustrating a second processor in accordance with one embodiment of the present invention.

FIG. 36 is a block diagram illustrating the second processor 62 of FIG. 10.

With reference to FIG. 36, the second processor 62 includes a fine histogram generator 401, a feature distribution calculator 402, a decimation processor 403 and a similarity calculator 404.

The fine histogram generator 401 receives the image input to the second processor 62. The fine histogram generator 401 generates a fine histogram of the supplied image, for example, a fine histogram of one gradation of 256 gradation histogram, and then supplies the fine histogram to the feature distribution calculator 402.

The feature distribution calculator 402 filters the fine histogram supplied from the fine histogram generator 401 and supplies resulting feature distribution to the decimation processor 403. The feature distribution calculator 402 preferably employs a low-pass filter to filter the fine histogram. Alternatively, a non-linear response filter may be used.

The decimation processor 403 performs a decimation process on the feature distribution supplied from the feature distribution calculator 402. In the decimation process, the decimation processor 403 decimates the feature distribution at intervals corresponding to a sampling frequency falling within a range that allows the feature distribution to be faithfully reproduced (according to the sampling theorem). The feature distribution having undergone the decimation process is then supplied to the similarity calculator 404.

The decimation process of the decimation processor 403 is performed to reduce the amount data, and save storage capacity, and may be skipped if not necessary.

The similarity calculator 404 compares the decimated feature distribution of the first image supplied from the decimation processor 403 with the decimated feature distribution of the second image, and then calculates a similarity between the decimated feature distribution of the first image and the decimated feature distribution of the second image.

The similarity between the feature distributions may be calculated in the same manner as the standard histogram difference method. For example, a distance between the feature distribution of the first image and the feature distribution of the second image prior to the first image is determined, and the smaller the distance, the higher the resulting similarity becomes.

Figure 37:
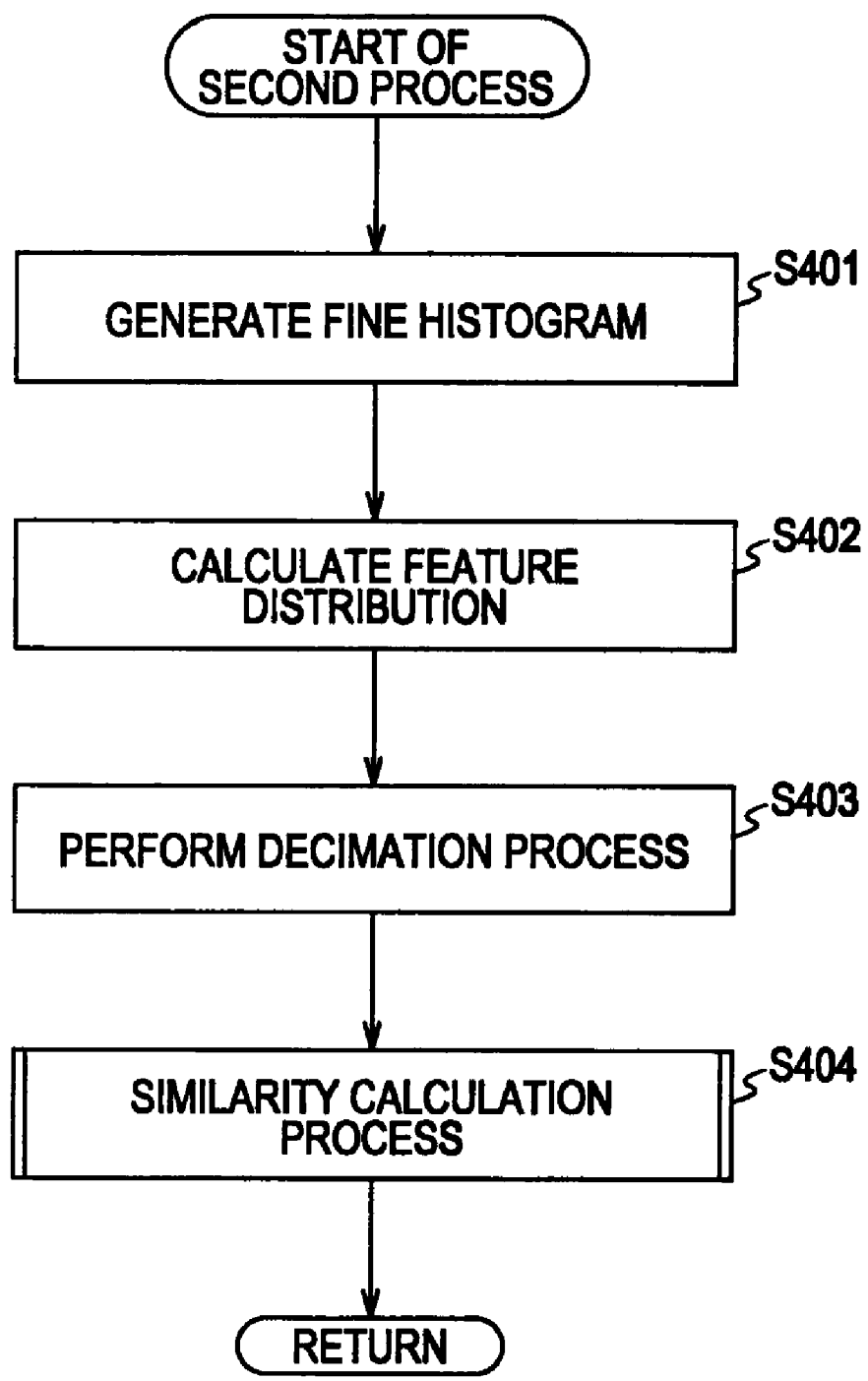
FIG. 37 is a flowchart illustrating a second process of the second processor of FIG. 36.

The second process of the second processor 62 of FIG. 36 performed in step S3 of FIG. 11 is described below with reference to a flowchart of FIG. 37.

The fine histogram generator 401 of FIG. 36 receives an image input to the second processor 62. In step S401, the fine histogram generator 401 generates the fine histogram of the supplied image and supplies the generated fine histogram to the feature distribution calculator 402.

Figure 5A:
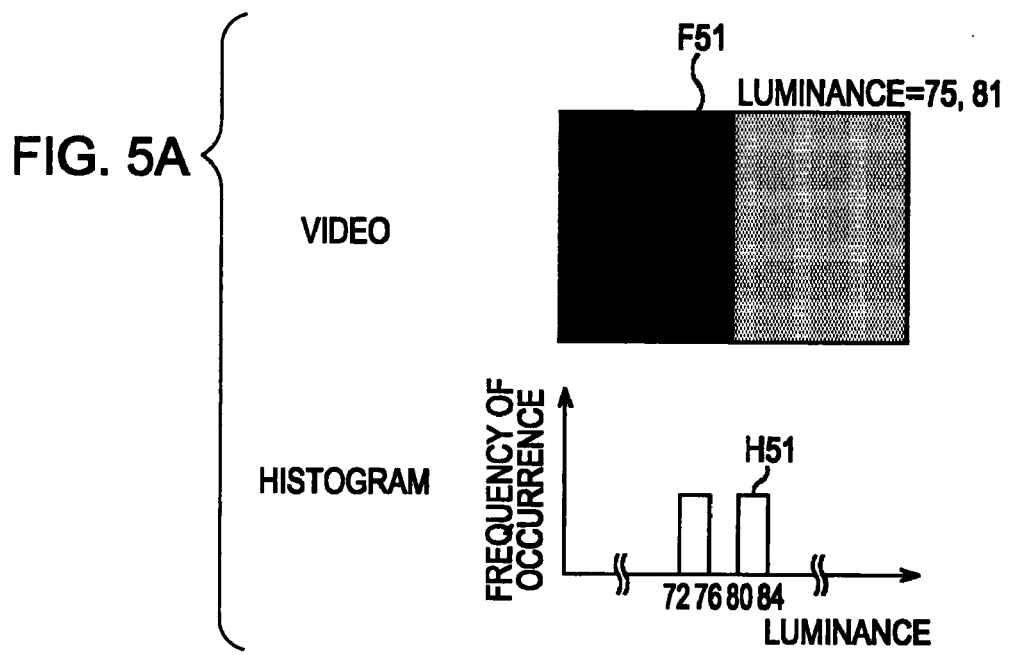
FIGS. 5A and 5B illustrate a change in histograms in response to a slight change in luminance in a left half and a right half of each frame.
Figure 5B:
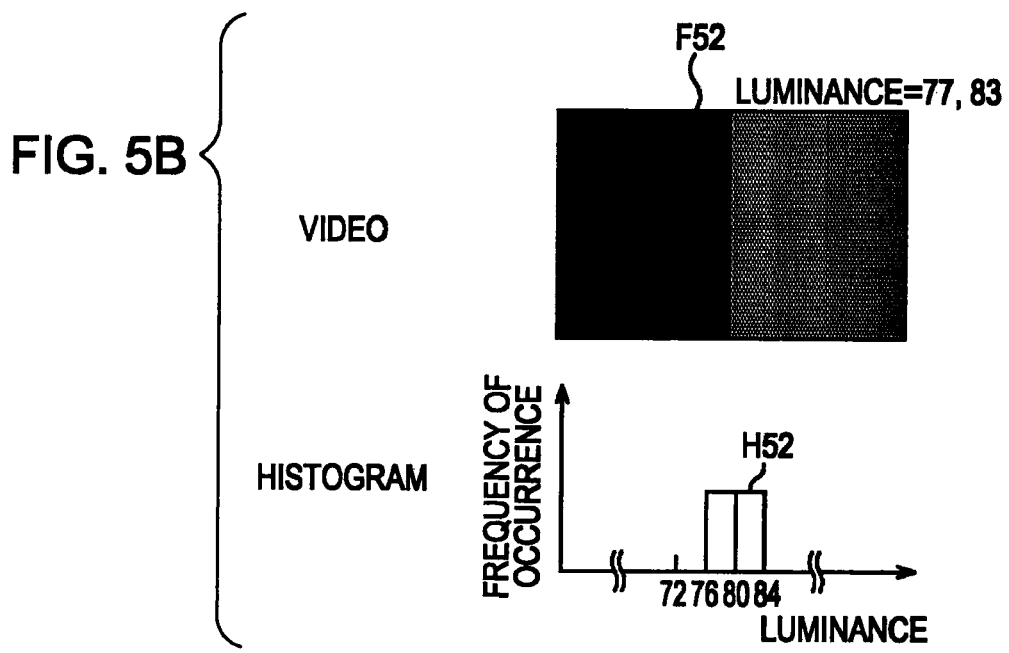
Figure 6:
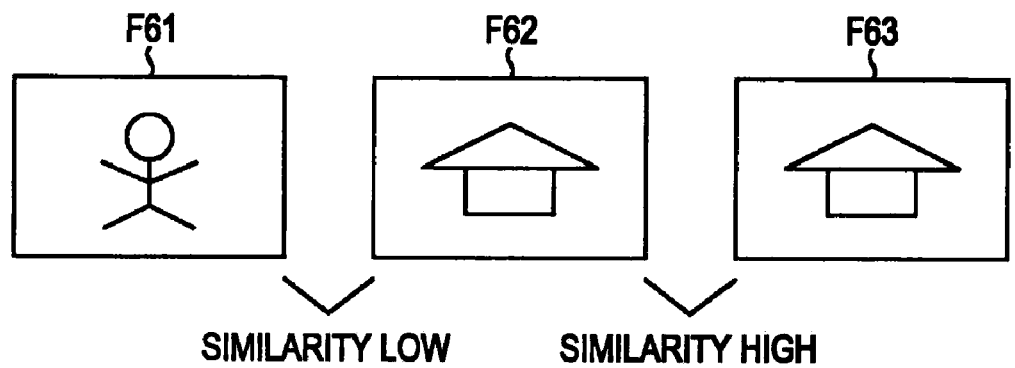
FIG. 6 illustrates an example of a standard cut change.
Figure 7:
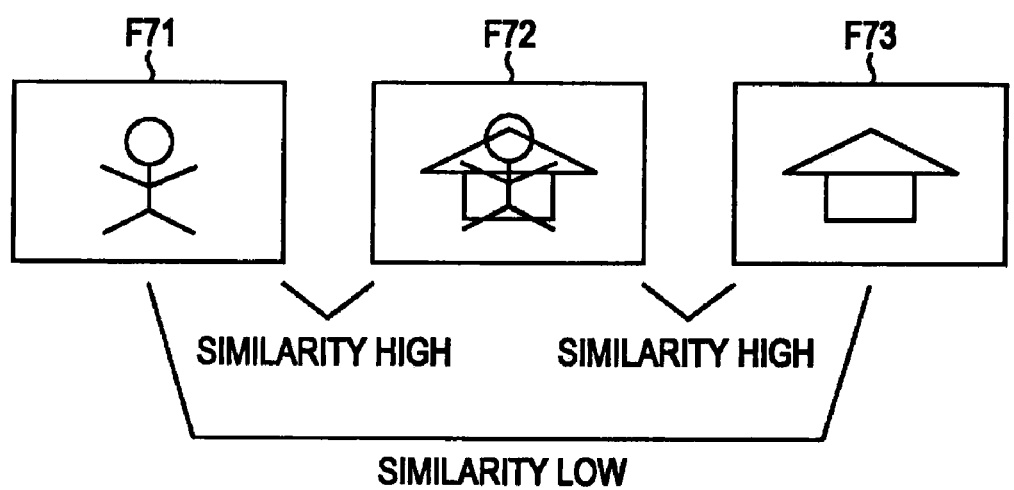
FIG. 7 illustrates an example of a blend cut change.
Figure 8:
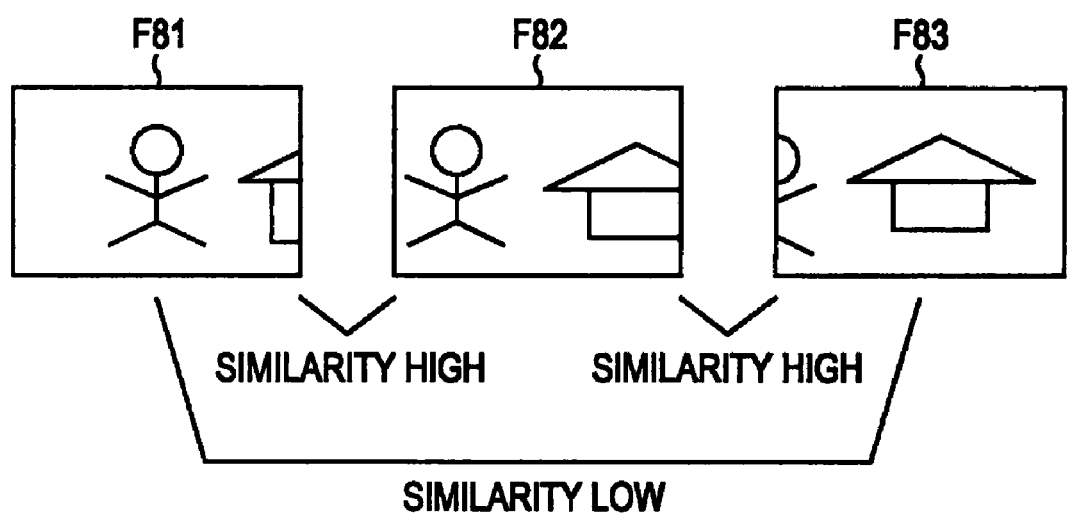
FIG. 8 illustrates an example of a subject that moves fast.
Figure 38:
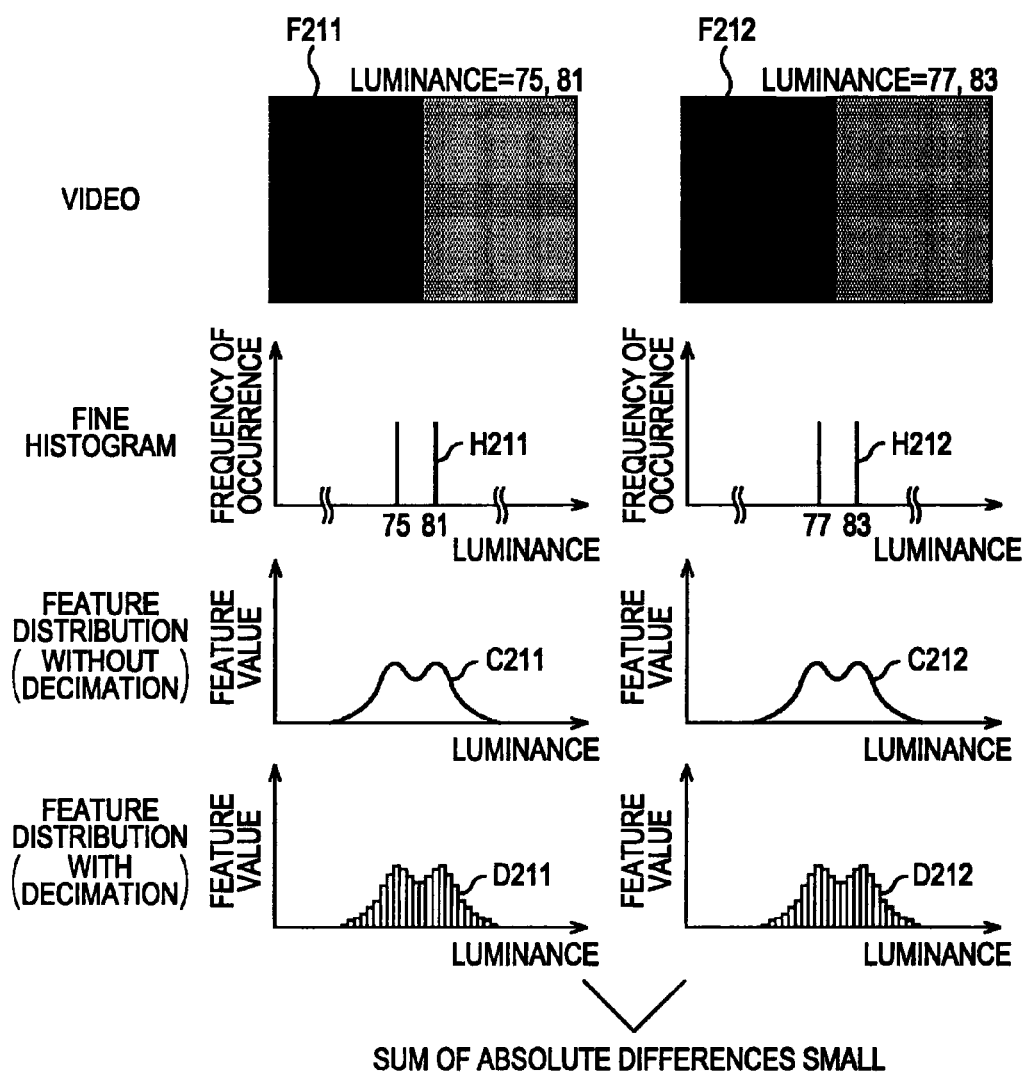
FIG. 38 illustrates a fine histogram and a change in a feature distribution.

As shown in a top row of FIG. 38, frame F211 and frame F212 are images to be processed. The images have the same luminance distribution as the frame F51 and the frame F52 of FIG. 5. The left half of the image of the frame F211 has a luminance value of 75 and the right half of the image of the frame F212 has a luminance value of 81. The left half of the frame F212 has a luminance value of 77 and the right half of the frame F212 has a luminance value of 83. Histograms H211 and H212 shown in a second row of FIG. 38 are fine histograms generated from the images of the frame F211 and the frame F212. The fine histogram H211 has histogram peaks at luminance values 75 and 81, and the fine histogram H212 has histogram peaks at luminance values of 77 and 83.

The fine histogram H211 of FIG. 38 has preferably N bins if the input image has N gradations. In this way, the number of discontinuities in the calculation of the histogram generation remains equal to the number of quantization levels the image originally has. The introduction of new errors is thus prevented. To reduce the amount of calculation and to save storage capacity, the number of bins can be set to be less than N. However, the coarser the number of gradations, the more the errors are introduced due to discontinuities in the calculation of the histogram generation as in the general histogram difference method.

In step S402, the feature distribution calculator 402 filters the filter image supplied from the fine histogram generator 401 and supplies the resulting feature distribution to the decimation processor 403.

Feature distribution C211 shown in a third row of FIG. 38 is obtained by filtering the fine histogram H211. Feature distribution C212 is obtained by filtering the fine histogram H212.

Figure 39:
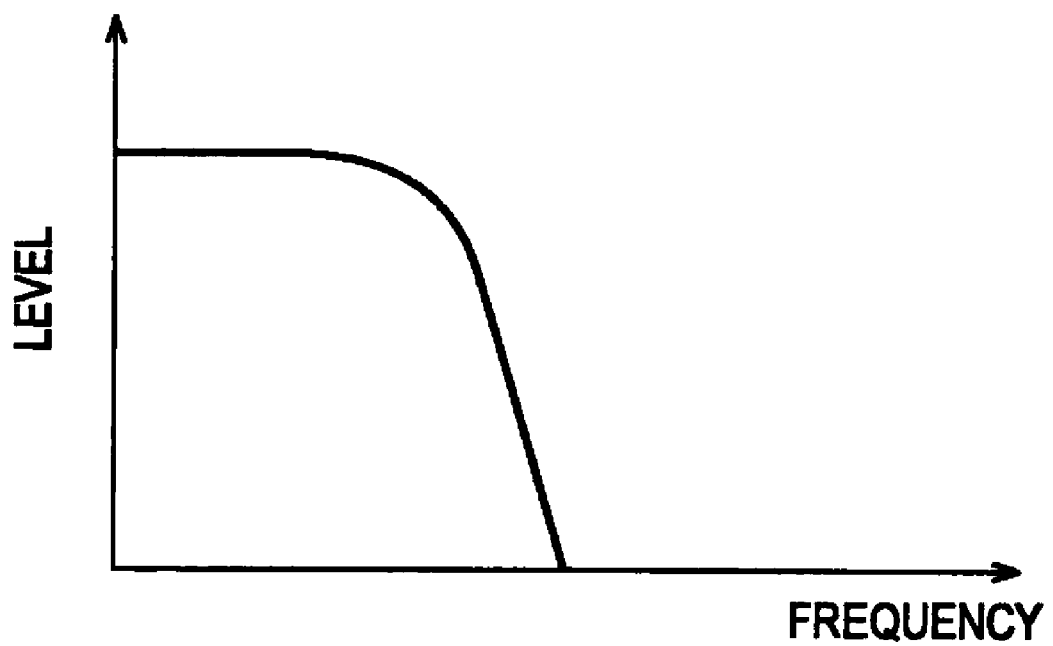
FIG. 39 illustrates frequency response characteristics of a low-pass filter.

A low-pass filter of FIG. 39 is preferably used in the filtering process. As in the case of casting ballots into a next bin, the low-pass filter compensates for variations of the histograms due to a slight change in luminance without introducing a new error due to discontinuities in the calculation of the histogram generation.

The feature distribution resulting from the filtering process of the low-pass filter has a high frequency component reduced more than in the histogram. By performing the decimation process within the range permitted in the sampling theory, the amount of calculation is reduced while no or little error is introduced in the filtering process and the decimation process.

As described above, the feature distribution is free from the error due to the discontinuity in the calculation of the histogram generation. Such error is essentially involved in the histogram difference method. Since the similarity of the images to be processed is calculated using such feature distribution, the cut change is detected at high accuracy.

In the filtering process, the feature distribution calculator 402 can also employ a non-linear filter providing a non-linear response instead of the low-pass filter.

With the logarithm of the feature distribution, the non-linear filter may contract or expand feature value axis logarithmically.

Figure 40A:
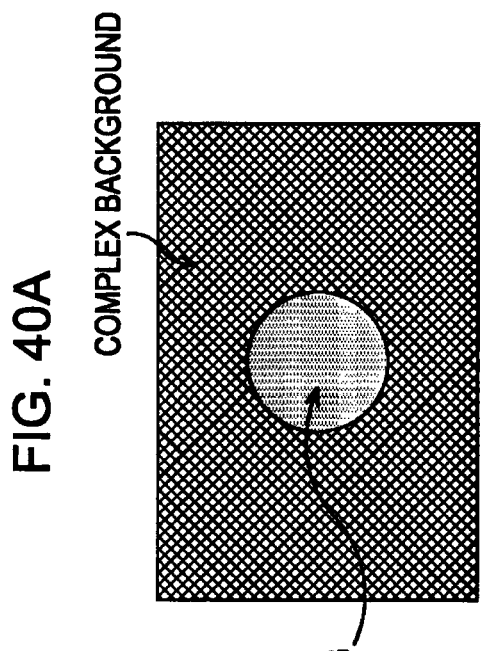
FIGS. 40A-40C illustrate a filtering process of a non-linear filter.
Figure 40C:
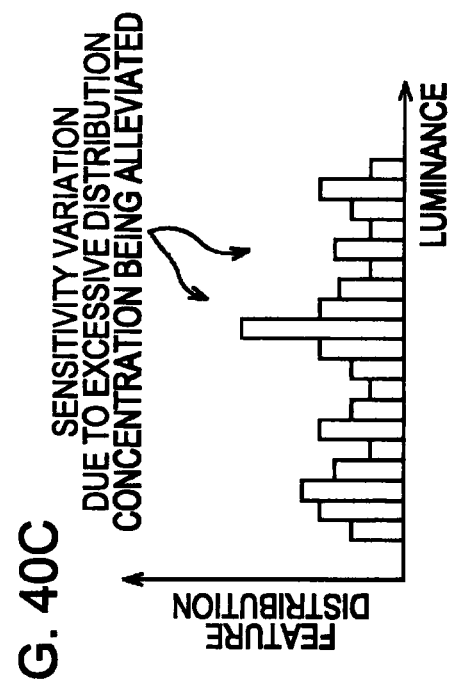
Figure 40B:
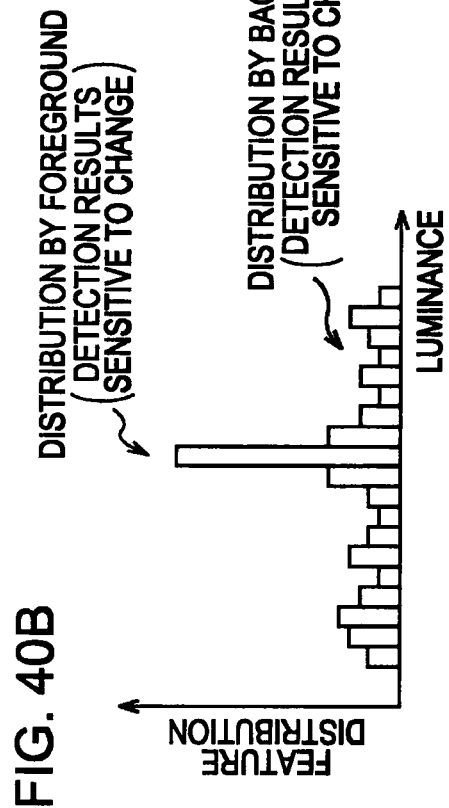

FIGS. 40A-40C illustrate a feature distribution which is obtained by non-linearly filtering an image having feature distribution concentrated on particular luminance.

FIG. 40A illustrates an image to be filtered. FIG. 40B illustrates a feature distribution that has been obtained by linearly filtering the image. FIG. 40C illustrates a feature distribution that has been obtained by non-linearly filtering the image through a non-linear filter.

FIG. 40A is the image where an object having a simple color is placed in a complex background.

As shown in FIG. 40B, the feature distribution of the object having the simple color is concentrated on a certain luminance value. As previously discussed, variations in luminance of the object having the simple color behave predominantly on the cut change detection result.

As shown in FIG. 40C, excessively high luminance is restricted through the non-linear filtering operation so that feature distribution may not concentrate on a particular luminance value.

In step S403, the decimation processor 403 performs the decimation process on the feature distribution supplied from the feature distribution calculator 402, more specifically, decimates the feature distribution every four gradations, and then supplies the decimated feature distribution to the similarity calculator 404. Decimating the feature distribution C211 and the feature distribution C212 shown in the third row of FIG. 38 results in distribution D211 and feature distribution D212 shown in the fourth row of FIG. 38.

In step S404, the similarity calculator 404 compares the decimated feature distribution of the first image supplied from the decimation processor 403 with the decimated feature distribution of the second image (preceding frame), and calculates a similarity between the decimated feature distribution of the first image and the decimated feature distribution of the second image (preceding frame). Processing returns to step S3 of FIG. 11.

Figure 41:
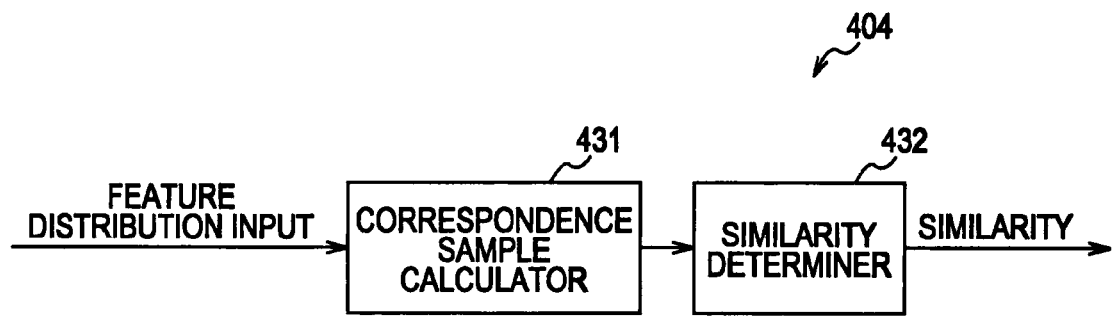
FIG. 41 is a block diagram illustrating of a similarity calculator in accordance with one embodiment of the present invention.

To perform the similarity calculation process, the similarity calculator 404 of FIG. 36 is constructed as shown in FIG. 41. The similarity calculator 404 includes a correspondence sample calculator 431 and a similarity determiner 432.

The correspondence sample calculator 431 compares the decimated feature distribution of the first image with the decimated feature distribution of the second image, determines a correspondence relationship of samples that provides the best match between the shapes of the feature distributions of the first image and the second image, and supplies correspondence relationship information representing the correspondence relationship to the similarity determiner 432.

Based on the correspondence relationship information supplied from the correspondence sample calculator 431, the similarity determiner 432 determines a distance between the feature distribution of the first image and the feature distribution of the second image, and supplies determined feature distribution similarity to the determiner 64. In the feature distribution similarity, the shorter the distance, the higher the similarity becomes.

Figure 42:
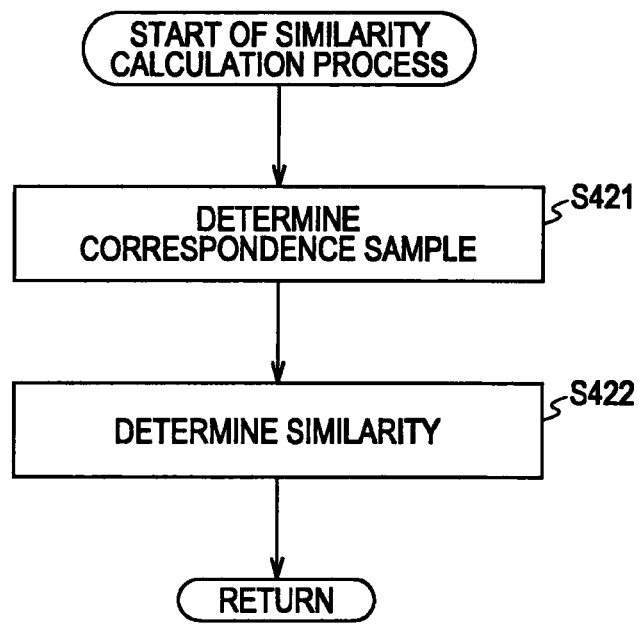
FIG. 42 is a flowchart illustrating a similarity calculation process in step S404 of FIG. 37.

The similarity calculation process of the similarity calculator 404 of FIG. 36 is described below with reference to a flowchart of FIG. 42.

Figure 43:
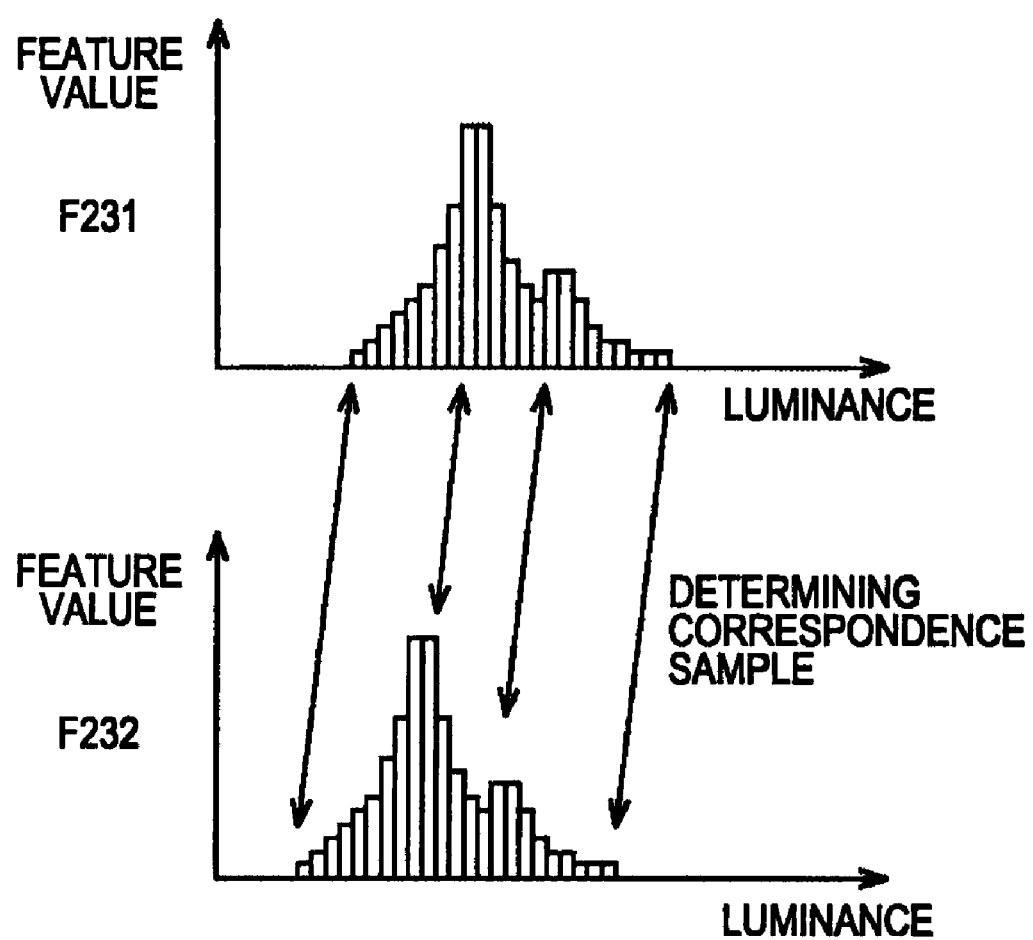
FIG. 43 illustrates correspondence between samples.

In step S421, the correspondence sample calculator 431 compares the decimated feature distribution of the first image and the decimated feature distribution of the second image, supplied from the decimation processor 403, determines the correspondence relationship of samples that provides the best match between the shapes of the feature distributions of the first image and the second image as shown in FIG. 43, and supplies the correspondence relationship information representing the correspondence relationship to the similarity determiner 432. The word sample here means the bin of the feature distribution.

The upper portion of FIG. 43 illustrates the feature distribution of a frame F231 as the first image and the lower portion of FIG. 43 illustrates the feature distribution of a frame F232 of the second image.

As shown in FIG. 43, samples are related to each other between the feature distribution of the frame F231 and the feature distribution of the frame F232 as represented by arrow-headed lines so that the two feature distributions match each other in shape.

Available as methods of determining correspondence relationship between the feature distributions are a method of maximizing correlation between the feature distributions, a method of minimizing squared errors between the feature distributions, and a method of aligning the centers of gravity of the feature distributions.

Since a change in luminance causes the shape of the feature distribution to distort, the correspondence relationship may be determined using a non-linear method such as dynamic programming (DP) matching.

In step S422, the similarity determiner 432 determines the distance between the feature distribution of the first image and the feature distribution of the second image based on the correspondence relationship information supplied from the correspondence sample calculator 431. The feature distribution similarity is then supplied to the determiner 64. In the feature distribution similarity, the shorter the distance, the higher the similarity becomes.

As previously discussed, the histogram difference method may suffer from cut change detection error when a slight change occurs in luminance. This is because discontinuous calculation is performed across a bin border when the histogram is calculated. The technique disclosed in Japanese Unexamined Patent Application Publication No. 2004-282318 can alleviate the discontinuity in calculation, thereby controlling cut change error detection to some degree. However, the disclosed technique does not fully overcome the bin border. The effectiveness of the disclosed technique is limited. Since in contrast, the present embodiment relates the samples to each other so that the feature distributions match in shape, the effect of the bin border is minimized.

The third process is described below.

Figure 44:
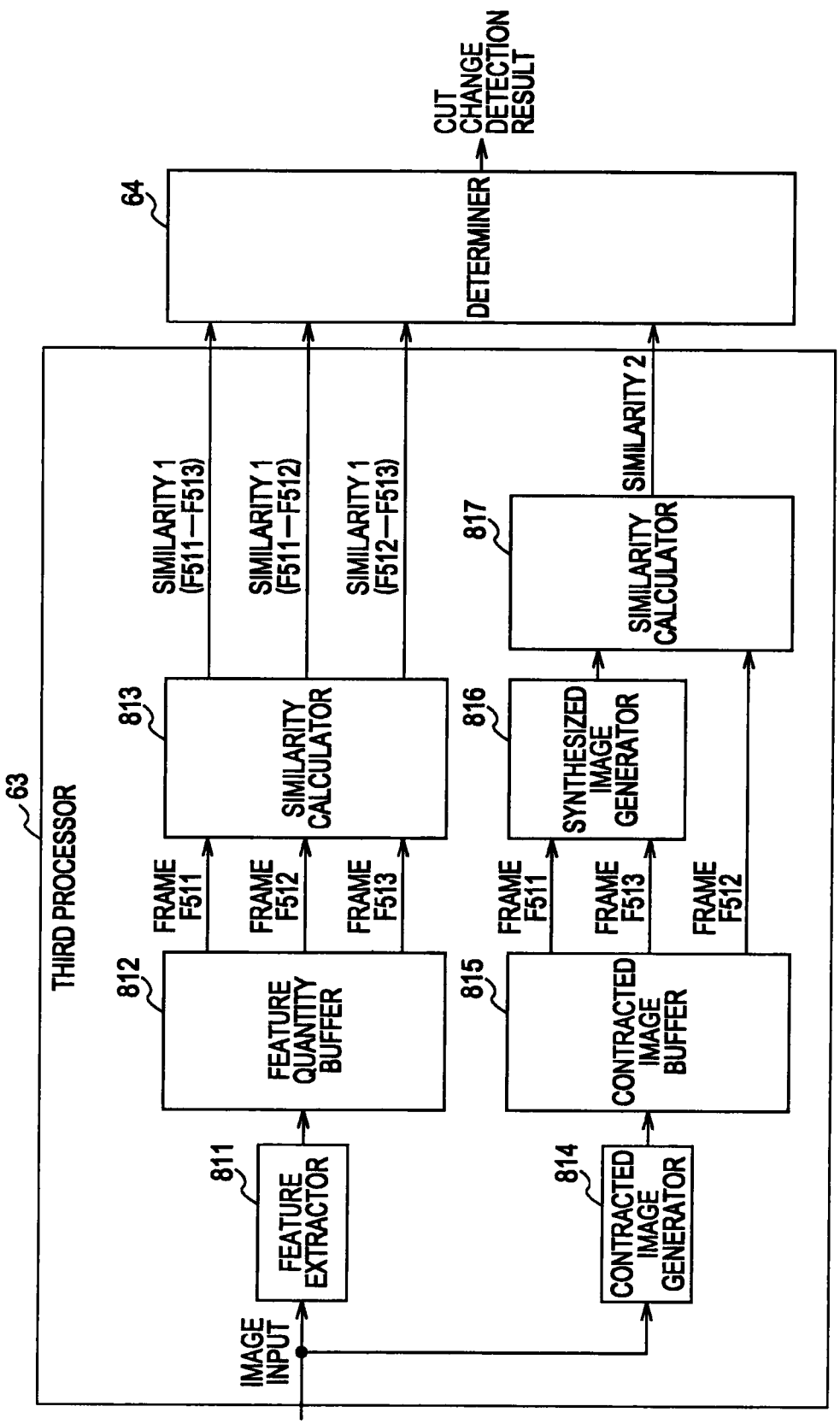
FIG. 44 is a block diagram illustrating a third processor in accordance with one embodiment of the present invention.

FIG. 44 is a block diagram illustrating the determiner 64 of FIG. 10 in accordance with one embodiment of the present invention.

As shown in FIG. 44, the third processor 63 includes a feature extractor 811, a feature quantity buffer 812, a similarity calculator 813, a contracted image generator 814, a contracted image buffer 815, a synthesized image generator 816 and a similarity calculator 817.

The feature extractor 811 receives an image input to the third processor 63.

The three images input to the third processor 63, namely, the second latest image, the first latest image and the current image in chronological order are respectively referred to as a first target image, a second target image and a third target image.

The feature extractor 811 extracts the features from the first through third target images and then supplies the extracted features to the feature quantity buffer 812.

In accordance with the present embodiment, the histogram is used as a feature quantity. Alternatively, the filter image, the mosaic image, the feature distribution, or another feature quantity resulting from any typically available cut change detection method may be used. For example, used as the feature quantity are the average or variance of luminance, DCT coefficient or motion vector obtained in encryption or edge obtained in edge detection as disclosed in Transactions of Information Processing Society of Japan Vol. 33, No. 4, pp. 543-550 by Akio NAGASAKA and Yuzuru TANAKA and in the paper entitled "Comparison of Video Short Boundary Detection Techniques," John S. Boreczky, Lawrence A. Rowe, Storage and Retrieval for Image and Video Database (SPIE) (1996) pp. 170-179.

The feature quantity buffer 812 stores the first through third target images supplied from the feature extractor 811. The feature quantity buffer 812 stores at least three latest images, namely, the first through third target images.

The similarity calculator 813 reads the first through third target images from the feature quantity buffer 812, and calculates a first similarity 1 between the feature quantity of the first target image and the feature quantity of the third target image, a second similarity 1 between the feature quantity of the first target image and the feature quantity of the second target image, and a third similarity 1 between the feature quantity of the second target image and the feature quantity of the third target image. The similarity calculator 813 then supplies the first through third similarities 1 to the determiner 64.

In the present embodiment, the similarity 1 is the histogram similarity. Alternatively, the filter image, the mosaic image, the feature distribution, or another feature quantity resulting from any typically available cut change detection method may be used for the similarity 1. The feature quantities disclosed in Transactions of Information Processing Society of Japan Vol. 33, No. 4, pp. 543-550 by Akio NAGASAKA and Yuzuru TANAKA and in the paper entitled "Comparison of Video Short Boundary Detection Techniques," John S. Boreczky, Lawrence A. Rowe, Storage and Retrieval for Image and Video Database (SPIE) (1996) pp. 170-179 may be used. For example, a difference value between average luminance values or variance values of the two adjacent images, absolute difference sum or squared difference sum of the two adjacent images, histogram absolute difference sum, difference value of DCT coefficients, the magnitude of predictive error between an image predicted using motion vector and an actual image, and a difference in the number of edges or edge distribution.

The contracted image generator 814 receives the image input to the third processor 63, namely, the first through third target images. The contracted image generator 814 generates a contracted image of each of the first through third target images, and then supplies the contracted images to the contracted image buffer 815. The contracted image has a reduced size of 8 pixels×8 pixels or 16 pixels×16 pixels.

The contracted image buffer 815 stores the contracted images of the first through third target images supplied from the contracted image generator 814. The contracted image buffer 815 stores at least three latest images, namely, the first through third target images.

The synthesized image generator 816 reads from the contracted image buffer 815 the contracted images of the first target image and the third target image, prior to and subsequent the second target image, and generates a synthesized image from the contracted image of the first target image and the contracted image of the third target image. The synthesized image generator 816 then supplies the synthesized image to the similarity calculator 817.

Let $F_1(x,y)$ represent a pixel value in the contracted image of the first target image and $F_3(x,y)$ represent a pixel value in the contracted image of the third target image, and a pixel value $G(x,)$ at a point $(x,y)$ in the synthesized image is expressed using predetermined constants a and b as follows:

$$G(x,y)=aF_1(x,y)+bF_3(x,y) \qquad \text{Equation}$$

where x and y represent X coordinate and Y coordinate in each image, respectively.

The similarity calculator 817 reads the contracted image of the second target image from the contracted image buffer 815, calculates a similarity 2 between the contracted image of the second target image and the image synthesized from the contracted image of the first target image and the contracted image of the third target image supplied from the synthesized image generator 816, and then supplies the similarity 2 to the determiner 64.

The similarity 2 may be the sum of squared differences between corresponding pixels between the synthesized image and the contracted image with the sign of the sum inverted or a maximum correlation value between the synthesized image and the contracted image.

The third process of the third processor 63 of FIG. 44 is described below with reference to a flowchart of FIG. 45.

The feature extractor 811 receives the image input to the third processor 63.

Figure 46:
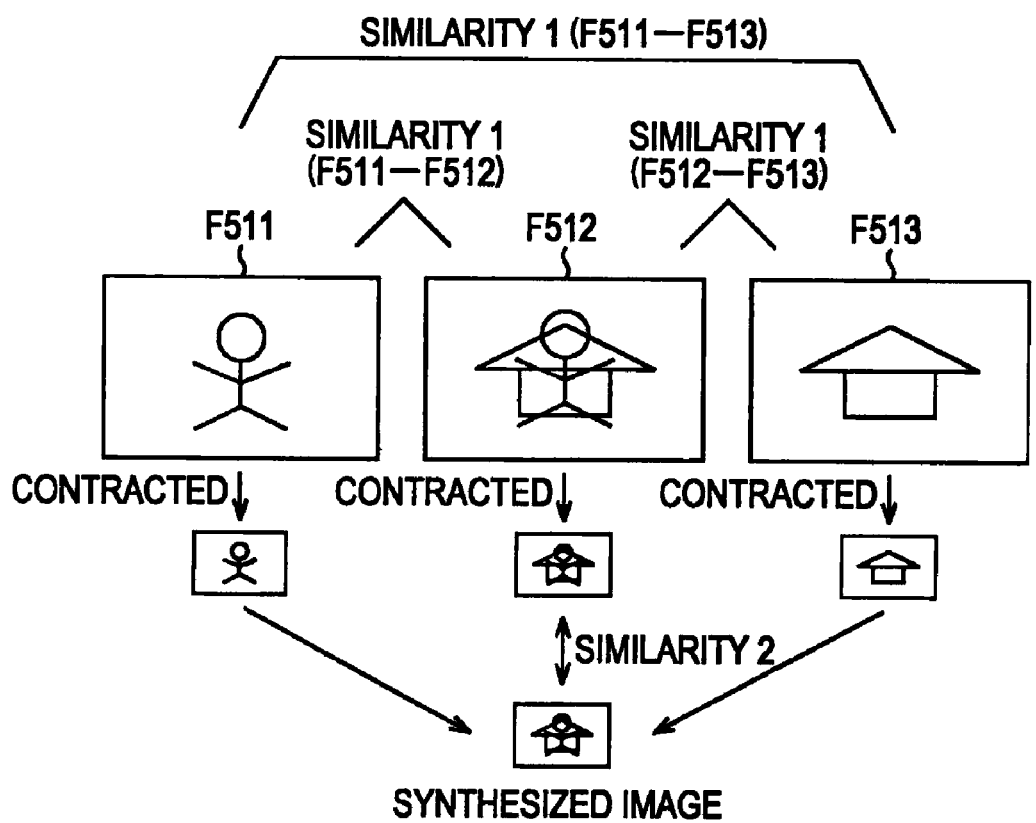
FIG. 46 illustrates generation of synthesized image.

The three latest image input to the third processor 63, the second latest image, the first latest image and the current image in chronological order are images of frame F511, frame F512, and frame F513 of FIG. 46. The similarity between the frame F511 where a person is a subject and the frame F513 where a house is a subject is low. The frame F512 has a mixture of the image of the prior frame F511 and the subsequent frame F513. The similarity between the image of the F511 and the image of the F512 and the similarity between the image of the frame F512 and the image of the frame F513 are high. In other words, the frame F512 contains a blend cut change that is a border between the cut to the frame F511 and a cut from the frame F513 thereafter.

In step S601, the feature extractor 811 extracts feature quantities from the frames F511 through F513 supplied. More specifically, as in step S121 of FIG. 19, a histogram is generated. The generated histogram is stored on the feature quantity buffer 812.

In step S602, the similarity calculator 813 reads the feature quantities of the frames F811 through F813, and calculates the first similarity 1 between the feature quantity of the frame F511 and the feature quantity of the frame F513, the second similarity 1 between the feature quantity of the frame F511 and the feature quantity of the frame F512, and the third similarity 1 between the feature quantity of the frame F512 and the feature quantity of the frame F513. The similarity calculator 813 then supplies the calculated similarities 1 to 3 to the determiner 64. More specifically, the histogram similarity is calculated in the same manner as in step S125 of FIG. 19.

The contracted image generator 814 receives the image input to the third processor 63, namely, the images of the frames F511 through F513.

In step S603, the contracted image generator 814 generates the contracted images of the images of the frames F511 through F513, and causes the contracted image buffer 815 to store the contracted images. For example, an image to be displayed on a liquid-crystal display (LCD) is contracted to a size of 8 pixels×8 pixels. The contraction process may be performed by partitioning the original image into 8×8 blocks, and by determining an average value of each block.

In step S604, the synthesized image generator 816 reads from the synthesized image generator 816 the contracted image of the frame F511 prior to the frame F512 and the contracted image of the frame F513 subsequent to the frame F512, generates the synthesized image of the contracted image of the frame F511 and the contracted image of the frame F513 in accordance with the Equation, and supplies the synthesized image to the similarity calculator 817.

In step S605, the similarity calculator 817 reads the contracted image of the frame F512 from the contracted image buffer 815 and calculates the similarity 2 between the contracted image of the frame F512 and the synthesized image of the contracted image of the frame F511 and the contracted image of the frame F513 supplied from the synthesized image generator 816. More specifically, the similarity 2 may be the sum of squared differences between corresponding pixels between the synthesized image and the contracted image with the sign of the sum inverted or a maximum correlation value between the synthesized image and the contracted image. The similarity 2 is then supplied to the determiner 64. Processing returns to step S4 of FIG. 11.

Figure 47:
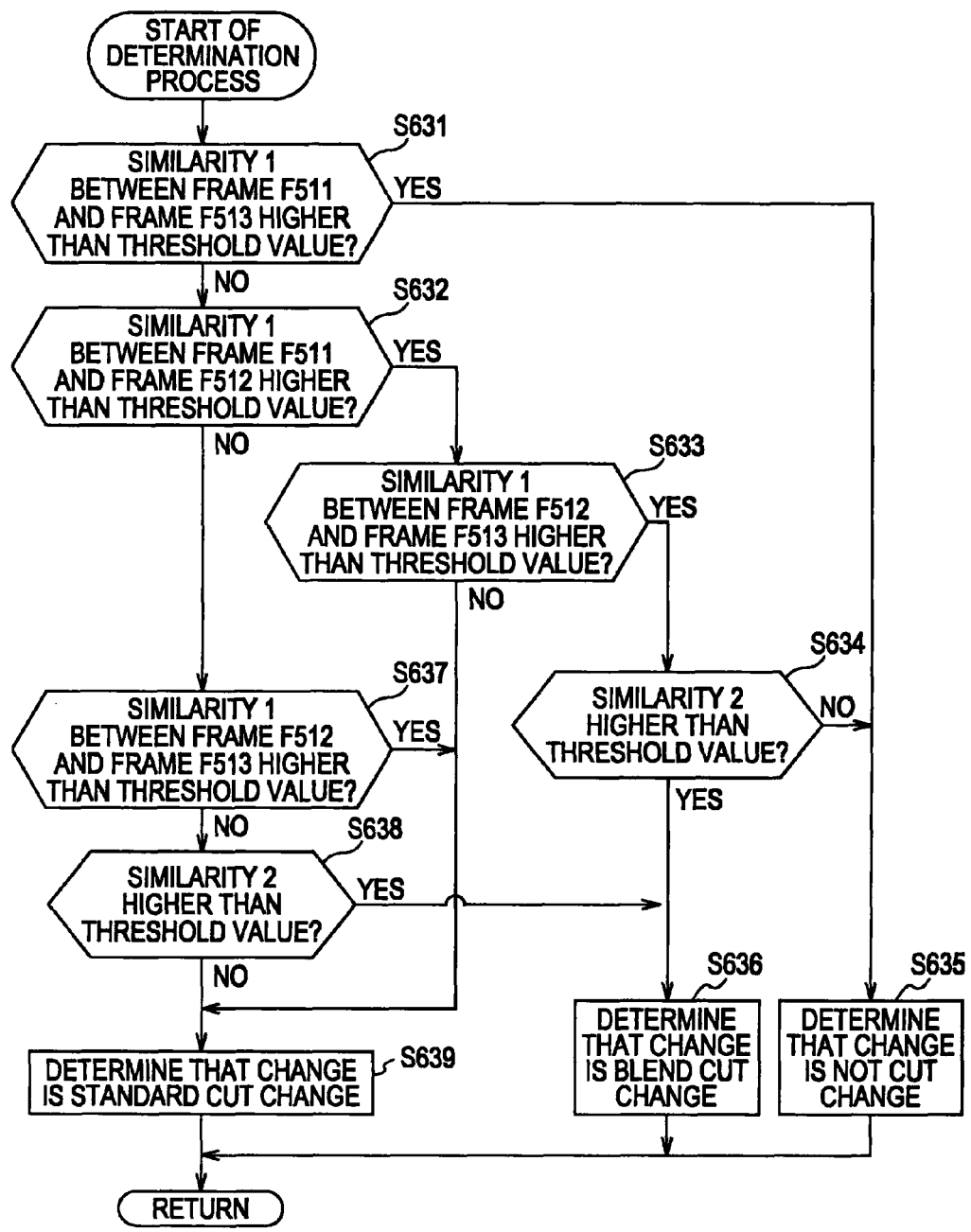
FIG. 47 is a flowchart illustrating a determination process of a determiner of FIG. 44.

As shown in FIG. 10, the determiner 64 performs the determination process in response to the similarities supplied from the first processor 61, the second processor 62 and the third processor 63. The determination process performed by the determiner 64 of FIG. 44 discussed with reference to a flowchart of FIG. 47 is performed based on only the similarity supplied from the third processor 63.

Figure 45:
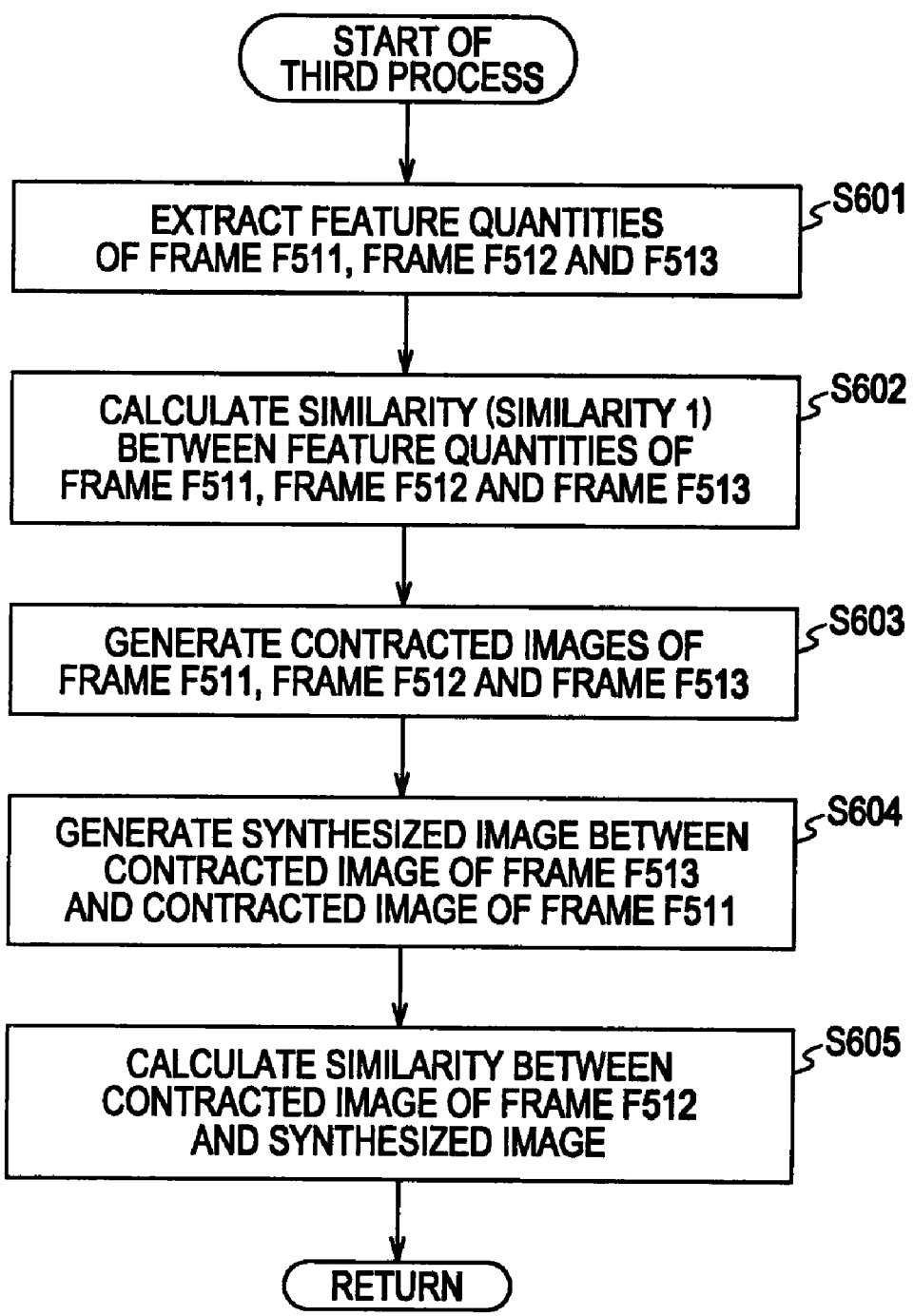
FIG. 45 is a flowchart illustrating a third process of the third processor.

The determination process starts when processing in the third process of FIG. 45 returns.

The determiner 64 receives the first through third similarities 1 from the similarity calculator 813 of FIG. 44 and the similarity 2 from the similarity calculator 817 of FIG. 44.

In step S631, the determiner 64 determines whether the similarity 1 (first similarity 1) between the image of the frame F511 and the image of the frame F513 is higher than a predetermined threshold value. If it is determined in step S631 that the first similarity 1 is higher than the predetermined threshold value, the determiner 64 determines in step S635 that the change in the images of the frames F511 through F513 is not a cut change.

Figure 48A:
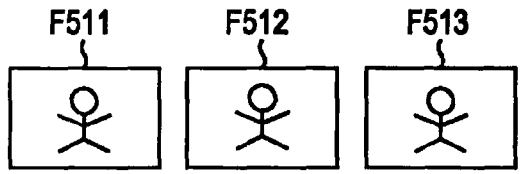
FIGS. 48A-48G illustrate relationship between image pattern and cut change.
Figure 48B:
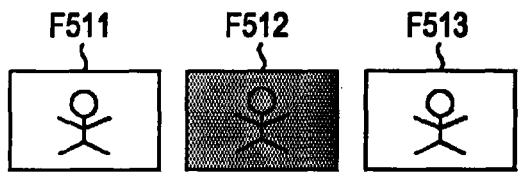

As shown in FIG. 48A, there is almost no change in the images of the frames F511 through F513. As shown in FIG. 48B, there is almost no change between the images of the frame F511 and the frame F513, but the image of the frame F512 is different from the images of the frames F511 and F513 (for example, because of flashing or frame missing). In such cases, the changes are not a cut change.

If it is determined in step S631 that the first similarity 1 is not higher than the predetermined threshold, the determiner 64 determines in step S632 whether the second similarity 1 between the images of the frames F511 and F512 is higher than a predetermined threshold value.

If it is determined in step S632 that the second similarity 1 between the images of the frames F511 and F512 is higher than the predetermined threshold value, the determiner 64 determines in step S633 whether the third similarity 1 between the images of the frame F512 and the image of the frame F513 is higher than a predetermined threshold value.

If it is determined in step S633 that the third similarity 1 is higher than the threshold value thereof, the determiner 64 determines in step S634 whether the similarity 2 is higher than a predetermined threshold value thereof.

If it is determined in step S634 that the third similarity 1 is not higher than the threshold value, in other words, the similarity 1 between the images of the frames F511 and F513 is lower than the threshold value thereof, the similarity 1 between the images of the frames F511 and F512 is higher than the threshold value thereof, the similarity 1 between the images of the frames F512 and F513 is higher than the threshold value thereof, and the similarity 2 is lower than the threshold value thereof, the determiner 64 determines in step S635 that the change in the images of the frames F511 through F513 is not a cut change.

Figure 48C:
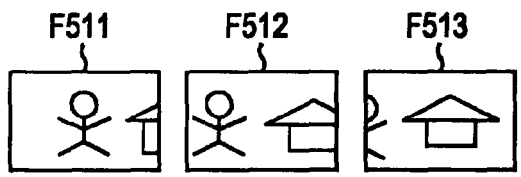

As shown in FIG. 48C, a person goes away quickly from a house in the images of the frames F511 through F513. The image of the frame F511 is not similar to the image of the frame F513. The image of the frame F511 is similar to the image of the frame F512, and the image of the frame F512 is similar to the image of the frame F513. An image synthesized from the contracted images of the frames F511 and F513 is not similar to the contracted image of the frame F512. The determiner 64 determines that the change in the images is not a cut change.

If it is determined in step S634 that the third similarity 2 is higher than the threshold value thereof, in other words, the similarity 1 between the images of the frames F511 and F513 is lower than the threshold value thereof, the similarity 1 between the images of the frames F511 and F512 is higher than the threshold value thereof, the similarity 1 between the images of the frames F512 and F513 is higher than the threshold value thereof, and the similarity 2 is higher than the threshold value thereof, the determiner 64 determines in step S636 that the change in the images of the frames F511 through F513 is a blend cut change.

Figure 48D:
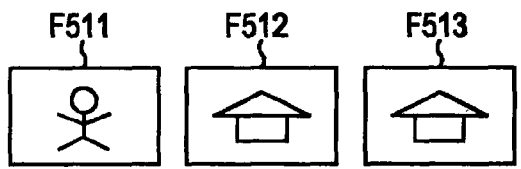
Figure 48E:
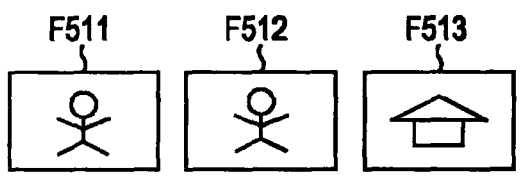
Figure 48F:
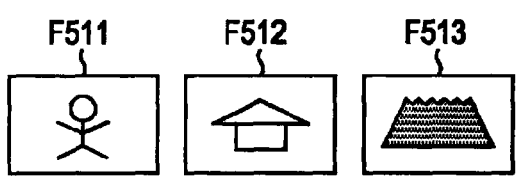
Figure 48G:
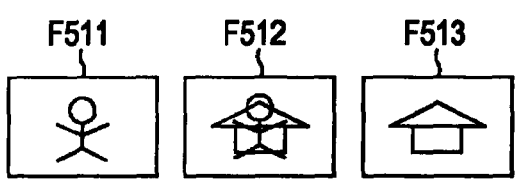

As shown in FIG. 48G, the image of a person in the frame F511 is not similar to the image of a house in the frame F513. Since the image of the frame F512 is a synthesized image of a person and a house, the image of the frame F511 is similar to the image of the frame F512 and the image of the frame F512 is similar to the image of the frame F513. The image synthesized from the contracted images of the frames F511 and F513 is similar to the contracted image of the frame F512. The determiner 64 determines that the change is a blend cut change.

If it is determined in step S632 that the second similarity 1 is lower than the threshold value thereof, the determiner 64 determines in step S637 that the third similarity 1 between the frame F512 and the frame F513 is higher than a predetermined threshold value thereof. If it is determined in step S637 that the third similarity 1 is higher than the threshold value thereof, i.e., the similarity 1 between the images of the frames F511 and F513 is lower than the threshold value thereof, the similarity 1 between the images of the frames F511 and F512 is lower than the threshold value thereof, and the similarity 1 between the images of the frames F512 and F513 is higher than the threshold value thereof, the determiner 64 determines in step S639 that the change in the images of the frames F511 through F513 is a standard cut change.

As shown in FIG. 48D, the image of a person in the frame F511 is not similar to the image of a house in the frame F513, and the image of the frame F513 is an image of the house. The images of the frames F511 and F512 are not similar to each other, and the images of the frames F512 and F513 are similar to each other. The determiner 64 then determines that the change in the images is a standard cut change.

If it is determined in step S633 that the third similarity 1 is lower than the threshold value, i.e., the similarity 1 between the images of the frames F511 and F513 is lower than the threshold value thereof, the similarity 1 between the images of the frames F511 and F512 is higher than the threshold value thereof, and the similarity 1 between the images of the frames F512 and F513 is lower than the threshold value thereof, the determiner 64 determines in step S639 that the change in the images of the frames F511 through F513 is a cut change.

As shown in FIG. 48E, the image of a person in the frame F511 is not similar to the image of a house in the frame F513, and the frame F512 contains the image of the person. The image of the frame F511 is similar to the image of the frame F512, and the image of the frame F512 is not similar to the image of the frame F513. The determiner 64 determines that the change in the images is a standard cut change.

If it is determined in step S637 that the third similarity 1 is lower than the threshold value thereof, the determiner 64 determines in step S638 whether the similarity 2 is higher than the predetermined threshold value thereof. If it is determined in step S638 that the similarity 2 is higher than the threshold value thereof, i.e., the similarity 1 between the images of the frames F511 and F513 is lower than the threshold value thereof, the similarity 1 between the images of the frames F511 and F512 is lower than the threshold value thereof, the similarity 1 between the images of the frames F512 and F513 is lower than the threshold value, and the similarity 2 is higher than the threshold thereof, the determiner 64 determines in step S636 that the change in the images of the frames F511 through F513 is a blend cut change.

As shown in FIG. 48G, the image of a person in the frame F511 is not similar to the image of a house in the frame F513 and the frame F512 is an synthesized image of the person and the house. It is determined that the images of the frames F511 and F512 are not similar to each other and that the images of the frames F512 and F513 are not similar to each other. In such a case, the determiner 64 determines that the change in the images is a blend cut change if the synthesized image of the contracted images of the frames F511 and F513 is similar to the contracted image of the frame F512.

If it is determined in step S638 that the similarity 2 is lower than the threshold value thereof, i.e., the similarity 1 between the images of the frames F511 and F513 is lower than the threshold value thereof, the similarity 1 between the images of the frames F511 and F512 is lower than the threshold value thereof, the similarity 1 between the images of the frames F512 and F513 is lower than the threshold value thereof, and the similarity 2 is lower than the threshold value thereof, the determiner 64 determines in step S639 that the change in the images of the frames F511 through F513 is a standard cut change.

As shown in FIG. 48F, the image of a person in the frame F511 is not similar to the image of a mountain in the frame F513, and the frame F512 shows the image of the house. The images of the frames F511 and F512 are not similar to each other and the images of the frames F512 and F513 are not similar to each other. The determiner 64 determines that the change in the images is a standard cut change if the synthesized image of the contracted images of the frame F511 and F513 is not similar to the contracted image of the frame F512.

As described above, the determiner 64 of FIG. 44 determines whether the change in the frames F511 through F513 is a standard cut change or a blend cut change based on the first through third similarity 1 supplied from the similarity calculator 813 and the similarity 2 supplied from the similarity calculator 817.

The determiner 64 determines whether the first through third similarities 1 and the similarity 2 are respectively higher than the threshold values set respectively therefor, thereby determining whether the change is a cut change based on the determination result. Even if the similarity value is equal to the respective threshold value, the determiner 64 determine that the similarity value is higher or lower than the respective threshold value.

FIG. 49 is a table summarizing a relationship of the determination process of FIG. 47 and the patterns of the images of the three frames of FIGS. 48A-48G.

As shown in FIG. 49, the similarity being "large" indicates that the similarity is higher than the threshold value thereof. The similarity being "small" indicates that the similarity is lower than the threshold value thereof.

If the similarity 1 between the frames F511 and F513 is "large" on the second row as shown in FIG. 49, the determiner 64 determines that the change is not a cut change regardless of whether the other similarities are "large" or "small." The image pattern corresponding to this case is illustrated in FIGS. 48A and 48B.

If the similarity 1 between the frames F511 and F513 is "small," the similarity 1 between the frames F511 and F512 is "large," the similarity 1 between the frames F512 and F513 is "large" and the similarity 2 is "large" as shown on the third row of FIG. 49, the determiner 64 determines that the change is a blend cut change. The image pattern corresponding to this case is illustrated in FIG. 48G.

If the similarity 1 between the frames F511 and F513 is "small," the similarity 1 between the frames F511 and F512 is "large," the similarity 1 between the frames F512 and F513 is "large" and the similarity 2 is "small" as shown on the fourth row of FIG. 49, the determiner 64 determines that the change is not a cut change. The image pattern corresponding to this case is illustrated in FIG. 48C.

If the similarity 1 between the frames F511 and F513 is "small," the similarity 1 between the frames F511 and F512 is "large," the similarity 1 between the frames F512 and F513 is "small" as shown on the fifth row of FIG. 49, the determiner 64 determines that the change is a standard cut change regardless of whether the similarity 2 is "large" or "small." The image pattern corresponding to this case is illustrated in FIG. 48E.

If the similarity 1 between the frames F511 and F513 is "small," the similarity 1 between the frames F511 and F512 is "small," the similarity 1 between the frames F512 and F513 is "large" as shown on the sixth row of FIG. 49, the determiner 64 determines that the change is a standard cut change regardless of whether the similarity 2 is "large" or "small." The image pattern corresponding to this case is illustrated in FIG. 48D.

If the similarity 1 between the frames F511 and F513 is "small," the similarity 1 between the frames F511 and F512 is "small," the similarity 1 between the frames F512 and F513 is "small", and the similarity 2 is "large" as shown on the seventh row of FIG. 49, the determiner 64 determines that the change is a blend cut change. The image pattern corresponding to this case is illustrated in FIG. 48G.

If the similarity 1 between the frames F511 and F513 is "small," the similarity 1 between the frames F511 and F512 is "small," the similarity 1 between the frames F512 and F513 is "small" and the similarity 2 is "small" as shown on the eighth row of FIG. 49, the determiner 64 determines that the change is a standard cut change. The image pattern corresponding to this case is illustrated in FIG. 48F.

The blend cut change is a change in the image at the concatenation of video periods using image effects, such as fade, dissolve, wipe, or the like involving a continuous change. Such a blend cut change is detected as a cut change. The blend cut change is thus accurately detected.

Using statistical discrimination such as Beyesian recognition, neural network, or support vector machine, the determiner 64 of FIG. 44 determines the cut change based on the first through third similarities 1 and the similarity 2.

Figure 50:
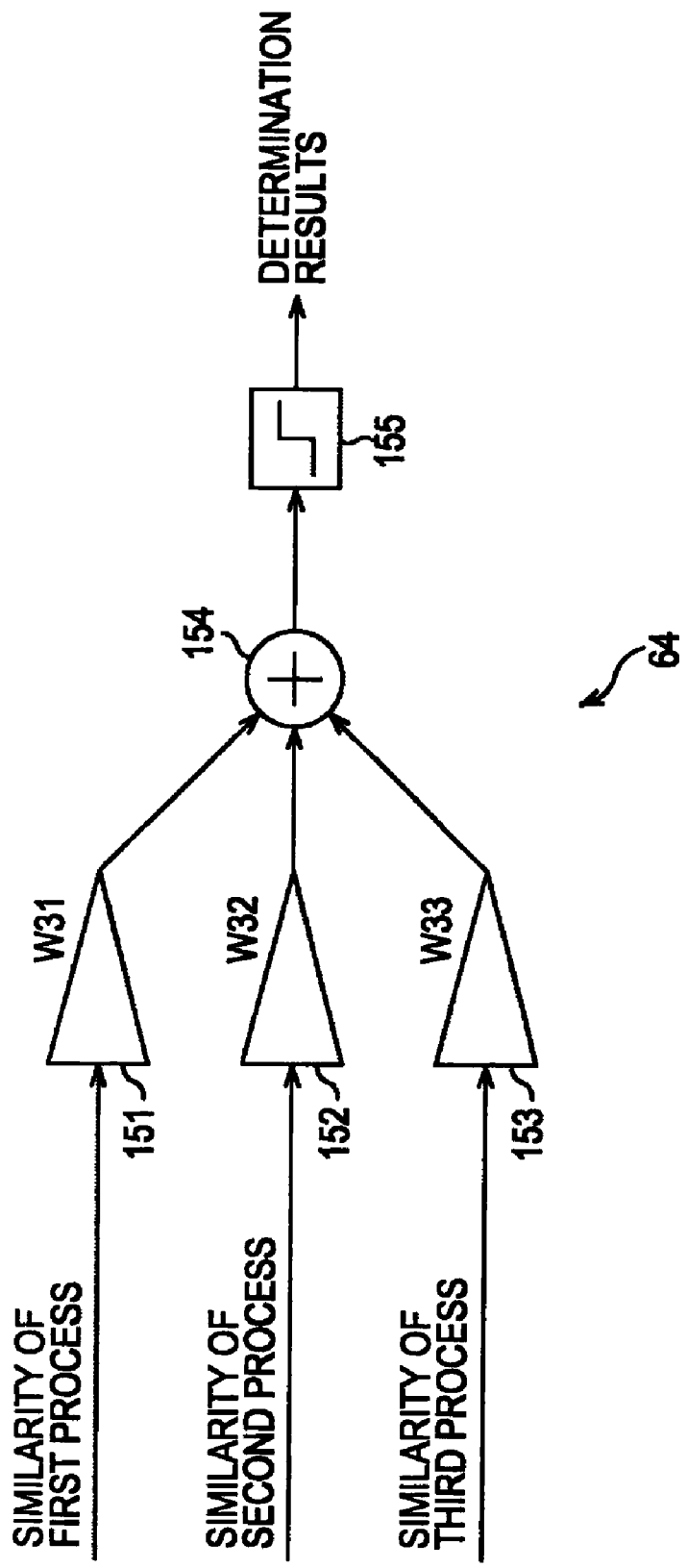
FIG. 50 is a functional block diagram illustrating a determiner of FIG. 10 in accordance with one embodiment of the present invention.
Figure 51:
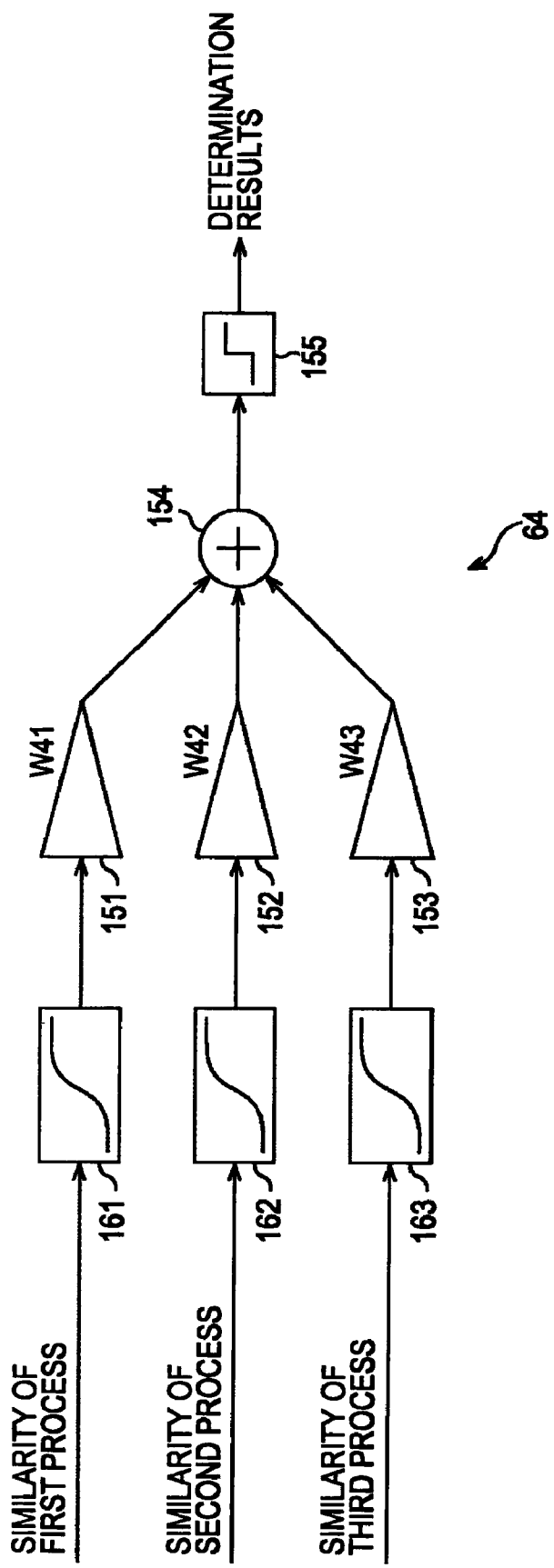
FIG. 51 is a functional block diagram illustrating the determiner of FIG. 10 in accordance with one embodiment of the present invention.

The determiner 64 is illustrated in FIGS. 28 and 30 in connection with the first process. FIGS. 50 and 51 also illustrate examples of the determiner 64 of FIG. 10 in accordance with one embodiment of the present invention.

As shown in FIG. 50, the weight processor 151 receives the similarity of the first process from the first processor 61 of FIG. 10. The weight processor 151 multiples the similarity information of the first process supplied by a predetermined weight coefficient W31 and then supplies the weighted similarity of the first process to the adder 154. The histogram similarity, the spatial correlation image similarity, the filter image similarity and the mosaic image similarity, if input as the similarity of the first process, are multiplied by the respective weight coefficients, and the weighted similarities are then supplied to the adder 154.

The weight processor 152 receives the similarity of the second process, namely, the feature distribution information from the second processor 62 of FIG. 10. The weight processor 152 multiplies the similarity of the second process supplied by a predetermined weight coefficient W32 and supplies the weighted similarity of the second process to the adder 154.

The weight processor 153 receives the similarity of the third process from the third processor 63 of FIG. 10. The weight processor 153 multiplies the similarity of the third process supplied from the third processor 63 by a predetermined weight coefficient W33 and supplies the weighted similarity of the third process to the adder 154. The first through third similarities 1 and the similarity 2, if input, are multiplied by the respective weight coefficients and the weighted similarities are supplied to the adder 154.

The adder 154 sums the similarity information of the first process supplied from the weight processor 151, the similarity information of the second process supplied from the weight processor 152 and the similarity information of the third process supplied from the weight processor 153. The adder 154 supplies the summed similarity information representing summed similarities to the threshold determiner 155.

The threshold determiner 155 compares the summed similarity information supplied from the adder 154 with a predetermined threshold value, thereby determining whether one of the border between the first image and the second image and the border between the second image and the third image is a cut change as a border involving a discontinuous change in time.

The determiner 64 of FIG. 51 includes non-linear converters 161 through 163 in front of the weight processors 151 through 153 of FIG. 50 respectively. The function of the non-linear converters 161 through 163 is identical to the function discussed with reference to FIG. 30.

FIG. 52 illustrates performance evaluation results of the cut change detection of the embodiment illustrated in FIG. 10.

As shown on the second row of FIG. 52, an individual captured 12 units of video, each unit lasting about 120 minutes, having a total of 260 cuts. Cut changes were detected from the video. The number of cut change detection failures is five, and the number of cut change overdetection cases is 4. The repeatability of cut change detection is 98.1 (=(260−5)/260) and the success rate of the cut change detection is 98.5 (=(260−4)/260).

As shown on the third row of FIG. 52, a broadcast program recorded on a DVD recorder or a television personal computer or commercial message (CM) had 19 units of video, each unit lasting about 120 minutes, having 1891 cuts. The number of cut change detection failures is 15 and the number of cut change overdetections is 27. The repeatability is 99.2 (=(1891−15)/1891) and the success rate is 98.6 (=(1891−27)/1891).

In this way, the present embodiment detects cut changes at high accuracy.

In the above discussion, the image is handled on a per frame basis. Alternatively, the image may be handled on a per field basis.

The process steps describing the program to be stored on the program recording medium are performed in the stated time-series order. Alternatively, the process steps may be performed in parallel or separately.

The embodiments of the present invention are implemented using hardware. Alternatively, the embodiments of the present invention may be implemented using software.

The present invention is applicable to a variety of detection apparatus detecting images, such as a broadcasting apparatus, an image editing apparatus, a camcorder, a personal computer for image processing, a DVD recorder, and a hard disk recorder.

It should be understood by those skilled in the art that various modifications, combinations, sub-combinations and alterations may occur depending on design requirements and other factors insofar as they are within the scope of the appended claims or the equivalents thereof.

What is claimed is:

1. A method of detecting a cut change based on a similarity between a first image and a second image, comprising:
   generating histograms for the first and second images, the histograms comprising at least one of a luminance histogram or a color histogram;
   generating spatial correlation images for the first and second images, the spatial correlations images representing correlations between spatial layouts of the first image and the second image;
   calculating information indicative of a similarity between the histogram of the first image and the histogram of the second image;
   calculating information indicative of a similarity between the spatial correlation image of the first image and the spatial correlation image of the second image; and
   determining whether a border between the first image and the second image is a cut change, based on at least the histogram similarity information and the spatial correlation image similarity information, wherein the determining comprises:
      converting, using a first non-linear function, the histogram similarity information into corresponding non-linear histogram similarity information;
      converting, using a second non-linear function, the spatial correlation image similarity information into corresponding non-linear spatial correlation image similarity information;
      computing a weighted sum of the non-linear histogram similarity information and the non-linear spatial correlation image similarity information;
      determining whether the weighted sum exceeds a predetermined threshold; and
      determining that the border between the first and second images represents the cut change, when the weighted sum fails to exceed the predetermined threshold.

2. The method of claim 1, wherein the histogram similarity information represents a rate of overlap between the histogram of the first image and the histogram of the second image.

3. The method claim 1, wherein:
   generating the spatial correlation images comprises generating at least one of a filter image or a mosaic image;
   the filter image comprises an image that is obtained by reducing a low frequency component and a high frequency component from at least one of the first image or the second image; and
   the mosaic image comprises a plurality of first areas;
   at least one of the first image or the second image is partitioned into the plurality of second areas; and
   the first and second areas are represented by at least one of an average luminance of the corresponding areas or an average color of the corresponding areas.

4. The method of claim 3, wherein:
   at least one of the spatial correlation images is the filter image; and
   the spatial correlation image similarity information comprises a maximum value of correlation values calculated by shifting at least a part of the spatial correlation images of the first image and the second image in relative position.

5. The method of claim 3, wherein:
   at least one of the spatial correlation images is the filter image; and
   the spatial correlation image similarity information comprises one of a minimum value of a sum of absolute differences or a minimum value of a sum of squared differences calculated by shifting in whole or in part the spatial correlation images of the first image and the second image in relative position.

6. The method of claim 3, wherein:
   at least one of the spatial correlation images is the mosaic image; and
   the spatial correlation image similarity information is one of (i) number of corresponding pixels, between the spatial correlation images of the first image and the second image, having a difference equal to or lower than a predetermined pixel threshold, or (ii) a ratio of a number of corresponding pixels having the difference equal to or lower than the predetermined pixel threshold to a number of pixels.

7. The method of claim 1, further comprising calculating an average similarity, the average similarity being at least one of (i) an average of histogram similarities of images in a plurality of adjacent frames or (ii) an average of spatial correlation image similarities of the images in a plurality of adjacent frames calculated, wherein the determining step includes determining whether the border between the first image and the second image is a cut change based on the histogram similarity, the spatial correlation image similarity, and the average similarity.

8. The method of claim 1, further comprising calculating a proximity average color, the proximity average color being an average of luminance or color of the images on a plurality of frames adjacent to the first image, wherein the determining includes determining whether the border between the first image and the second image is a cut change based on the histogram similarity, the spatial correlation image similarity, and the proximity average color.

9. The method of claim 1, further comprising:
   generating fine histograms for the first image and the second image, the fine histograms comprising at least one of a luminance histogram or a color histogram;
   calculating feature distributions for the first and second images by filtering the fine histograms;

calculating a similarity between the feature distribution of the first image and the feature distribution of the second image;

extracting a feature of a third image, the third image being different from the first image and the second image;

calculating a similarity between at least two of the first image, the second image, and the third image;

generating contracted images corresponding to the first image, the second image, and the third image;

generating a synthesized image of the contracted images corresponding to the first image and the third image; and calculating a similarity between the synthesized image and the contracted image corresponding to the second image, wherein the determining includes determining whether the border between the first image and the second image is a cut change based on the similarity between the feature distributions, the similarity between at least two of first image, the second image, and the third image, and the similarity between the synthesized image and the contracted image corresponding to the second image.

10. An apparatus for detecting a cut change based on a similarity between a first image and a second image, comprising:

a unit generating histograms for the first and second images, the histograms comprising at least one of a luminance histogram or a color histogram;

a unit generating spatial correlation images for the first and second images, the spatial correlations images representing correlations between spatial layouts of the first image and the second image;

a unit calculating information indicative of a similarity between the histogram of the first image and the histogram of the second image;

a unit calculating information indicative of a similarity between the spatial correlation image of the first image and the spatial correlation image of the second image; and a unit determining whether a border between the first image and the second image is a cut change, based on at least the histogram similarity information and the spatial correlation image similarity information, the determining unit being configured to:

convert, using a first non-linear function, the histogram similarity information into corresponding non-linear histogram similarity information;

convert, using a second non-linear function, the spatial correlation image similarity information into corresponding non-linear spatial correlation image similarity information;

compute a weighted sum of the non-linear histogram similarity information and the non-linear spatial correlation image similarity information;

determine whether the weighted sum exceeds a predetermined threshold; and determine that the border between the first and second images represents the cut change, when the weighted sum fails to exceed the predetermined threshold.

11. A non-transitory, computer-readable storage medium storing a program that, when executed by a processor, causes the processor to perform a method for detecting a cut change based on a similarity between a first image and a second image, the method comprising:

generating histograms for the first and second images, the histograms comprising at least one of a luminance histogram or a color histogram;

generating spatial correlation images for the first and second images, the spatial correlations images representing correlations between spatial layouts of the first image and the second image;

calculating information indicative of a similarity between the histogram of the first image and the histogram of the second image;

calculating information indicative of a similarity between the spatial correlation image of the first image and the spatial correlation image of the second image; and determining whether a border between the first image and the second image is a cut change based on at least the histogram similarity information and the spatial correlation image similarity information, wherein the determining comprises:

converting, using a first non-linear function, the histogram similarity information into corresponding non-linear histogram similarity information;

converting, using a second non-linear function, the spatial correlation image similarity information into corresponding non-linear spatial correlation image similarity information;

computing a weighted sum of the non-linear histogram similarity information and the non-linear spatial correlation image similarity information;

determining whether the weighted sum exceeds a predetermined threshold; and determining that the border between the first and second images represents the cut change, when the weighted sum fails to exceed the predetermined threshold.

12. The method of claim 1, wherein the first non-linear function and the second non-linear function correspond to a common non-linear function.

13. A computer-implemented method, comprising:

generating fine histograms for a first image and a second image, the fine histograms comprising at least one of a luminance histogram or a color histogram;

obtaining feature distributions for the first and second images by filtering the fine histograms;

calculating first information indicative of a similarity between the feature distribution of the first image and the feature distribution of the second image;

extracting a feature of a third image, the third image being different from the first image and the second image;

calculating second information indicative of a similarity between at least two of the first image, the second image, and the third image;

generating contracted images corresponding to the first image, the second image, and the third image;

generating a synthesized image based on the contracted images corresponding to the first and third images;

calculating third information indicative of a similarity between the synthesized image and the contracted image corresponding to the second image; and determining whether a border between the first image and the second image is a cut change, based at least the first similarity information, the second similarity information, and the third similarity information.

14. The method of claim 13, wherein the obtaining comprises filtering the fine histograms for the first and second images using at least one of a low-pass filter or a non-linear response filter.

15. The method of claim 13, wherein calculating the first similarity information comprises:

determining a correspondence relationship between the feature distributions of the first and second images; and calculating the first similarity information based on at least the correspondence relationship.

16. The method of claim 15, wherein determining the correspondence relationship comprises at least one of (i) maximizing a correlation between the feature distributions of the first and second images, (ii) minimizing squared errors between the feature distributions of the first and second images, or (iii) aligning the centers of gravity of the feature distributions of the first and second images.

17. The method of claim 13, wherein generating the contracted images comprises:
    identifying pixel blocks within corresponding ones of the first, second, and third images;
    generating average pixel values for of the pixel blocks; and
    generating the contracted images based on the average pixel values.

18. The method of claim 13, wherein generating the contracted images comprises reducing at least one of the first, second, or third images to a predetermined size.

19. The method of claim 13, wherein the generating the synthesized image comprises:
    obtaining pixel values associated with one or more spatial positions within the contracted images corresponding to the first and third images;
    computing, for the spatial positions, linear combinations of pixel values within the contracted images corresponding to the first and third images; and
    generating the synthesized image based on the linear combinations of pixel values.

20. The method of claim 13, wherein calculating the third similarity information comprises at least one of (i) computing sum of squared differences between pixels of the synthesized image and the contracted image corresponding to the second image, or (ii) determining a maximum correlation value between the synthesized image and the contracted image corresponding to the second image.

* * * * *